(12) United States Patent
McAllister et al.

(10) Patent No.: US 8,917,159 B2
(45) Date of Patent: Dec. 23, 2014

(54) FULLY SECURE ITEM-LEVEL TAGGING

(76) Inventors: Clarke William McAllister, Eugene, OR (US); Daniel Shihady Campbell, Boston, MA (US)

( * ) Notice: Subject to any disclaimer, the term of this patent is extended or adjusted under 35 U.S.C. 154(b) by 453 days.

(21) Appl. No.: 12/841,744

(22) Filed: Jul. 22, 2010

(65) Prior Publication Data

US 2010/0289627 A1 Nov. 18, 2010

Related U.S. Application Data

(63) Continuation-in-part of application No. 11/465,712, filed on Aug. 18, 2006, now Pat. No. 7,830,258.

(60) Provisional application No. 60/709,713, filed on Aug. 19, 2005, provisional application No. 61/228,160, filed on Jul. 24, 2209, provisional application No. 61/264,244, filed on Nov. 24, 2009, provisional application No. 61/288,830, filed on Dec. 21, 2009.

(51) Int. Cl.

| | |
|---|---|
| *G06T 1/00* | (2006.01) |
| *H04L 9/32* | (2006.01) |
| *G08B 13/24* | (2006.01) |
| *G06F 21/44* | (2013.01) |
| *H04L 9/08* | (2006.01) |
| *G06Q 10/08* | (2012.01) |

(52) U.S. Cl.
CPC ....... *G08B 13/2417* (2013.01); *H04L 2209/805* (2013.01); *H04L 9/3234* (2013.01); *G06F 21/44* (2013.01); *H04L 9/0891* (2013.01); *H04L 9/083* (2013.01); *G06F 2221/2143* (2013.01); *G06Q 10/087* (2013.01); *H04L 9/3226* (2013.01)
USPC .......................... 340/5.8; 340/10.51; 380/270

(58) Field of Classification Search
USPC .................. 340/572.1, 5.8–5.82, 10.1, 10.51, 340/12.51, 13.26; 380/258, 270
See application file for complete search history.

(56) References Cited

U.S. PATENT DOCUMENTS 5,280,159 A 1/1994 Schultz
5,850,187 A 12/1998 Carrender
(Continued)

FOREIGN PATENT DOCUMENTS

WO WO/01/57807 8/2001
WO WO/03/019459 3/2003
WO WO/2009/052059 A1 4/2009

OTHER PUBLICATIONS

EPCglobal, Specification for RFID Air Interface, "EPC(tm) Radio-Frequency Identity Protocols, Class-1 Generation-2 UHF RFID Protocol for Communications at 860 MHz—960 MHz", Version 1.0.9, 94 pages, Jan. 2005.*

(Continued)

*Primary Examiner* — Thomas Mullen
(74) *Attorney, Agent, or Firm* — Peter A. Haas, Esquire

(57) ABSTRACT

The present invention provides value to brand owners, retailers, and consumers through the use of radio frequency identification, stenography, nanolithography, fingerprints, novel heuristic threat evaluation, indication, and detection model. Additionally, using cryptography, tag passwords are formulated and identities are reversibly flipped, thus allowing item identities to remain secret to unauthorized observers. This unique combination of heuristics and authentication technologies provides an efficient means of finding and stopping the flow of counterfeit products throughout global supply chains. The present invention includes radio frequency identification (RFID) tags, encoders, servers, identity changers, and authenticity verifiers to make this task a viable and adaptive weapon against the elusive counterfeiters. The present end-to-end RFID system offers unprecedented security for retailers and consumers, while remaining efficient and scalable.

16 Claims, 20 Drawing Sheets

(56) References Cited

U.S. PATENT DOCUMENTS

| | | | |
|---|---|---|---|
| 5,874,902 | A | 2/1999 | Heinrich |
| 6,025,780 | A | 2/2000 | Bowers |
| 6,078,251 | A | 6/2000 | Landt |
| 6,181,248 | B1 | 1/2001 | Fockens |
| 6,227,643 | B1 | 5/2001 | Purcell et al. |
| 6,312,106 | B1 | 11/2001 | Walker |
| 6,317,028 | B1 | 11/2001 | Valiulis |
| 6,332,098 | B2 | 12/2001 | Ross |
| 6,379,058 | B1 | 4/2002 | Petteruti |
| 6,409,401 | B1 | 6/2002 | Petteruti |
| 6,415,978 | B1 | 7/2002 | McAllister |
| 6,486,780 | B1 | 11/2002 | Garber |
| 6,532,346 | B2 | 3/2003 | Gallivan |
| 6,677,852 | B1 | 1/2004 | Landt |
| 6,687,634 | B2 | 2/2004 | Borg |
| 6,694,884 | B2 | 2/2004 | Klinefelter et al. |
| 6,708,005 | B2 | 3/2004 | Chihara |
| 6,714,745 | B2 | 3/2004 | Sasame et al. |
| 6,722,753 | B2 | 4/2004 | Helterline et al. |
| 6,735,399 | B2 | 5/2004 | Tabb et al. |
| 6,738,903 | B1 | 5/2004 | Haines |
| 6,748,182 | B2 | 6/2004 | Yoshida et al. |
| 6,791,704 | B1 | 9/2004 | Moreau et al. |
| 6,793,307 | B2 | 9/2004 | Spurr et al. |
| 6,798,997 | B1 | 9/2004 | Hayward et al. |
| 6,802,659 | B2 | 10/2004 | Cremon et al. |
| 6,807,380 | B2 | 10/2004 | Iida et al. |
| 6,808,255 | B1 | 10/2004 | Haines et al. |
| 6,820,039 | B2 | 11/2004 | Johnson et al. |
| 6,832,866 | B2 | 12/2004 | Klinefelter et al. |
| 6,848,616 | B2 | 2/2005 | Tsirline et al. |
| 6,857,714 | B2 | 2/2005 | Hohberger |
| 6,879,785 | B2 | 4/2005 | Ito et al. |
| 6,894,711 | B2 | 5/2005 | Yamakawa et al. |
| 6,932,527 | B2 | 8/2005 | Pribula et al. |
| 6,933,848 | B1 | 8/2005 | Stewart |
| 6,954,533 | B2 | 10/2005 | Turner et al. |
| 6,963,351 | B2 | 11/2005 | Squires |
| 6,986,057 | B1 | 1/2006 | Cusey et al. |
| 6,995,652 | B2 | 2/2006 | Carrender |
| 7,012,531 | B2 | 3/2006 | Fries |
| 7,018,117 | B2 | 3/2006 | Meier et al. |
| 7,031,946 | B1 | 4/2006 | Tamai et al. |
| 7,034,689 | B2 | 4/2006 | Teplitxky |
| 7,055,750 | B2 | 6/2006 | Carrender |
| 7,066,667 | B2 | 6/2006 | Chapman |
| 7,069,251 | B1 | 6/2006 | Bartz |
| 7,073,712 | B2 | 7/2006 | Jusas |
| 7,114,655 | B2 | 10/2006 | Chapman |
| 7,147,165 | B2 | 12/2006 | Mongin et al. |
| 7,183,505 | B2 | 2/2007 | Mongin et al. |
| 7,187,294 | B2 | 3/2007 | Burdette |
| 7,205,897 | B2 | 4/2007 | Lin |
| 7,223,030 | B2 | 5/2007 | Fessler |
| 7,320,432 | B2 | 1/2008 | Sureaud et al. |
| 7,360,714 | B2 | 4/2008 | Sano |
| 7,411,503 | B2 | 8/2008 | Stewart |
| 7,425,897 | B2 | 9/2008 | Fukushima |
| 7,477,151 | B2 | 1/2009 | Forster |
| 7,532,104 | B2 | 5/2009 | Juels |
| 7,551,087 | B2 | 6/2009 | McAllister |
| 7,629,888 | B2 | 12/2009 | Forster |
| 7,633,376 | B2 | 12/2009 | Diorio |
| 7,664,257 | B2 | 2/2010 | Hohberger |
| 2002/0005774 | A1 | 1/2002 | Rudolph |
| 2002/0059880 | A1 | 5/2002 | Klinefelter |
| 2002/0062898 | A1 | 5/2002 | Austin et al. |
| 2002/0067264 | A1 | 6/2002 | Soehnlen |
| 2002/0149468 | A1 | 10/2002 | Carrender |
| 2004/0074964 | A1 | 4/2004 | Falkenrich-wesche |
| 2004/0088230 | A1 | 5/2004 | Elliott |
| 2004/0109715 | A1 | 6/2004 | Meier et al. |
| 2004/0114981 | A1 | 6/2004 | Meier et al. |
| 2005/0058292 | A1 | 3/2005 | Diorio |
| 2005/0218219 | A1 | 10/2005 | Sano |
| 2005/0242957 | A1 | 11/2005 | Lindsay |
| 2005/0275540 | A1 | 12/2005 | Halope |
| 2005/0275708 | A1 | 12/2005 | Squires et al. |
| 2005/0280537 | A1 | 12/2005 | Feltz et al. |
| 2006/0017570 | A1 | 1/2006 | Moskowitz |
| 2006/0061475 | A1 | 3/2006 | Moskowitz |
| 2006/0080819 | A1 | 4/2006 | McAllister |
| 2006/0087407 | A1 | 4/2006 | Stewart |
| 2006/0123471 | A1 | 6/2006 | Fontanella et al. |
| 2006/0132313 | A1 | 6/2006 | Moskowitz |
| 2007/0052523 | A1 | 3/2007 | Jin |
| 2007/0056027 | A1 | 3/2007 | Nehowig et al. |
| 2007/0057057 | A1 | 3/2007 | Andresky et al. |
| 2007/0125836 | A1* | 6/2007 | McAllister et al. .......... 235/375 |
| 2007/0152033 | A1 | 7/2007 | Hind |
| 2007/0177738 | A1 | 8/2007 | Diorio |
| 2007/0194889 | A1 | 8/2007 | Bailey |
| 2007/0204329 | A1* | 8/2007 | Peckover .................... 340/10.1 |
| 2008/0001724 | A1 | 1/2008 | Soleimani |
| 2008/0181398 | A1 | 7/2008 | Pappu |
| 2008/0196106 | A1 | 8/2008 | Friedrich |
| 2008/0298870 | A1 | 12/2008 | Tsirline et al. |
| 2009/0033464 | A1 | 2/2009 | Friedrich |

OTHER PUBLICATIONS

Park; Jaemin, A Practical Approach for Enhancing Security of EPCglobal RFID Gen2 Tag, Symposium on Cryptography and Information Security , Jan. 17, 2006, 6 pages, Hiroshima Japan.

Staake; Thorsten, Extending the EPC Network—The Potential of RFID in Anti-Counterfeiting, Public Safety Users Requirements and Technology Solutions Workshop, Feb. 24, 2005, 27 pages, Zurich Switzerland.

Stapleton-Gray; Ross, Would Macy's Scan Gimbels? Competitive Intelligence and RFID, Stapleton-Gray and Associates Newsletters, Nov. 13, 2003, 6 pages.

Lehtonen; Mikko, Serialized TID Numbers—A Headache or a Blessing for RFID Crackers?, IEEE Conference, Apr. 8, 2009, 18 pages, Orlando Florida.

\* cited by examiner

FULLY SECURE ITEM-LEVEL TAGGING

PRIORITY CLAIM

The present application is a continuation-in-part of U.S. patent application Ser. No. 11/465,712 (U.S. Pat. No. 7,830, 258) filed on 18 Aug. 2006, which claims benefit claims benefit under 35 USC Section 119(e) of U.S. Patent Application No. 60/709,713 filed on 19 Aug. 2005 by the common inventor Clarke W. McAllister. The present application is based on and claims priority from these applications, the disclosures of "certain preferred magazines are part of a family of interchangeable magazines of similar size, shape, and functionality, preferably capable of housing and dispensing certain types, styles, shapes, and sizes of new or used RFID tags, transponders, or inlays. Certain preferred embodiments of magazines and cartridges have RFID tags permanently attached to them such that they can be automatically interrogated and tracked." and "unique and embedded, RFID transponder which enables automatic interrogation and tracking of cartridge" and to "selectively interrogate cartridge identification transponders that operate in the same band as transponders within the cartridge" and "the interrogator is capable of reading an RFID tag mounted to the loaded cartridge, and is also preferably capable of filtering out its response to interrogation or programming of RFID tags" and "spent cartridge is replaced by either a new (virgin) cartridge or a refurbished cartridge, as appropriate and such replacement cartridge is replenished with blank RFID transponders" which are hereby expressly incorporated herein by reference. The present application further claims benefit under 35 USC Section 119(e) of U.S. Provisional Patent Application Ser. No. 61/228,160 filed on 24 Jul. 2009 by Clarke W. McAllister, U.S. Patent Application, U.S. Patent Application No. 61/264, 244 filed on 24 Nov. 2009 by Clarke W. McAllister, and U.S. Patent Application No. 61/288,830 filed on 21 Dec. 2009 by Clarke McAllister and Daniel Campbell. The present application is based on and claims priority from these applications, the disclosures of which are hereby expressly incorporated herein by reference. U.S. Pat. No. 7,551,087 dated 23 Jun. 2009 and allowed U.S. application Ser. No. 11/465,712 filed 18 Aug. 2006 both by inventor Clarke McAllister are also hereby expressly incorporated herein by reference.

BACKGROUND

Counterfeit products are a duplicate or an imitation of legitimate branded products which infringe upon a production monopoly held by an individual or a corporation. Counterfeit products are produced with the intent to bypass the legitimate brand owner's monopoly and take advantage of the high market value of branded products. Counterfeit products frequently include clothing, software, pharmaceuticals, watches, electronics, recreational equipment and other branded goods resulting in patent infringement or trademark infringement.

Some pharmaceutical products have such high sales price points that counterfeiters can easily recoup the cost of duplicating complex packaging details, including security seals. Some common prescription drugs retail for $20 per dose, other medicines can cost cancer patients over $300 per day. Any and all safety and security measures can be duplicated by counterfeiters that don't have to bear the development and marketing costs. Many commercial brand owners incur enormous losses to counterfeiters.

The production and distribution of counterfeit products is difficult to measure, but official estimates are from 5 to 7% of the entire world's trade. Hundreds of billions of U.S. Dollars of international trade account for losses to brand owners. Counterfeit consumer goods, especially products that bear highly desirable brand marks and command high retail values usually originate in parts of the world where low labor rates prevail and cultural attitudes tolerate and even approve of the illegal activity. In many cases foreign workers and managers of production have little or no loyalty to the brand owner. With the means of legitimate production in their hands, there has been little to prevent them from distributing those products in a manner to reap higher profits. Counterfeiters do not have to amortize the costs of product development and advertising that boosts the value of the branded products. To achieve their objectives, counterfeiters bypass the brand owner's approved channels, often marketing directly to consumers. Since counterfeiters have a lower cost structure, they offer prices that are below prices on products that are delivered through approved distribution channels with their associated pricing policies. Sales of counterfeit products are driven by consumers that want a good deal.

Counterfeiters are deceptive; they attempt to either deceive consumers into thinking they are purchasing a legitimate item, or to convince the consumer that they could deceive others with a counterfeit product. Some counterfeits products are made in the same factory that produces the original, authentic product, using the same tooling, procedures, and materials. Owners and operators of a factory run a counterfeiting operation within their own four walls without the permission of the trademark owner. Excess product is produced and distributed without the use of anti-counterfeiting measures making it impossible to distinguish a 'perfect' counterfeit from the authentic product.

Radio frequency identification (RFID) means the use of electromagnetic radiating waves or reactive field coupling in the radio frequency portion of the spectrum to communicate to or from a tag through a variety of modulation and encoding schemes to uniquely read the identity of a radio frequency tag or other data stored on it. Assuming certain criteria are met, as disclosed in the present invention, RFID can be used as part of a comprehensive item identification tool to combat counterfeiting.

An RFID tag or 'tag' or 'transponder' means either an RFID device having the ability to produce a radio signal or an RFID device which re-couples, back-scatters or reflects (depending on the type of device) and modulates a carrier signal received from a reader, writer, or encoder.

EPCglobal Gen2 RFID tags would have been the perfect universal badge of authenticity that any product made anywhere in the world could bear in order to distinguish a perfect counterfeit from an authentic product. However, the Gen2 RFID tag lacks a crypto engine because it was deemed to require too many transistors and too much power to operate as a passive RFID tag. Lacking this, brand owners have been presented with an unsatisfactory means of preventing duplication of Gen2 tags that would at face value been an unambiguous indication of the true authenticity of a product that appears to be one of theirs. Instead of providing an electronic badge of authenticity, Gen2 system architects decided to move the authentication process to a system of globally interconnected computers servers. The operation of and data shared by each server is under the control of each trading partner. They decide what information is provided for any information query.

Thorsten Staake of the Institute of Technology Management, University of St. Gallen, Auto-ID Lab and M-Lab St. Gallen/Zurich called for a cryptographic solution for securing EPC RFID tags in February 2005 in his presentation entitled:

Extending the EPC Network—The Potential of RFID in Anti-Counterfeiting. Staake claims that counterfeit products are responsible for 192,000 deaths in China in 2001 because of fake drugs, fake baby formula has caused infants to develop rashes and seizures, 1 Million counterfeit birth control pills have caused unwanted pregnancies, Indian hospital patients die from counterfeit glycerin, counterfeit bolts are blamed for a Norwegian air plane crash that killed 55 passengers, malfunctioning counterfeit parts were discovered in $7 million worth of open heart surgery pumps, 7 children died when their bus crashed because of fake brake pads, counterfeit shampoo was found to contain harmful bacteria, risk of explosion is high in counterfeit batteries. Staake stated that "Problems occur when simple RFID Tags are duplicated", and went on to recommend extensions to the existing EPC architecture for tags that made use of challenge-response authentication whereby a challenged tag can prove that it holds a secret without directly disclosing that secret.

Staake was correct in every aspect except that he made an unstated but critical assumption regarding the authentication process. His assumption was that the queries of secure RFID tags were often made in conditions where there was risk of eavesdropping by untrustworthy observers. It would only be under such conditions that it would be necessary to use cryptographically secure on-tag resources to securely prove authenticity. This distinction is further explained in the body of this patent specification.

Daniel Vernon Bailey and Ari Juels explain this in terms of the ease of 'skimming' in their U.S. Patent Application Publication Number 20070194889 wherein they state that:

Certain commercial segments, like the pharmaceutical industry, are coming to view EPC tags as an anti-counterfeiting tool. EPC tags are a potent mechanism for object identification, and can facilitate the compilation of detailed object histories and pedigrees. They are poor authenticators, though, as they possess no explicit authentication functionality. The EPCglobal standards prescribe no mechanism for EPC readers to authenticate the validity of the tags they scan. An EPC tag emits its EPC promiscuously, i.e., to any querying reader. Readers accept the validity of the EPCs they scan at face value. Thus, EPC tags are vulnerable to counterfeiting or other types of cloning attacks.

An attacker can learn an EPC tag's essential data, its EPC, simply by scanning it or by gaining access to an appropriate tag database. The term "skimming" is used herein to denote the process of scanning an EPC tag to obtain its EPC for the purpose of cloning the tag. Furthermore, if the unique identifiers in a manufacturer's EPCs are not random, e.g., if they are sequential, then an attacker that sees an EPC on one item can guess or fabricate another valid EPC. In brief "identity theft" of EPC tags is a straightforward matter because EPCs are data objects that are easily separable from EPC tags.

Although EPC tags carry no explicit mechanisms for authentication, they do possess some data security features. The description herein will make reference to basic and enhanced EPC tags. A basic EPC tag is one that carries only the mandatory features of the EPCglobal standard, while an enhanced EPC tag additionally includes an access-control function that is optional in the EPCglobal standard. Basic EPC tags have only one significant security feature, namely a privacy-enhancing kill command. When an EPC tag receives this command, it "self-destructs", which is to say that it renders itself completely and permanently inoperable. To protect against accidental or malicious killing of tags, the kill command only takes effect when accompanied by a valid password, referred to as a personal identification number (PIN). In the EPCglobal standard, the kill PIN is 32 bits in length.

With regard to enhanced EPC tags, such tags respond to a command called access, whose implementation is optional in the EPCglobal standard. When accompanied by a valid 32-bit access PIN, the access command causes a tag to transition into what is called a "secured" state. Tags may be configured such that certain commands only function when a tag is "secured." In particular, read access to the memory banks for the access and kill PINs may be made dependent on an EPC tag being "secured." The standard supports no PINs other than the access and kill PINs.

In consequence, although the EPC of a tag may be readily skimmed, a properly configured EPC tag does not promiscuously emit its PINs. Thus the PINs are resistant to skimming.

Bailey and Juels describe an application of the Access Password to transition to the secured state to expose the EPC Kill Password, thus providing for a skim-resistant EPC RFID tag without modification to the hardware. This application is also described by Mohammad Soleimani and Joseph White of Symbol Technologies in U.S. Patent Application Publication Number 20080001724 which was filed 31 Jul. 2006, which is more than a year before Bailey and Juels' August 2007 filing date. Soleimani and White disclose the same concept of using the EPC Access Password to expose a shared secret. It is important to note that this is merely an application of the EPC Air Interface Specification that was developed in mid-2004 by an industry-wide group of thought leaders. Jaemin Park, Junchae Na and Minjeong Kim also wrote an IEEE paper entitled "A Practical Approach for Enhancing Security of EPCglobal RFID Gen2 Tag" that describes access to the Kill Password as a shared secret and an associated method of changing the shared secret on each and every access of the tag.

In cryptography, a shared secret is a piece of data only known to the parties involved in a secure communication. The shared secret can be a password, a passphrase, a cryptographic pseudonym, a big number or an array of randomly chosen bytes.

Ari Juels explains cryptographic pseudonyms in his U.S. Pat. No. 7,532,104 for low-complexity RFID tags that use pseudonyms between tags and readers as a way of improving upon the existing EPC tag's open promiscuity.

Claus Wonnemann and Jens Strüker of Department of Telematics at the Albert-Ludwigs-Universität Freiburg in Freiburg, Germany write in their IEEE paper that the cover coding of EPC Access and Kill Passwords can be intercepted by an attacker. Cover-coding is the bitwise exclusive OR (XOR) of a pseudo-random number that is generated by an EPC Class 1 Gen 2 RFID tag. Wonnemann and Strüker state that even though the backscattered signal strength of an EPC tag is very low, an attacker with a beam antenna and an interrogator operating at full power could expose the backward channel to an attacker whereby exposing the pseudo-random number that is used to hide the secret codes while they are being read or written.

Wonnemann and Strüker state that brute force methods of attacking EPC Class 1 Gen 2 RFID tags require $2^{31}$ attempts on average. At a rate of 25 attacks per second, cracking the security on each separately locked tag would require 2.7 years for each tag. They also argue that a side channel attack can crack the EPC tag's passwords using techniques described by Oren and Shamir in their IEEE paper Power Analysis of RFID Tags. The main significance of Power Analysis attack is in its implications—any cryptographic functionality built into tags needs to be designed to be resistant to power analysis, and achieving this resistance is an undertaking which has an effect both on the price and on the read range of tags. Fortunately there are EPC Class 1 Gen 2 tags available that do not have this problem, and still exhibit excellent range at very competitive prices.

An additional anti-cloning feature of Gen2 tags that was somewhat of a deterrent to duplication of legitimate tags was the use of factory-programmed serial numbers in the TID memory bank. For awhile, the chip manufacturers only offered Read-Only Memory (ROM) in the TID bank, making it infeasible for counterfeiters to copy both the EPC and TID of a legitimate RFID tag. It is expected that at least one chip and inlay manufacturer will sell EPC inlays with a reprogrammable TID Memory Bank, making EPC Gen2 tag cloning a simple matter of 'skimming' valid number pairs from populations of authentic RFID tags.

In U.S. Patent Application Publication Number 20080001724, Mohammad Soleimani and Joseph White of Symbol Technologies, Inc. disclose a verbose, obvious, and logical extension of the EPC™ Radio-Frequency Identity Protocols, Class-1 Generation-2 UHF RFID, Protocol for Communications at 860 MHz-960 MHz. They disclose a read lock state for a tag that disables that tag from transmitting identifying information from the EPC memory, TID memory, and/or user memory in a manner that mimics the existing read lock functions for the kill and access passwords that are currently defined in that EPC Protocol Specification.

In U.S. Patent Application Publication Number 20090033464 by Ulrich Friedrich the inventor discloses an RFID transponder with controlled access to a tag's memory areas using multiple passwords, locks, and attribute bits. This patent appears to be a useful but unnecessary extension of the existing EPC transponder specification in order to prevent duplication of legitimate RFID tags. In U.S. Patent Application Publication Number 20090033464 Friedrich describes protection of user memory with multiple passwords:

"Memory bank 11 forms the so-called user memory area (user memory), in which any information to be determined by a user can be stored. Memory bank 11 can be partitioned individually by a user into memory subareas I, II, . . . , N and a password area. In other embodiments, partitioning is done by a manufacturer. The individual memory subareas. I, . . . , N can thereby each be assigned an access password."

This is in contrast with the present invention which uses the existing EPC specification with a single password to protect User Memory Bank 11.

Friedrich further states that:

"It is conceivable, furthermore, that a potential attacker attempts to read data from a transponder in order to thus duplicate the transponder, for example, to place counterfeit products in circulation or to commit sabotage. Also for this reason it is desirable in many cases that, apart from passwords stored in the transponder, other data are also not freely accessible to all individuals."

This is in contrast to the present invention that works on existing RFID tags that are built to EPC specifications whereby the memory banks are all readable, and only the password banks have limited read access as determined by the state of the lock bits.

In U.S. Patent Application Publication Number 20080196106 Ulrich Friedrich discloses another type of EPC tag variant with a shadow memory to hide information that would authenticate RFID tags so long as others could not find the hidden memory locations within the RFID tag.

In U.S. Pat. No. 7,205,897 by Tao Lin, and assigned to SAP Aktiengesellschaft of Walldorf, Deutschland the inventor teaches a method of detecting the presence of counterfeit goods in the auto-ID system based on a determination that progress of the asset through the auto-ID system has not followed the predetermined path. The patent makes use of the well-known EPC Information Services (EPCIS) layer that allows the exchange of EPC data over a network. That is, EPCIS provides a standard format or protocol by which a reader that has identified an EPC number may find and use information about that number and about its associated item. EPCIS is used in this patent to oversee information events and store them in an EPCIS repository. The repository accumulates data over relatively long periods of time during which the data may not be immediately useful to any particular application or device. Generally speaking, a flow of information for a number of objects may be too great for the repository to be practically useful in real-time, particularly given potential network delays. Data queries have access to an Object Naming Service (ONS), which is a look-up service that allows authorized tracking applications to find information about a product, based on the EPC code for that product. The ONS may have different levels of information, which may be classified. The short falls of this method of determining the authenticity of products is very network and server-intensive, and requires an omniscient overseer role to be performed by a global data processing entity. As difficult and impractical as all this may be to implement, it is even more unlikely that retailers will opt to open an EPCIS portal to such an overseer if they believe that it is possible that they would be caught selling counterfeit goods—even if it is not directly their own fault.

Christopher J. Diorio et al discloses a method in his U.S. Pat. No. 7,633,376 entitled "Reporting on Authentication of RFID Tags for Indicating Legitimacy of Their Associated Items" that depends upon a real time database connection to perform the required authentication functions. The present invention does not require a real-time infrastructure as required by the prior art. The prior art is at the mercy of the associated time delays and global database connection uncertainties of their proposed infrastructure.

Christopher J. Diorio et al also discloses methods for secure communication with RFID tags by using noise-encrypted RF carrier signals in U.S. Patent Application Publication Numbers 2005/0058292 and 2007/0177738. Both of these methods involve the transmission of a noise signal that is separated from the received signal waveform by an authorized reader. In contrast, the present invention takes advantage of the close proximity of a transponder to the near field coupler to inject noise into the surrounding environment to thwart eavesdropping attacks.

In U.S. Pat. No. 7,073,712 Jusas et al. teach an RFID encoding/verifying apparatus comprising: a platform for positioning RFID containing stock including barcodes upon; a feeder positioned on said platform for advancing said RFID containing stock: a motor in communication with said feeder for advancing said RFID containing stock a predetermined distance when activated. Although barcodes are scanned and RFID transponders are encoded, the inventors are stuck with having to VOID products that have an RFID transponder that will not encode properly, resulting in waste and disposal of goods. This is in contrast to the present invention that encodes transponders and only uses and applies to the goods fully operational transponders. This patent also fails to address the anti-counterfeiting measures that are needed to assure that valid RFID transponders are not duplicated, as would be the goal of modern day pirates.

In U.S. Pat. No. 7,360,714 Sano et al. teach a label issuing apparatus, comprising: a sensor for detecting a container or a container carrying an RFID tag, the sensor outputting a detection signal when the sensor detects the container; a printer; and an RFID tag reader/writer. This tag encoding solution suffers from the same short comings as the Jusas '712 solution in that the RFID tags are encoded when they are already attached to a target container. Similarly Curt Carrender's U.S. Pat. No. 7,055,750 has the same limitations, plus any RFID transponder failures require at a minimum some amount to rework. This patent also fails to address the anti-counterfeiting measures that are needed to assure that valid RFID transponders are not illegally duplicated.

U.S. Pat. No. 6,848,616 by Tsirline et al., U.S. Pat. No. 7,320,432 by Sureaud et al., U.S. Pat. No. 7,066,667 by Chapman et al., and application 2005/0280537 by Feltz et al. are representative of a broad class of prior art that combines RFID transponder encoding with printing functions and devices. The printing functions are not required for RFID transponders to function. Printing hardware, consumable materials such as ribbons, ink, and paper all unnecessarily add to the cost, weight, size of equipment and the resulting transponders. Adding paper faces to an RFID inlays increase the size and weight by a factor of two, three, or more depending on how large the paper overlay is. The printing mechanisms which in order not to incur a throughput penalty add weight and bulk to tagging equipment that prevents mobility and ease of use that are readily available to the user in the present invention. These patents as with other printer/encoder patents neither anticipate the need for nor solve transponder or item counterfeiting problems. The use of these unsecured devices threatens to compound global counterfeiting problems by encoding transponders in a manner that leaves tags as easy targets for illegal copying and cloning on a massive scale.

In U.S. Pat. No. 6,963,351 inventor Squires proposes the use of identification tags on a supply of consumable items that allows the consumable production equipment to recognize the loaded consumable supply items. The equipment can then initiate a variety of activities that are based on the loaded supply item. In addition, Squires describes a feature that allows the production equipment to write to the identification tag, as in the case of updating the count of remaining supplies. Squire in no way recognizes the scenario of someone maliciously duplicating the tag that identifies the consumable item. With this prior art, the identification tag cannot be assured to represent an authentic supply of consumables. This is opposed to the present invention which uses encryption means on a supply identification tag to assure an authentic supply of consumables and an authentic count of consumables remaining. This level of protection is vital to ensure a secure RFID encoding system, thus preventing counterfeits and protecting brand identity.

In U.S. Patent Application Publication Number 2002/0059880, inventors Klinefelter et al describe a card supply for use with an identification card printing system comprising: a card hopper containing a stack of cards; and a supply circuit mounted to the card hopper and having a memory containing supply information relating to parameters of the card supply. This patent application, as well as the previously mentioned U.S. Pat. No. 6,963,351, in contrast to the present invention fail to address the challenges of using a radio frequency identification transponder to provide information about encoding a supply of unencoded RFID transponders. In the present invention the same RFID interrogator that is used to encode RFID transponders is also capable of reading an RFID transponder mounted to the loaded cartridge, and is also preferably capable of filtering out its response to the interrogation or programming of the RFID transponders supplied by the cartridge.

In published U.S. Pat. No. 7,664,257, inventors Hohberger and Tsirline disclose a system for authenticating consumable media such as plastic cards, ink, or ribbon cartridges that include an anti-piracy deterrent. The inventors disclose the use of RFID transponders with anti-collision protocols but fail to anticipate that the consumable media could also be a supply of RFID transponders. This is evident in the omission of any attempt to filter out or separate responses from transponders that are themselves consumable media, nor do Hohberger and Tsirline address the challenges of encoding such consumable media using the same interrogator that is used to identify the supply of media. The present invention addresses and solves these challenges.

Those skilled in the art know that modern standards for protecting computing devices from cryptographic attacks were not published until the National Institute of Standards and Technology published the Security Requirements for Cryptographic Modules, Federal Information Processing Standards (FIPS) Publication 140-1 on Jan. 11, 1994. Therefore prior art for using authentication of items prior to that date is unlikely to include the scope and depth of the FIPS standard. Furthermore since the prior art listed below is generally for protection of consumable inks and media for printing, the prior art fails to anticipate the need for anything more than a minimal level of security and certainly not to a degree that would require military-grade cryptographic key management and tamper detection countermeasures for the cryptographic module. Such concerns would not come for another decade or more when the technological expertise of commercial counterfeiters has escalated to include the ability to efficiently reverse engineer smart phones and other high value consumer products for mass replication. If the inventors of that prior art had anticipated that their RFID-based authentication schemes were up to the task of protecting RFID tags from counterfeiting operations and unauthorized cartridge refills, then the scope and magnitude of their anti-counterfeiting measures would have been more comprehensive and suitable for preventing counterfeiting of RFID tags on valuable commercial goods. In contrast to the present invention that uses a highly secure single chip cryptographic module, the prior art fails to teach what parts of the RFID tag authentication mechanisms even require protection from attackers, much less how it would be accomplished. The absence of these critical security elements renders the authentication mechanisms disclosed therein completely useless for solving the problems that are for the first time solved by the comprehensive security system of the present invention.

The following list of prominent prior art obviously lacks the anti-counterfeiting foresight or means to do more than superficially authenticate RFID transponders or consumable media materials or to thwart the capabilities of modern counterfeiting operations: U.S. Pat. No. 6,227,643 Intelligent printer components and printing system, May, 2001 by Purcell et al.; U.S. Pat. No. 6,312,106 Method and apparatus for transferring information between a replaceable consumable and a printing device, November, 2001 by Ray Walker; U.S. Pat. No. 6,409,401 Portable printer with RFID encoder, June, 2002 by Petteruti et al.; U.S. Pat. No. 6,687,634 Quality monitoring and maintenance for products employing end user serviceable components, February, 2004 by Borg; U.S. Pat. No. 6,694,884 Method and apparatus for communicating between printer and card supply, February, 2004, by Klinefelter et al.; U.S. Pat. No. 6,708,005 Image forming apparatus and method of controlling memory thereof, March, 2004, by Chihara; U.S. Pat. No. 6,714,745 Image forming apparatus having a plurality of image forming stations, and unit detachably mountable on the apparatus, March, 2004 by Sasame et al.; U.S. Pat. No. 6,722,753 Method and apparatus for checking compatibility of a replaceable printing component, April, 2004, by Helterline et al.; U.S. Pat. No. 6,735,399 Post-launch process optimization of replaceable sub-assembly utilization through customer replaceable unit memory programming, May, 2004, by Tabb et al.; U.S. Pat. No. 6,738,903 Password protected memory on replaceable components for printing devices, May, 2004, by Haines; U.S. Pat. No. 6,748,182 Replacing part containing consumable part and image forming apparatus using replacing part, June, 2004, by Yoshida et al.; U.S. Pat. No. 6,791,704 Method and device for managing printing product resources available in a printer, September, 2004, by Moreau et al.; U.S. Pat. No. 6,793,307 Printer capable of forming an image on a receiver substrate according to type of receiver substrate and a method of assembling the printer, September, 2004, by Spurr et al.; U.S. Pat. No. 6,798,997 Supply ordering apparatus, September, 2004, by Hayward et al.; U.S. Pat. No. 6,802,659 Arrangement for automatic setting of programmable devices and materials therefor, October, 2004, by Cremon et al.; U.S. Pat. No. 6,807,380 Wireless communication system and image forming device, October, 2004, by Iida et al.; U.S. Pat. No. 6,808,255 Storage of printing device usage data on a printing device replaceable component, October, 2004, by Haines et al.; U.S. Pat. No. 6,820,039 Facilitating device upkeep, November, 2004, by Johnson et al.; U.S. Pat. No. 6,832,866 Printer or laminator supply, December, 2004, by Klinefelter et al.; U.S. Pat. No. 6,879,785 Image forming apparatus having reusable unit and reusable unit with indicator of record on use, April, 2005, by Ito et al.; U.S. Pat. No. 6,894,711 Thermal transfer recording web roll, May, 2005, by Yamakawa et al.; U.S. Pat. No. 6,932,527 Card cartridge, August, 2005, by Pribula et al.; U.S. Pat. No. 6,954,533 Electronic identification system and method with source authenticity, October, 2005, by Turner et al.; U.S. Pat. No. 6,963,351 Radio frequency identification tags on consumable items used in printers and related equipment, November, 2005, by Squires; U.S. Pat. No. 6,986,057 Security device and method, January, 2006, by Cusey et al.; U.S. Pat. No. 7,018,117 Identification card printer ribbon cartridge, March, 2006, by Meier et al.; U.S. Pat. No. 7,031,946 Information recording medium, non-contact IC tag, access device, access system, life cycle management system, input/output method, and access method, April, 2006, by Tamai et al.; U.S. Pat. No. 7,147,165 Adapting element for programmable electronic holders, December, 2006, by Mongin et al.; U.S. Pat. No. 7,183,505 Adapting element for programmable electronic holders and use in a multipurpose personalization machine February, 2007 Mongin et al.; US application 2002/0062898 RF tag application system, May, 2002, by Austin et al.; US application 2004/0109715 Identification card printer and ribbon cartridge, June, 2004, by Meier et al.; US application 2004/0114981 Identification card printer ribbon cartridge, June, 2004, by Meier et al.; US application 2005/0275708 Radio frequency identification tags on consumable items used in printers and related equipment, December, 2005, by Squires et al.; US application 2006/0123471 Credential production using a secured consumable supply, June, 2006, by Fontanella et al.; US application 2007/0056027 Securely processing and tracking consumable supplies and consumable material, March, 2007, by Nehowig et al.; US application 2007/0057057 SYNCHRONIZATION TECHNIQUES IN MULTI-TECHNOLOGY/MULTI-FREQUENCY RFID READER ARRAYS, March, 2007, by Andresky et al.; WO/2001/057807 METHOD OF AUTHENTICATING A TAG, August, 2001; and WO/2003/019459 METHOD AND APPARATUS FOR ARTICLE AUTHENTICATION, March, 2003.

Prior art methods of controlling counterfeit goods have been similar to how counterfeit bar codes are detected. Counterfeit bar codes have long been a problem when used on tickets for events and ski resorts. The problem was eliminated when a database was kept online and queried for each serialized bar code scanned at the gate. Any second occurrence of the same bar code would be treated as a duplicate (even if it was the original) and the person was refused entry. That same solution cannot be practically used because there is no focal point of entry, duplicates would have to be checked for throughout the world, in flea markets and pawn shops everywhere. This is approach is heavily networked, requires overlord authorizations with multiple retail outlets, feet on the street, and is very expensive and impractical.

If a cryptographic engine could be placed onto an RFID tag, and a challenge-response authentication process can be utilized whereby the challenger can be certain that the challenged RFID tag in fact bears the secret code without directly divulging it, then the authenticity can be confirmed with a very high degree of confidence. However, the scope of this invention disclosure relates to RFID tags that lack a cryptographic engine, and only have publicly observable information.

So, despite recent advances in RFID technology, the state-of-the-art does not fully address the needs of authenticating wireless sensors that are already in broad public use. Large-scale adoption and deployment of RFID transponders depends on brand owners realizing substantial new levels of supply chain security that surpasses the short comings of traditional anti-counterfeiting technologies and methods.

The same novel ideas used to thwart counterfeiting can be used to protect retailers from corporate espionage, at the same time protecting consumer privacy. The questions have been asked, "Would one retailer spy on another to gain market knowledge?" "Would criminals use RFID to select which home they want to break into?" And the answer to both of these questions is yes; these are two examples of the many security risks to both retailers and their customers. This is the risk that is presented by the using the Electronic Product Code (EPC) with the unprotected Unique Item Identifier (UII) in retail supply chains or beyond the public space of the retail sales floor.

The retailer competitive intelligence scenario was foreseen by Ross Stapleton-Gray of Stapleton-Gray & Associates, Inc. and disclosed in the article "Would Macy's Scan Gimbels? Competitive Intelligence and RFID" dated 1 Dec. 2003 in Issue 44 of scip.online. This article was originally presented to the RFID Privacy Workshop at MIT, Nov. 15, 2003 sponsored in part by the MIT Computer Science and Artificial Intelligence Laboratory, MIT Media Lab, and RSA Laboratories.

Competitive intelligence, on the inventory of a retailer, both its type, and turnover, may be of interest to retail competitors, to suppliers, and to manufacturers, as well as to third party companies collecting data for analysis. (Note: EPC scanning in the store would only provide unique identifiers of tagged items, though that is sufficient to identify the manufacturer, and product type—through repeat scans over time, one could gauge product turnover . . . ).

An ideal solution, as far as suppression of "leakage" of information (short of no RFID tags whatsoever) is use of store-specific tags, i.e., tags whose values are understandable only with access to the store's internal information systems. Recoding RFIDs would include:
reprogramming reprogrammable tags with "store internal" values mapped to the actual EPCs
killing non-reprogrammable tags
affixing tags with "store internal" values to items, either those whose tags were killed, or which have never borne RFID tags, where in-store monitoring is desired
The first action could be performed at any of several points, such as when stock is received, in inventory, on the shelves, etc., with minimal effort (assuming some RFID management infrastructure including a reader capable of rewriting tags). It could also be performed piecemeal, and over time: any time a store reader encounters a reprogrammable tag with an EPC, it can reprogram it to a store-internal value. The store's information systems would hold the two values (original EPC, and in-store assignment) as equivalent. If killing tags is required by point-of-sale to address consumer privacy concerns, there is no reason it might not be done earlier, e.g., as stock is moved out to the shelves.

Stapleton's article fails to address the needs of the retailer in a retail setting to hide the EPC code of the tag in an encrypted form, while still allowing the retailer to convert the encrypted identity back to its original EPC code without using a database to map the conversion from a public identity to a store-internal value. Using such a database relies on network timing, many times an open internet connection with non-deterministic network delays.

In U.S. Pat. No. 7,034,689 inventors Bertrand Teplitxky and Lawrence G. Martinelli disclose a product security system, comprising a radio frequency identification tag with long-chain cross-linked polymers that entangle the tag in the packaging such that attempts to open the product container or remove the RFID chip and tuned antenna breaks the antenna and renders the RFID chip inoperable. This prior art filed in 2004 differs from the present invention by focusing on tamper-evident attachment methods instead of a plurality of authentication means and methods disclosed herein.

In U.S. Patent Application Publication Number 20070152033 entitled 'Merchandise-Integral Transaction Receipt and Auditable Product Ownership Trail' inventors Hind, Stockton, and Marcia disclose and claim a system for establishing a secure electronic transaction receipt for a product, comprising: a means for accessing a product-integral ownership record to determine a current owner of the product; a means for securely revising the product-integral ownership record to reflect a new owner of the product. The product itself carries a traceable, auditable, non-forgeable, non-reputable proof of ownership. This recorded ownership transfer information provides an electronic receipt, which may be used by the present owner to prove his or her ownership. The prior art does not fully address the needs of the retailer in a retail setting to hide the EPC code of the tag in an encrypted form, while still allowing the retailer to convert the encrypted identity back to its original EPC code when desired (i.e. when a consumer returns a product). Instead, the patent addresses the need for establishing secure electronic transaction receipts for proof of ownership. Useful for product returns, but again, the prior art does not reduce the risk of exposing the retailer's inventory by hiding EPC reads from competitors.

In U.S. Pat. No. 6,995,652 entitled 'System and method for controlling remote devices" inventors Carrender, Gilbert, Scott, and Clark disclose and claim an RFID control system for controlling an operable object in response to interrogation and control signals from a remote RFID interrogator. The inventors propose a system and method for controlling remote devices utilizing an RFID tag device having a control circuit adapted to render the tag device, and associated objects, permanently inoperable in response to radio-frequency control signals. The prior art claims a novel way to 'kill' an RFID tag, however; the prior art does not address the needs of the retailer in a retail setting to hide the EPC code of the RFID tag. To kill a product's RFID tag while still on shelf would eliminate any way for a retailer to track inventory using RFID means.

In U.S. Pat. No. 7,411,503 entitled 'System and method for disabling data on radio frequency identification tags' inventors Stewart, Rolin, and Carrender disclose and claim a method for disabling a portion of an RFID tag for privacy, comprising: the performing of an anti-collision procedure to select a tag from a plurality of tags, the selected tag identifying an item for purchase; receiving a cyclical redundancy check and a kill instruction by the tag, the kill instruction including an algorithmically calculated code unique to the selected tag; verifying the kill instruction is valid; and if the kill instruction is valid, disabling the at least a portion of the tag to provide privacy after a purchase. Wherein they state that the disclosed embodiments of the invention are used to permanently disable or destruct a RFID tag so that it is no longer possible to read some or all of the data encoded on the RFID tag. However, the invention does not fully address the needs of the retailer in a retail setting to hide the EPC code of the tag in an encrypted form, while still allowing the retailer to convert the encrypted identity back to its original EPC code when desired (i.e. when a consumer returns a product). Instead, the invention only addresses the need for consumer privacy by permanently disabling portions of the RFID tag. Note that in the present invention, by 'flipping' the EPC code of an RFID tag, a consumer's privacy is protected as the RFID tag is not publicly recognized or decodable.

In U.S. Pat. No. 7,425,897 entitled 'Radio frequency identification (RFID) device with a response stop command' inventors Fukushima, Takami, and Moritani disclose and claim a RFID device that is capable of stopping and restarting a response via a response stop command. The device is capable of using command data from an external communication equipment to look up response restart data at the restart of a response, deciding a data storage area and content that may be initialized when the restart is possible, and rewriting a data storage portion. The prior art addresses the need to implement a start/stop command response within an RFID tag; another way of 'killing' an RFID tag to protect consumer privacy without permanently disabling the RFID tag. However, the invention does not fully address the needs of the retailer in a retail setting to hide the EPC code of the tag in an encrypted form while still allowing the retailer to quickly revert the encrypted tag ID back to the original EPC code.

In U.S. Pat. No. 7,477,151 entitled 'RFID device with changeable characteristics' inventors Forster and Sasaki disclose an RFID device that includes a relatively permanent portion and a second alterable or inactivatable portion. Upon the occurrence of some predetermined event, the second portion and/or its coupling to the first portion is physically altered, inactivating it. The first portion may itself be an antennaless RFID device that may be read at short range, and the second portion may be an antenna that, when coupled to the first portion, substantially increases the range at which the first portion may be read. The patent introduces a novel way of altering an RFID tag's read range, which might protect consumer privacy to some degree. However, the invention does not address the needs of a retailer in a retail setting to hide the EPC code of the tag in an encrypted form while still being able to read an RFID tag at a significant distance. If a retailer was only able to read an RFID tag at short range, they lose the inherent benefit of RFID to take inventory quickly and easily.

In U.S. Pat. No. 5,874,902 entitled 'Radio frequency identification transponder with electronic circuit enabling disabling capability' inventors Heinrich, Capek, Cofino, Friedman, McAuliffe, Sousa, and Walsh describe an RFID tag which has an enable/disable circuit connected to a critical part of an electronic object/circuit, e.g. a computer mother board. Signals are sent to the tag to change data in the tag memory which causes the enable/disable tag circuit to control the critical part to enable and disable the electric circuit. The prior art is a method for altering the RFID tag in an 'on and off' manor by enabling and disabling the vital circuitry within the RFID tag chip. The novel ideas of the prior art do not address the need of the retailer in a retail setting to hide the EPC code of the tag in an encrypted form, while still allowing the retailer to convert the encrypted identity back to its original EPC code when desired. To turn an RFID tag 'off' while still attached to a product in a retail setting would eliminate the benefit of the retailer to quickly and easily take RFID readings for inventory.

In U.S. Pat. No. 6,025,780 entitled 'RFID tags which are virtually activated and or deactivated and apparatus and methods of using same in an electronic security system' inventors Bowers and Clare disclose and claim an electronic security system that uses a set of predefined RFID tags. Each tag includes unique tag information which is logged into a computerized database that contains a record for each of the tags in the set. When an RFID tag is detected, the database records are compared to the tag information and an appropriate database response is output. A deactivation event may be performed on the tag when legitimate access is obtained to the tagged article. The deactivation event may be electronic, physical or virtual. In summary, the prior art comprises a database system to recognize when and how to disable a tag. Like most other prior art in this area, the inventors have discovered a novel way of disabling an RFID tag, but have not addressed both the needs of the retailer and the consumer by hiding the publicly decodable EPC information while not disabling the RFID tag from being read.

In U.S. Pat. No. 6,181,248 entitled 'Deactivatable article security label with data carrier function' inventor Fockens discloses and claims an article security label comprising a resonance circuit including a coil and a capacitor, and a semiconductor memory and switching circuit connected to the resonance circuit for activating and deactivating the label, the semiconductor memory and switching circuit having a memory function and a switch function, wherein the open or closed state of the semiconductor memory and switching circuit determines whether the label is activated or deactivated. The inventor states that the invention relates to an article security label adapted for repeated activation and deactivation using a semiconductor memory element. Essentially the invention comprises a way to disable and enable portions of a security label (e.g. RFID tag). The invention falls short in not being able to hide the public EPC code while still allowing the label to be read.

In U.S. Pat. No. 6,933,848 entitled 'System and method for disabling data on radio frequency identification tags' inventors Stewart, Rolin, and Curtis disclose and claim an RFID system, wherein one method, an RFID tag is identified and its identity is confirmed. Verification that a prerequisite event has occurred is obtained, occurrence of which is required prior to disablement of the data. A destruct instruction is transmitted to the RFID tag. The RFID tag verifies that the destruct instruction is valid and disables the data upon verifying validity of the destruct instruction. The tag may disable the data by erasing the data, disabling the data, auto-destructing, or performing any operation that makes the data unreadable. The prior proposes a novel way to disable a tag, but does so permanently such that the RFID tag cannot be reactivated with preexisting data intact. The invention falls short in many ways of ensuring retailer and consumer privacy. For example, no longer is an RFID tag able to be read for product returns.

In U.S. Pat. No. 7,012,531 entitled 'Product label, method of producing product labels and method for identifying products in a contactless and forgery-proof manner' inventors Fries and Houdeau disclose and claim product label (i.e. RFID tag) comprising: an antenna operatively connected to said semiconductor chip, said antenna having a cross-section and a predetermined breaking point with the antenna being destructible at the predetermined breaking point. The result is a method that mechanically alters the antenna on an RFID tag, intended for producing product labels and a method for contactless, forgery-proof identification of products. However, the invention does not fully address the needs of the retailer in a retail setting to hide the EPC code of the tag in an encrypted form, while still allowing the retailer to convert the encrypted identity back to its original EPC code when desired (i.e. when a consumer returns a product).

In U.S. Patent Application Publication Number 20020067264 entitled 'Tamper Evident Radio Frequency Identification System And Package' inventor Soehnlen discloses and claims a system to recognize a breach of integrity of a package, wherein an attempt to enter the package disables the package's identification tag and will cause the identification tag, thereafter interrogated, to fail to send a signal or will send a signal that is different from the predetermined signal. Such a novel idea may partially address the concerns of consumer privacy by disabling the RFID tag. However, the invention does not address the needs of a retailer to hide the publicly decodable EPC identifier while the packages are stocked in the retail store.

In U.S. Patent Application Publication Number 20050242957 entitled 'Deactivating a data tag for user privacy or tamper-evident packaging' inventors Lindsay et. al., U.S. Patent Application Publication Number 20050275540 entitled 'Secure radio frequency identification device for identity booklet or object to be identified' inventors Halope et. al., U.S. Patent Application Publication Number 20060017570 entitled 'Enabling and disabling a wireless RFID portable transponder' inventors Moskowitz et. al., U.S. Patent Application Publication Number 20060061475 entitled 'System and method for disabling RFID tags' inventors Moskowitz et. al., U.S. Patent Application Publication Number 20060132313 entitled 'System and method for altering or disabling RFID tags' inventor Moskowitz, and in U.S. Pat. No. 7,629,888 entitled 'RFID device with changeable characteristics' inventors Forster et. al. disclose novel ideas which mechanically alter the antenna on an RFID tag to protect consumer privacy. Even if the alteration is reversible, the prior art fails to address the privacy needs of a retailer to hide the publicly decodable EPC identifier while the RFID tag and associated product are stocked by the retailer. To disable the RFID tag while on shelf would eliminate the retailer from easily and quickly taking inventory at the item level.

In U.S. Patent Application Publication Number 20080181398 entitled 'METHODS AND APPARATUS FOR ENHANCING PRIVACY OF OBJECTS ASSOCI- ATED WITH RADIO-FREQUENCY IDENTIFICATION TAGS' inventor Pappu discloses and claims a method for encoding a plurality of radio-frequency identification (RFID) tags, each of the RFID tags having a tag identifier, the method comprising: (a) generating a key; (b) encrypting each of a plurality of tag identifiers, using the key, (c) selecting a threshold value, T, less than the number of tag identifiers comprising the plurality of tag identifiers; (d) dividing the key into a plurality of key shares such that retrieval of T or more key shares allows the key to be reconstituted; and (e) encoding each of the plurality of RFID tags with a concatenation of the encrypted tag identifier and one of the key shares. The novel idea would not be able to efficiently handle the throughput of encrypting and decrypting consumer package goods at the item level. The number of keys necessary for such a task would require an enormous database, constantly updated for each new RFID introduced, to be referenced each time a tag is decrypted. The time required to do so over a global, open network connection would put a retailer at a major economical disadvantage.

Most prior art addresses consumer privacy concerns by rendering portions of an RFID tag inoperable. Other prior art alters an RFID tag's read performance by mechanically altering its antenna. Though some of these mechanical methods are reversible, they don't protect the retailer from competitor reads. Prior art that disclose encryption methods for hiding an RFID tag's unique identity generally do not recognize the throughput and scalability requirements of tagging consumer package goods at the item level. A retailer is not able to afford the time to query a real time database over an open, global network connection. The present invention does not require such a real-time infrastructure and the associated time delays and connection uncertainties. In conclusion, none of the prior art introduces novel ideas to efficiently and cost effectively encrypt an RFID tag's unique numbering to protect the retailer from competitor reads and to protect the consumers' privacy.

International Publication Number WO2009/052059 discloses an RFID tag authentication method using publicly readable numbers, encryption, and encrypted passwords. This invention fails to solve the real world authentication problems because it is vulnerable to cyber attacks. Inventor Oberle's method fails to provide for cryptographic key changes or controls on the pools of seed values, whereby exposing that solution to multiple forms of cyber attack. This is in contrast to the present invention that anticipates that some attacks will be successful and provides for frequent key updates that are synchronized with downstream readers using an index number that is stored in the tag's memory. Oberle does not provide any type of index number means. Oberle solves the replay attack problem by adding a counter to the tag whereas the present invention uses an EPC tag's random number generator and cover coding.

US Patent Application US 2007/0052523 teaches an RFID tag encryption system and method using an index and a header in plaintext form at the server/reader level, but is stored on the RFID tag as a combined encrypted ID. This is in contrast to the present invention that uses an unencrypted plaintext index number stored on the RFID tag that is used by the reader as an index into an indexed table of cryptographic keys for a cipher to produce passwords to access or kill the tag. Unlike the present invention, this prior art does not disclose tag passwords or secure memory.

US Patent Application US2006/0087407 teaches a solution for RFID tags to be password carriers for RFID readers to access other RFID tags transported in the same shipment. It describes the problem to be solved, but fails to disclose block ciphers, an indexed table of cryptographic keys, or a plaintext index stored on a tag that is to be accessed, authenticated, or killed.

SUMMARY OF THE INVENTION

The present invention is an RFID tag security system with two major purposes:
  Secure and efficient encoding of RFID tags with unique identifiers and secret passwords;
  reversibly changing an unprotected UII to an encrypted UII, the ability to 'flip' between unprotected UII and an encrypted UII Secure and efficient encoding of RFID tags for item-level supply chain tagging on a global scale requires the issuance of encoding authorizations, protection of tag secrets, and flexibility in the communication of critical information as taught in the present invention.

RFID tags with SGTIN encoding convey a certain level of confidence that the products that they are attached to conform to quality and ethical standards that are established by their brand owners. The brand owners are responsible for the brand quality and also for making certain that the company and people that produce them adhere to established quality control standards. The brand owners are also interested in knowing that their high quality products are not being sold to their customer based by their supplier.

There are the following types of counterfeit products:
  Those without RFID tags
  Those with factory-made RFID tags
  Those with RFID tags that were duplicated in distribution Brand protection requires secret information that is observable by authorized individuals, preferably at a distance, and with high throughput. Numerous anti-counterfeiting technologies exist, but none have struck a successful commercial balance between these three key attributes:
  1. Cost
  2. Inspection range
  3. Effectiveness The novelty of this invention is the optimization of all three of these key attributes in a unique manner so as to provide a powerful and cost effective deterrent to counterfeiting. The present invention combines remote item sensing, definitive item authentication, and heuristics; where heuristics strategies are used on readily accessible, though partially interrelated, information to automatically assess from a distance the probability that goods are counterfeit. The heuristic information is collected and assessed over time, using a large number of field samples. This will be discussed in more detail below.

The present invention also combines secure key management procedures, and methods of making counterfeit tags more difficult to pass as being authentic. Secure RFID tag authenticator 17 is disclosed for use to determine if supply chain goods have an authentic RFID tag on them or not. Secure RFID tag authenticator 17 is intended to be used by a brand owner, a distributor, a retailer, a secure authentication kiosk for consumers, or a law enforcement officer that is accepting receipt of or inspecting goods 22a from a supplier.

Referring to FIG. 2 a novel anti-counterfeit system 20 is disclosed wherein goods such as sellable item 22a are tagged with radio frequency identification (RFID) tag 70 in "manufacturing plant or distribution point A" 21 and are subsequently scanned for authenticity at a second location "distribution point B or retail facility" 19. RFID tags are used to identify and authenticate goods, including pallets, cases, inner packs, and sellable items (or sellable units, or sales units). Sellable item 22a is an example of a sellable item that was previously tagged at "manufacturing plant or distribution point A" 21 using RFID tag 70.

Management Station 12a in Manufacturing Plant or Distribution Point A 21 is used to control the authorizations for operation of Secure Tag Encoder 16. Authorizations include enablement of encoding a certain number of tags for a given specified list of SKU's and enablement of certain persons as authorized operators of secure encoder 16. In the case of manually applied tags, operators are preferably enrolled at Management Station 12a, creating a record for each operator. In preferred embodiments, Fingerprint Scanner (FPS) 12c of Management Station 12a is used to create an operator-specific uniquely numbered computer record that contains a specification of the fingerprint of the finger or fingers that the operator normally uses to remove an encoded RFID tag from secure encoder 16. That record is preferably stored in Fingerprint Database 69 of Security Server 10a. Additional biometric information, such as face, eyes, retina, iris, or voice are preferably also sensed and collected by BIO sensor 12d and stored in Security Server 10a to provide additional identifying characteristics of each operator. In other preferred embodiments, biometric sensors (not shown) are installed on Secure Tag Encoder 16 and communicated with Secure Server 10a for a variety of security purposes.

Each operator preferably logs into Secure RFID Tag Encoder 16. There are a wide range of methods for securely logging in an operator that are well known to those skilled in the art. There are generally three types of login information that are used: passwords are what you know, security tokens are what you have, and biometrics are what you are. Using any secure combination of these, an operator can log into Secure RFID Tag Encoder 16. The result is that the operator's unique record number (that references Fingerprint Database 69) is then defined as the current Data Carrier Mark DCM 147d in Secure RFID Tag Encoder 16. RFID tags are bonded or attached to sellable item 22a in any of four ways:

1. Tags are encoded by Secure RFID Tag Encoder 16 and placed onto sellable item 22a manually using human labor.
2. Tags are encoded by Secure RFID Tag Encoder 16 and transferred directly onto sellable item 22a. Preferred embodiments of this type of Secure RFID Tag Encoder 16 are either handheld or fixed mounted to a conveyor line where sellable items travel past Secure RFID Tag Encoder 16 while being tagged in an automated manner.
3. Printed and chipless RFID transponders are encoded by Secure RFID Tag Encoder 16 as each sellable item 22a traverses along a production line and enters the encoding field of Secure RFID Tag Encoder 16 in a completely automated procedure.
4. Batch encoding a roll of tags for operators to apply in a secondary tagging process.

The embodiments described herein provide improved degrees of security for verification and authentication of tags 70.

Preferred embodiments of this invention include human readable messages to the consumer, the distributor, or anyone who is in a position of purchasing, procuring, or accepting delivery of sellable item 22a that warn that the absence of RFID tag 40 is an indication that the goods are counterfeit. Counterfeit Label 22b is preferably printed on the product or the packaging material, printed in the user's manual and on the warrantee card, and printed on the company's website. Possible forms of the message are:

Goods are considered counterfeit if a Radio Frequency Identification (RFID) tag is not present before delivery.

Authentic goods have an RFID tag located here. If one is not present please contact customer service at phone number xxx-xxx-xxxx to report counterfeit goods.

An anti-counterfeiting electronic tag should be located here, if not, then please return these goods for one that does.

The purpose of this invention is to increase the cost of counterfeiting to the point where it is too costly to conduct. This is achieved by allowing brand owners to easily and at low cost make changes to anti-counterfeiting marks and cryptographic keys so that the cost of detecting and duplicating or reverse engineering the brand owner's changes become prohibitively high for counterfeiters to continue their illegal activities. This rebalancing of costs combined with more effective law enforcement efforts will result in a global reduction in counterfeit goods.

Changes to cryptographic keys are inherently supported in the present invention, including ways to communicate key changes through the RFID tags themselves, without taxing the resources of a global online network for frequent database queries. The dissemination of RFID tags provides for an efficient, and now secure, method of distributing information about which cryptographic key sets are to be used on any given tag. There is no incentive for a counterfeiter to alter this since the default condition of a no-math result is that the goods are counterfeit and receipt of them is rejected, and payment will not be made to the supplier.

Cryptographic key changes are preferably frequent and at random and unpredictable times. The keys preferably have very high entropy and are generated by pseudorandom number generators.

An exemplary RFID tag for brand protection that has already gained wide commercial adoption is the EPCglobal Class 1 Gen 2 RFID tag. A complete description of the Gen 2-type tag can be found in EPC™ Radio-Frequency Identity Protocols, Class-1 Generation-2 UHF RFID, Protocol for Communications at 860 MHz-960 MHz," Version 1.0.9, EPCglobal, Inc., copyright 2004, which is incorporated by reference herein in its entirety.

Current Electronic Product Code (EPC) Class 1 Gen 2 RFID tags are vulnerable to fraud since there is nothing to prevent counterfeiters from copying the Unique Item Identifier (UII) product identification numbers such as EPC codes from one tag to another. Valid EPC numbers can for example be skimmed (i.e. copied) from a population of 'valid' RFID tags that are associated with authentic products, and copied onto similar data carriers (i.e. EPC Gen 2 RFID tags) and attaching them to counterfeit or knock-off products.

Referring now to FIG. 3, a counterfeit supply chain 30, counterfeit products are often made by the same manufacturer 21 that manufactures the same authentic goods for brand owner 32, except at a higher profit level. To many people and automated systems, the presence of a look-alike EPC Gen 2 RFID tag would be sufficient to allow even more efficient movement of fake products through alternate channel 34 of supply chains and be ultimately sold to unsuspecting consumers 35. In many cases counterfeit products are inferior to authentic products and pose a risk to the public and tarnish the brand image to the detriment of the brand owner 32. Also a significant financial loss is realized by brand owner 32 and retailer 19 for lost sales; consumer 35 is often lured to alternate channel 34 by prices that are lower than that of retailer 19. This is because the cost structures are very different when the established sales channel of brand owner 32 is illegally bypassed.

The presence of any of the warning messages like Counterfeit Label 22b on sellable item 22a described above will deter manufacturer 21 from not applying an RFID tag in order to avoid detection of goods through alternate channel 34. Therefore manufacturer 21 is likely to apply some sort of RFID tag in order to avoid simple visual detection of counterfeit goods in the alternate channel 34 by consumer 35. If manufacturer 21 opts to use other RFID tag encoding equipment other than secure RFID tag encoder 16 to clone a legitimate RFID tag 70 then the security functions of this invention will prevent sustained counterfeiting activities.

Referring again to FIG. 2, the present invention is an end-to-end supply chain visibility and product authentication system 20 to improve supply chain efficiency and to assist brand owners in the protection of their brand. At the front of the system is secure RFID tag encoder 16, and downstream in the supply chain is secure RFID tag authenticator 17; both are intermittently coupled through security server 10a. Real time connections are not required.

In addition to the owner of the tagged object facing the risk of counterfeiting, the owner has a finite amount of risk associated with having an inventory of RFID tags that bear a standard, unencrypted SGTIN. This is true whether the owner is a consumer, a retailer, or the United States Military. Although the EPC Gen2 specification did not specifically provide for encrypted identification information, the present invention discloses a secure way to change unencrypted EPC information into encrypted item-level information, and then convert it back to the original unencrypted form again if needed (e.g. such as store returns). The management of the cryptographic keys is the domain of the retailer or the U.S. Government, whichever is the channel master for the applicable supply chain. The present invention teaches best practices that are prescribed by FIPS 140-2, the Federal Information Processing Standards Publication 140-2 for SECURITY REQUIREMENTS FOR CRYPTOGRAPHIC MODULES.

Brand owners that purchase EPC numbers from GS1 accept a commitment to assure that each and every RFID tag is uniquely numbered. The present invention teaches a preferred set of devices and methods for securely managing the commissioning of RFID tags with unique numbers on a global scale, without presuming the availability of modern communication infrastructure such as the Internet, telephone, or GPRS.

The present invention teaches a method by which the Access Password that is forwarded from the tag encoding process is used by retailers or the U.S. Military (for example) to reversibly change the publicly observable EPC SGTIN into a cryptographically secured version of that representation.

Referring now to the flowchart of FIG. 23 there is a preferred method of processing any of four fundamental EPC RFID Tag 70 functions:

Encrypting the SGTIN (i.e. "Flipping" the identity)
Decrypting the encrypted SGTIN (i.e. "Unflipping the identity)
Decrypting tag encoding audit information, determining authenticity
Killing the tag The following method is for reversibly altering the identity from a publicly readable and decodable form to an alternate identity that is cryptographically related to the first identity. The alteration of the identity is based upon steps that access a changeable set of cryptographic keys that are locally stored in an RFID reader. This preferred embodiment has advantages over prior art that depends on fast network access to for example an EPC Information Services (EPCIS) network database implementations as recommended by EPCglobal. The goal of EPCIS is to enable various applications to utilize Electronic Product Code (EPC) data via EPC-related data sharing, both within and across enterprises. However, this requires frequent queries across one or more networks wherein multiple non-deterministic delays will be encountered, forcing the operator to wait for unknown and variable amounts of time. This ultimately slows the operator's productivity, causing even workers with the best of intentions to become frustrated and ineffective in the performance of their duties. This is in stark contrast to the present invention wherein network activity is a background task that does not hamper worker's productivity. This is accomplished by locally (i.e. preferably in a secure manner within each RFID Reader 17) providing all of the data that is required to perform the following functions.

The present invention meets the tacit requirements of product authentication demanded by retailers, government and consumers:

the costs and effort of using the authentication system remains low
authentication of tags encoded by third party (i.e. non-secure encoders) are supported
the system can be operated by multiple parties from multiple locations
the system maintains a level of security that limits counterfeits and malicious acts by properly managing the risk-return profile The source-to-shelf system disclosed herein provides for an efficient, secure, flexible, and scalable solution for encoding item-level RFID tags, including metal mount tags in remote factory environments, including secret passwords to enable authorized RFID interrogators to change or kill the RFID tags in retail environments. Furthermore, the change that authorized RFID interrogators can make to such RFID tags is encrypted, detectable, and reversible.

Information regarding the condition during the original encoding of the RFID tag (e.g. location, date, and time) is observable during audit functions by using cryptographic algorithms that enable privileged access to RFID tag data for auditing and forensic tag analysis.

Furthermore, the present invention works with a range of standard EPC Gen2 tag types and to an extent with third party (i.e. non-secured) RFID tag encoding equipment. Preferred embodiments use EPC Class 1 Gen 2 UHF RFID tags with 64, 128, or more bits of optional User Memory 74 and have both Access Password 71b and Kill Password 71a features for operating tag 70 in a secured state only when a valid Access Password 71b is sent to it.

RFID is an enabling technology for faster and more efficient supply chains by using uniquely numbered shipping containers and items that are read in large numbers simultaneously without requiring a direct line of sight. It is this presumption of uniqueness that is the central subject matter of this invention. If the numbers in the RFID tags are not unique, then false information is present on the goods and in the systems that track them from their sources to their destinations.

A key benefit of utilizing information from uniquely numbered items is that RFID enables improved top line sales to manufacturers and retailers by minimizing out-of-stock occurrences where a consumer's intent to purchase is adversely disrupted by the temporary unavailability of a product that they wish to purchase.

The example embodiments described herein are provided for illustrative purposes, and are not meant to be limiting. The examples described herein may be adapted to various types of radio frequency identification tags, transponders, encoders, and verifiers, for a variety of applications, including manufactured goods, retail goods, apparel, pharmaceuticals, and other products that are bought and sold. Derivative embodiments, including modifications or alterations, may become apparent to persons skilled in the art from the teachings herein. The word 'transponder' is in most cases interchangeable with the word 'tag', in reference to RFID tags.

Where the words are not interchangeable, the word transponder is used to convey a meaning where it is known that substrate layers and face stock that are typical of an RFID tag are not necessarily present, as in the case of a printed chipless transponder.

The systems, methods, and devices of the present invention utilize an RFID transponder or wireless sensors as a component. Certain RFID transponders and wireless sensors operate at Low Frequencies (LF), High Frequencies (HF), Ultra High Frequencies (UHF), and microwave frequencies. HF is the band of the electromagnetic spectrum that is centered around 13.56 MHz. UHF for RFID applications spans globally from about 860 MHz to 960 MHz. Transponders and tags responsive to these frequency bands generally have some form of antenna. For LF or HF there is typically an inductive loop. For UHF there is often an inductive element and one or more dipoles or a microstrip patch or other microstrip elements in their antenna structure. Such RFID transponders and wireless sensors utilize any range of possible modulation schemes including amplitude modulation, amplitude shift keying (ASK), double-sideband ASK, phase-shift keying, phase-reversal ASK, frequency-shift keying (FSK), phase jitter modulation, time-division multiplexing (TDM), or Ultra Wide Band (UWB) method of transmitting radio pulses across a very wide spectrum of frequencies spanning several gigahertz of bandwidth. Modulation techniques may also include the use of Orthogonal Frequency Division Multiplexing (OFDM) to derive superior data encoding and data recovery from low power radio signals. OFDM and UWB provide a robust radio link in RF noisy or multi-path environments and improved performance through and around RF absorbing or reflecting materials compared to narrowband, spread spectrum, or frequency-hopping radio systems. Wireless sensors are reused according to certain methods disclosed herein. UWB wireless sensors may be combined with narrowband, spread spectrum, or frequency-hopping inlays or wireless sensors.

To clarify certain aspects of the present invention, certain embodiments are described in a possible environment—as identification means for containers. In these instances, certain methods make reference to containers such as loaded pallets, paperboard boxes, corrugated cartons, pharmaceutical containers, and conveyable cases, but other containers may be used by these methods. Certain embodiments of the present invention are directed for use with steel drums, commercial corrugated shipping cartons, tagged pallet-loads of shrink-wrapped cases, consumer-goods packaging, consumer goods, automobile windshields, industrial components, or other methods of identifying objects using RFID transponders or wireless sensors, or both.

In certain embodiments the target surface to which a transponder will be attached is a container. In some applications the target surface is moving while the encoder device is stationary. Furthermore the moving target surface may be objects on a conveyor. In such an embodiment, the RFID tag encoder is fixed to an assembly line in a stationary manner. Accordingly, the stationary-mounted encoder further includes machine-controlled devices for extracting a commissioned RFID transponder from the encoder and places the transponder on the container of interest by means well understood in the art. In yet other embodiments the target surface may be a web of release liner from which encoded transponders will be later removed and applied to an object for identification.

DRAWINGS

DESCRIPTION OF THE INVENTION

Figure 4:
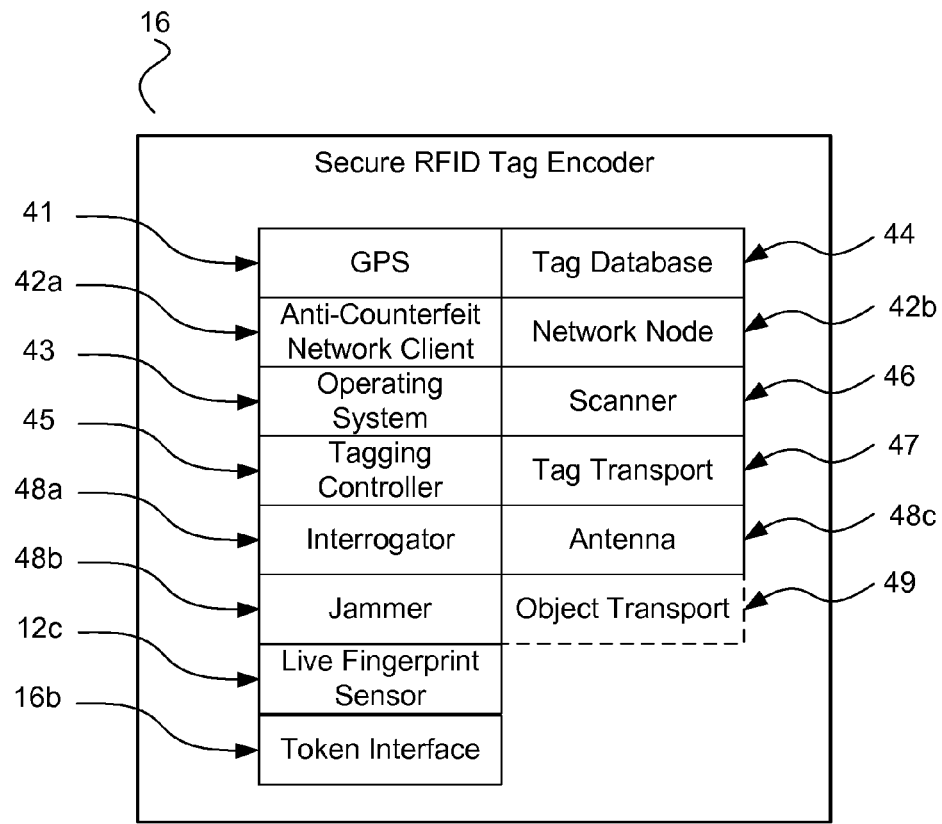
FIG. 4 is a block diagram of a secure RFID tag encoder according to one embodiment of the present invention.

Referring now to FIG. 4, the preferred embodiment for a secure RFID tag encoder 16 is disclosed wherein plaintext information and cryptographic keys are hidden in the protected memory of tagging controller 45. Preferred embodiments of tagging controller 45 use a single chip microcontroller with non-volatile block memory protection features such as those which are available on Freescale MC9S08 8-bit microcontrollers. The MC9S08 GB/GT microcontrollers include circuitry to prevent unauthorized access to the contents of FLASH and RAM memory. When security is engaged, FLASH and RAM are considered secure resources.

FIPS 140-2 is the Federal Information Processing Standards Publication 140-2 for SECURITY REQUIREMENTS FOR CRYPTOGRAPHIC MODULES which is incorporated by reference herein. The standard provides four increasing, qualitative levels of security: Level 1, Level 2, Level 3, and Level 4. The purpose of this document is to provide a security metric for equipment containing cryptographic modules.

Preferred embodiments of the present invention utilize tagging controller 45 as a single chip cryptographic module inside of which all plaintext safely resides. Any attempts to extract plain text information or cryptographic keys are prevented from physical or logical access. Information in the protected memory space of tagging controller 45 cannot be viewed from the outside, not even with a debugger. Protected memory of that type cannot be accessed from the outside of the chip without first erasing the contents of the memory. The chip itself is preferably maintained with program updates outside of the protected memory area using a secure boot loader that operates from within the protected memory area.

In accordance with FIPS 140-2 requirements, maintenance of the information or executable code inside of the protected memory must be performed only after first clearing that data.

Figure 2:
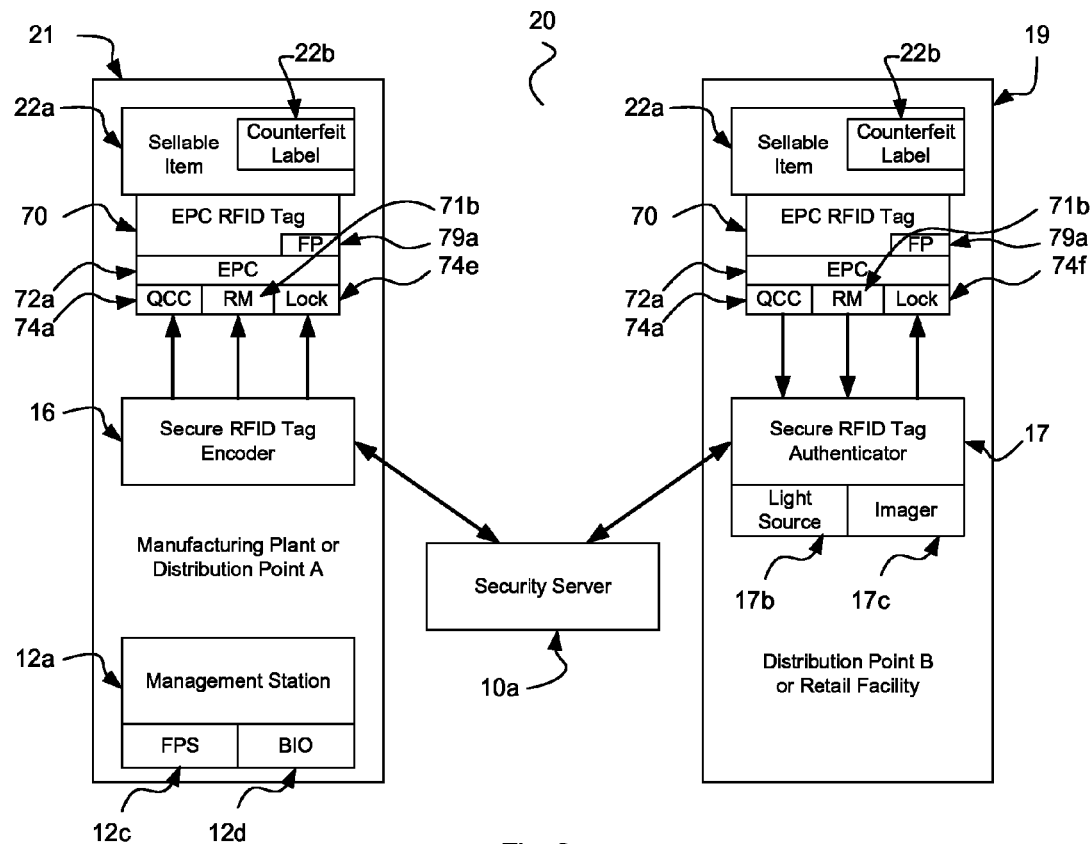
FIG. 2 is a block diagram of the system according to one embodiment of the present invention.
Figure 3:
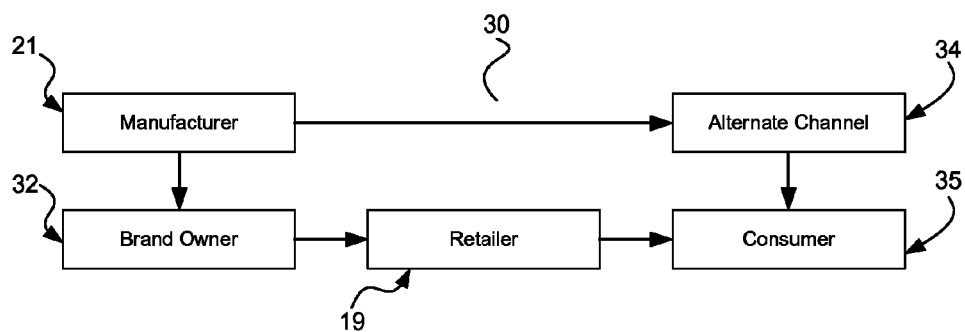
FIG. 3 is a block diagram of the supply chain macro environment.
Figure 6:
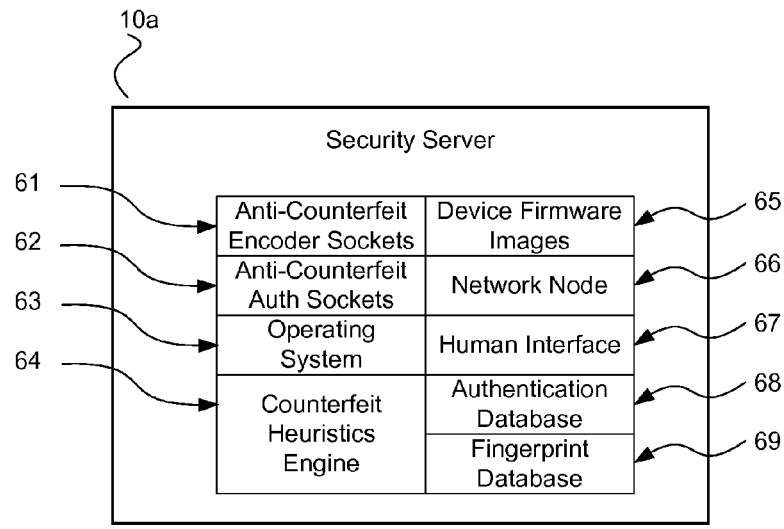
FIG. 6 is a block diagram of a security server according to one embodiment of the present invention.

Program updates and remote key management are managed through operating system 43, Anti-counterfeit network client 42a which is used for mobile device management, including SNMP and MIB table updates. Operating system 43 is preferably an operating system that is well suited to mobile devices such as Linux or Android. Network node 42b represents the MAC layer for access to a network, including IEEE802.11 (otherwise known as Wi-Fi), Bluetooth, or Ethernet. Quatech Inc. of Hudson, Ohio manufactures Wi-Fi modules that are capable of performing or hosting the functions that are required for network node 42b, operating system 43, and Anti-counterfeit network client 42a. Anti-counterfeit network client 42a communicates through network node 42b to anti-counterfeit encoder socket 61 in security server 10a as shown in FIGS. 2, 4, and 6.

RFID interrogator 48a is a module such as an M9 from SkyeTek of Westminster, Colo. or an M5e Compact from ThingMagic of Cambridge, Mass. Certain preferred embodiments also incorporate anti-eavesdropping jammer 48b as described below and are made from similar components as an M9 or M5e, but also include additional amplifiers, filters, and digital signal processing means as described below that in some preferred embodiments radiate jamming signals from antenna 48c. Antenna 48c is in some embodiments a compound structure that has near field radiating parts for selectively coupling with a single RFID tag, and another part that radiates a jamming signal, and the two parts of the antenna are constructed such that the jammer antenna cannot be defeated without also defeating the tag encoding coupler. RFID interrogator 48a communicates to RFID tags only in a well defined interrogation zone that is shaped by shields, RF absorbing materials, and the near field coupling characteristics of antenna 48c. In preferred embodiments, the interrogation zone is collocated with a tag peel device that separates the RFID tags from the release liner for programming and in preferred embodiments also for removal from the release liner for attachment to a target item or object.

RFID tags are transported into the encoding and interrogation field by tag transport 47. Movement is controlled and coordinated by tagging controller 45. Tag database 44 is referenced by tagging controller 45 for determining what information is to be encoded into the RFID tag that is immediately within the interrogation zone. Scanner 46 is preferably a laser bar code scanner that is used to read the SKU information that is used to generate a GTIN (Global Trade Item Number). In a preferred embodiment, a Motorola Symbol SE-955 laser scan engine is used to scan bar codes that are presented to secure RFID tag encoder 16. EPCglobal Tag Data Standards Version 1.4 Copyright ©2004-2008 EPCglobal is incorporated by reference herein. Information from database 44, such as the selected GS1 Key type (SGTIN-96, SGTIN-198, SSCC-96, GRAI-96, etc.), filter value, partition value, site number, unit number, and the last serial number issued for that SKU are used to formulate EPC Serialized Global Trade Item Number (SGTIN) 124. The site number and the unit number are the upper and middle most significant digits of the serial number field. SGTIN-96 serial numbers are 38 bits long, and SGTIN-198 serial number fields are 140 bits long. The Site and unit numbers are used to segment the numbering space for each SKU in order to assure that there is never duplication of any SGTIN even when there is infrequent communication between encoding devices 16 and a central database such as security server 10a. The formulated SGTIN, regardless of the length is recorded in Tag Database 44 of each Secure RFID Tag Encoder 16.

GPS 41 is used in certain preferred embodiments where the location of the encoder cannot be assured through normal business communication methods. GPS 41 is used to feed global location information that is transmitted from satellites that orbit the earth. This information is fed into tagging controller 45 for processing as described below. In certain configurations, GPS information is relayed through operating system 43 and is monitored by anti-counterfeiting network client 42a. In a procedure that is remotely controlled, a prescribed pattern of streets or other hard geographic references is traversed in order to monitor the indicated movement of secure encoder 16. Lacking a playback of the correct GPS longitudes and latitudes to correctly match the prescribed course will raise suspicions that the GPS device has been tampered with or replaced by a dummy device that feeds incorrect information into tagging controller 45. Evidence of tampering would be reported through anti-counterfeiting socket 61, of operating system 63, into counterfeit heuristics engine 64, an application program that uses authentication database 68 to record, study, and counteract the illegal activities of counterfeiters.

In certain preferred embodiments object transport 49 is used to automatically move items or objects that are to be tagged and present them into the interrogation near field of antenna 48c. Movement or changes in a continuous movement are preferably coordinated with tagging controller 45.

Figure 5:
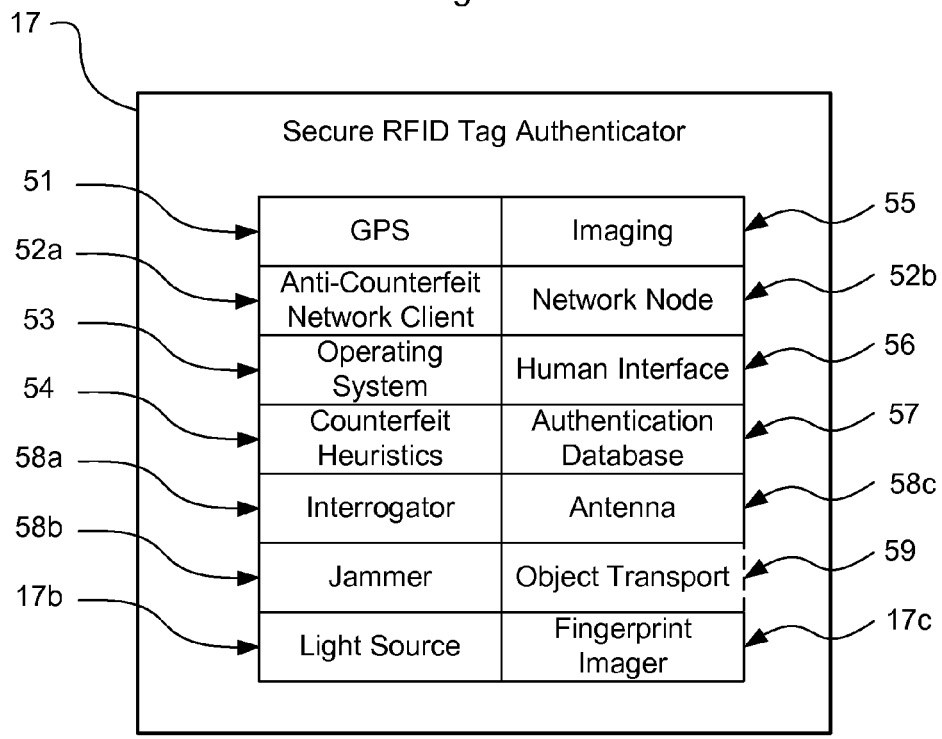
FIG. 5 is a block diagram of a secure RFID tag authenticator according to one embodiment of the present invention.

Referring to FIG. 5 there is a preferred embodiment for a secure RFID tag authenticator 17 that preferably includes GPS receiver 51 for recording the location of observations, especially in mobile applications. In some brand enforcement applications, authenticator 17 is deployed into marketplaces where illicit sales of counterfeit goods are likely to be found. GPS receiver 51 has sufficient resolution to mark the exact locations of vendor stalls in crowded marketplace locations where counterfeit goods are identified using a covert radio link from antenna 58c. In preferred covert applications, an enforcer can walk with secure RFID tag authenticator in a backpack, scanning goods that hang from racks or are still in boxes at the rear of stalls or warehouse locations, marking locations of counterfeit goods without revealing their law enforcement identity. Law enforcement intervention strategies can then be planned using the covertly collected surveillance data.

Heuristic information is exchanged between secure RFID tag authenticator 17 and anti-counterfeit authentication socket 62 through network node 66 in security server 10a where authentication database 68 is updated in order to drive counterfeit heuristics engine 64. Findings, results, and controls for counterfeit heuristics engine 64 are monitored and controlled through human interface 67.

Device firmware store 65 is used to update secure RFID tag encoders 16 and secure RFID tag authenticators 17 through anti-counterfeit encoder socket 61 and anti-counterfeit authenticator socket 62. Firmware, cryptographic keys, and control parameters are updated through this secure mechanism.

Figure 7:
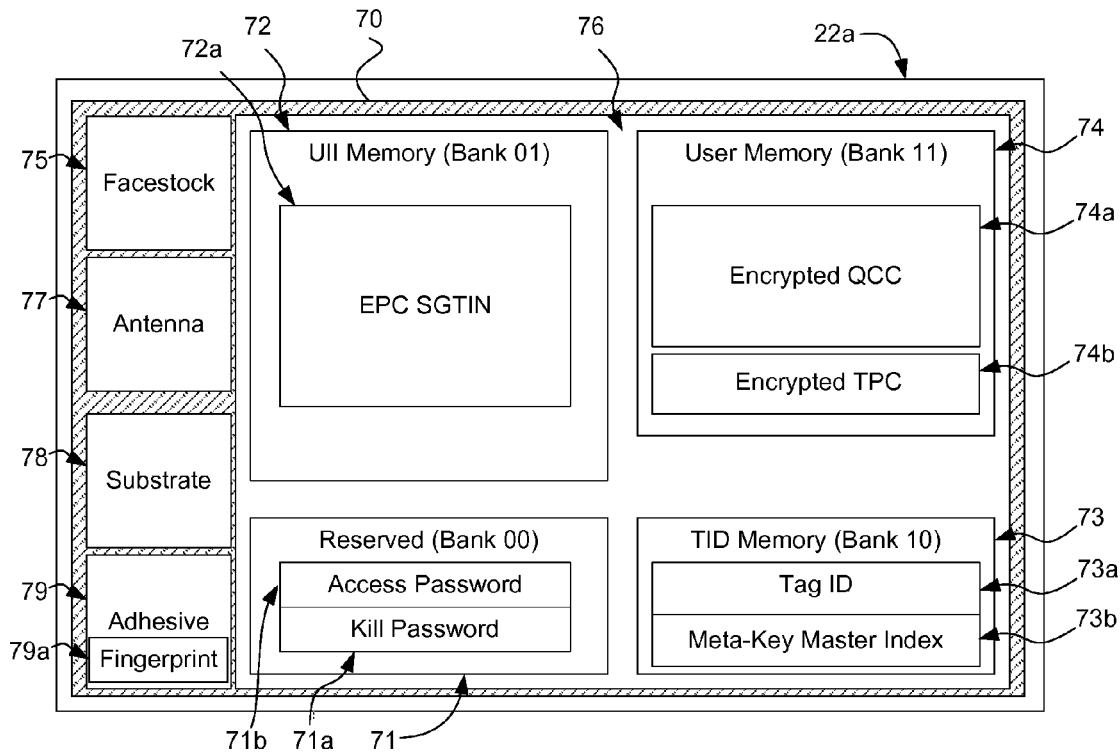
FIG. 7 is a block diagram of a secured RFID tag according to one embodiment of the present invention.
Figure 8:
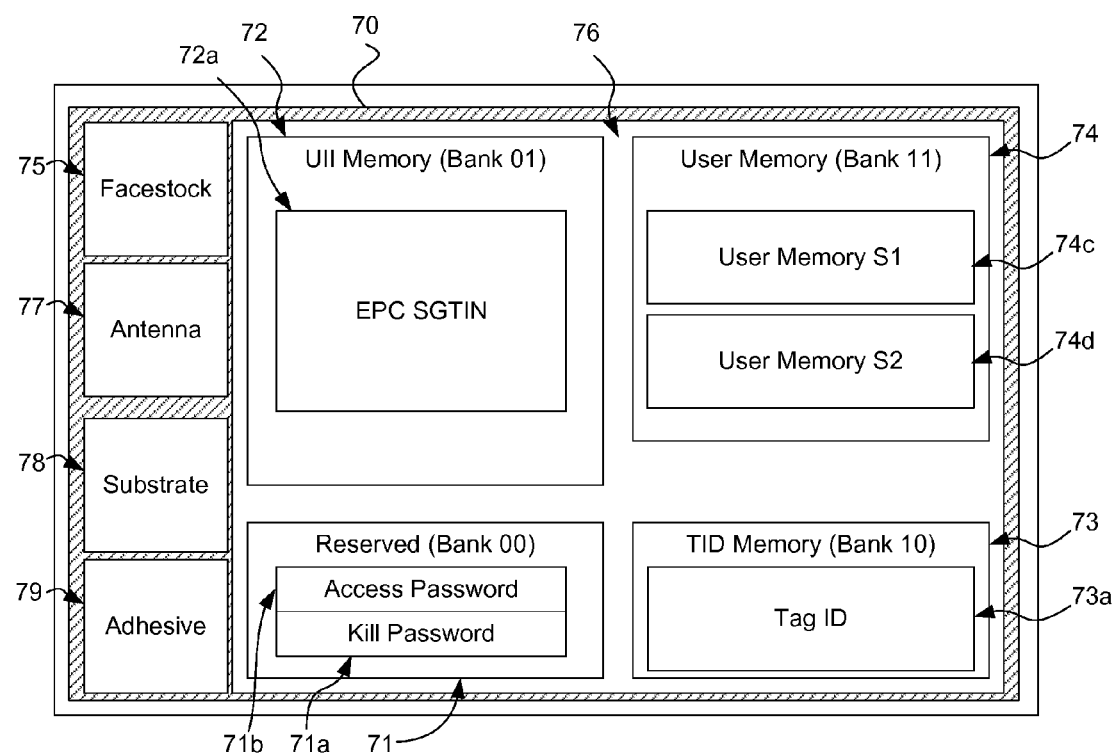
FIG. 8 is a block diagram of an RFID tag according to one embodiment of the present invention.

Referring to FIG. 7 there is a representation of a preferred embodiment for a secure and remotely "authenticatable" RFID tag 70 of the present invention. This RFID tag is comprised of some fixed purpose and some general purpose parts, in much the same manner as a microcontroller contains programmable resources that are arranged in unique ways to accomplish a specific task, function, or purpose. The codes and parameter settings that are programmed into non-volatile memory locations of RFID tag 70 are like the object code that is loaded into a microcontroller in order to create new and novel functions.

Constructed in accordance with the EPC specifications, RFID tag 70 has a charge pump, antenna interface, protocol control logic, security lock bits, and four memory banks:

Bank 00 —Reserved 71
Bank 01—EPC 72
Bank 10 —TID 73
Bank 11 —User Memory 74

Reserved memory 71 is comprised of kill password 71a, access password 71b, and potentially other reserved features. These password storage means are also referenced in FIG. 2 as reserved memory 71b, and are protected by Lock 74e and Lock 74f. Kill password 71a is a 32-bit value stored in Reserved Bank 71b memory location 00h to 1Fh, most significant bit first. And access password 71b is a 32-bit value stored in Reserved Bank 71b at memory location 20h to 3Fh, most significant bit first, and is used to transition EPC Tag 70 to a secure state.

Access password 71b can be set to a non-zero value and used to require that when RFID tag 70 powers up, it requires an interrogator to issue the correct access password 71b before it enters the secured state where lock bits 74f can be altered to change the security settings of the RFID tag. Details of this are described in the document from EPCglobal called EPC™ Radio-Frequency Identity Protocols, Class-1 Generation-2 UHF RFID, Protocol for Communications at 860 MHz-960 MHz. Relevant to the present invention is the ability to use that mechanism to hide kill password 71a from being disclosed without an interrogator using the correct access password 71b to make kill password 71a visible.

In the present invention, Secret Access and Kill passwords are cryptographically derived from unencrypted data on RFID Tag 70. The default (unprogrammed) value shall be zero. An Interrogator shall use a Tag's kill password once, to kill the Tag and render it silent thereafter. A Tag shall not execute a kill operation if its kill password is zero. A Tag that does not implement a kill password acts as though it had a zero-valued kill password that is permanently read/write locked.

Bank 01 contains EPC code 72a which is always sent promiscuously to interrogating readers; it is not protected from duplication.

Tag ID Memory 73 (Bank 10) contains Tag ID information 73a which is not intended to be written by anyone except the manufacturers of the RFID chip itself. Recently though there are selected RFID chips that differ from this norm by allowing interrogators to write to this bank and then locking it. In preferred embodiments, Meta-Key Master Index 73b is written into this bank by secure RFID tag encoder 16.

Tag ID 241a is a 32 bits or more that shall contain an 8-bit ISO/IEC 15963 allocation class identifier (111000102 for EPCglobal) at memory locations 00h to 07h. TID memory shall contain sufficient identifying information above 07h for an Interrogator to uniquely identify the custom commands and/or optional features that a Tag supports. For Tags whose ISO/IEC 15963 allocation class identifier is 111000102, this identifying information shall comprise a 12-bit Tag mask-designer identifier (free to members of EPCglobal) at memory locations 08h to 13h and a 12-bit Tag model number at memory locations 14h to 1Fh. Tags may contain Tag- and vendor specific data (for example, a Tag serial number) in TID memory above 1Fh.

User Memory 74 (Bank 11) contains Encrypted QCC 74a is a Quality Control Code (QCC), which is comprised of several novel elements that enable an ordinary EPC tag to become secure identity EPC tag 70. A powerful aspect of the QCC is that RFID tags 70 can be screened for counterfeits and clones at a significant distance at speeds of up to tens of thousands of items per minute. This is a core benefit that the present invention brings to thwart counterfeiting.

In a further embodiment, User Memory Bank 74 is divided into two partitions. One is to store User Memory S1 74c and the other for User Memory S2 74d. User Memory S1 74c is preferably used to store header information and an index into a table of cryptographic keys. User Memory S2 74d is preferably used for audit information.

In preferred embodiments, a trusted tag converter company writes Encrypted TPC 74b into EPC Bank 01 or User Memory Bank 11. Encrypted TPC 74b is later overwritten by Encrypted QCC 74a, possibly occupying the same blocks of memory. Overwriting is allowed after Encrypted TPC 74b has been read from RFID tag 70 by and into a protected memory location of secure RFID tag encoder 16, forming part of internal QCC 134. The interrelationships and the material properties of the elements shown in FIG. 7 are the means by which EPC tag 70 becomes strongly resistant to cloning, and by which it can be verified as authentic from a safe distance by brand owners and law enforcement professionals.

Kill Password for Retailers

Preferred embodiments of this invention use subsets of the brand authentication features in order to enable retail stores to kill EPC tags for consumers that want their tags killed as defined in the EPC global specifications. Retailers will need to be given the cryptographic keys to compute the kill password using the UII (EPC) and QCC data (if present).

Cryptographic Key Management

Preferred embodiments manage key changes between authenticated and authorized recipients. Keys are changed because keys can potentially be discovered by a cryptographic adversary. Certain preferred embodiments use asymmetric key algorithms to distribute symmetric keys to authorized recipients. Symmetric-key algorithms are generally much less computationally intensive than asymmetric key algorithms which are typically hundreds to thousands of times slower than symmetric key algorithms. Asymmetric algorithms are used to distribute symmetric-keys on a regular basis to authenticated and authorized machines and entities. Cryptographic keys and initialization vectors are preferably generated using pseudorandom key generators in order to assure a high level of entropy to thwart cryptanalysis attacks.

Encrypting the QCC

A block cipher is preferably used to encrypt and decrypt the QCC. In these preferred embodiments, the encryption functions are all performed off-tag. That is to say that the RFID tag does not necessarily have a built-in cryptographic engine inside the RFID chip. This is a design decision that the market has made based on cost and read range. RFID tags consume very low amounts of power (on the order of tens of microwatts), which is several orders of magnitudes less than newer smart card chips with cryptographic security coprocessors. The significant difference in power would reduce read range, a primary performance metric to make supply chain applications work. If an RFID tag cannot be read, especially and item-level tag, then the customer cannot be charged. To the retailer, this is a worse problem than counterfeiting and therefore tips that balance away from a cryptographic engine on each RFID tag.

In certain applications passwords are encoded into transponders or wireless sensors when they are commissioned. Passwords are safeguarded using cloaking, obfuscation, cryptographic techniques, secure and trusted channels, locked memory, and other methods that are commonly used to protect confidential information. Passwords are generated or retrieved from data encoded in an RFID transponder to generate an index into one or more databases that contain a one dimensional array of passwords, a two dimensional array of passwords, a multidimensional array of passwords, or an array of actual or pointers to algorithms used to generate passwords from transponder data, for example. Alternatively, cryptographic algorithms are used generate passwords from transponder data. These methods are described in the inventor's U.S. Pat. No. 7,551,087 with a priority date of 19 Aug. 2005 from U.S. Provisional Patent Application Ser. No. 60/709,713.

Relevant Encryption Tools

Several encryption tools are needed depending on the functions described in the present invention. For reference Skip32, Blowfish, and AES are briefly described here and are used where 32, 64, 128, or more bits are encrypted and decrypted.

For encrypting 32-bit numbers there is no algorithm that is really considered strong enough to be used as a primary tool for stopping determined counterfeiters. That said, there is value in a 32-bit symmetric block cipher that is used to obfuscate information that is a part of a larger block size that uses stronger encryption tools as described below. Skip32 is a 32-bit block cipher based on SKIPJACK. Skip32 is a "not copyright, no rights reserved" public domain cipher written by Greg Rose, QUALCOMM Australia in 1999. Skip32 is based on an implementation of the Skipjack algorithm written by Panu Rissanen.

Blowfish is a block cipher that has a 64-bit block size and a variable key length from 32 up to 448 bits. It is a 16-round Feistel cipher and uses large key-dependent S-boxes. Although there is a complex initialization phase required before any encryption can take place, the actual encryption of data is very efficient on large microprocessors; and is much faster than DES and IDEA. Blowfish is unpatented and license-free, and is available free for all uses.

AES-128 and AES-256 are block ciphers that are part of the Advanced Encryption Standard (AES) which is an encryption standard adopted by the U.S. government. The standard comprises three block ciphers, AES-128, AES-192 and AES-256, adopted from a larger collection originally published as Rijndael. Each AES cipher has a 128-bit block size, with key sizes of 128, 192 and 256 bits, respectively. The AES ciphers have been analyzed extensively and are now used worldwide. AES is based on a design principle known as a Substitution permutation network. It is fast in both software and hardware, is relatively easy to implement, and requires little memory. Unlike its predecessor DES, AES does not use a Feistel network.

Quality Control Code

Since the scope of this invention covers digital and printed symbols that are publicly readable and easily can be easily duplicated, it would at first seem like an impossible task to prevent duplication of valid RFID tags.

This invention makes use of parts of memory within an RFID tag, such as an EPCglobal RFID tag that do not have a standard use. A special Quality Control Code (QCC) is written into one of the otherwise unused parts of the tag's memory, such as User Memory or writable parts of TID (i.e. the Tag ID Memory Bank), or extended parts of the main EPC Memory that exceed the standard code lengths (i.e. at the end of a 240-bit EPC memory bank when only a 96-bit EPC code is stored there).

The QCC quality control code is used to reveal where, when, and how products were tagged. A QCC is not able to be interpreted by unauthorized persons. Authorized persons are brand owners that are entitled to protect the integrity of their branded products from counterfeiting. A cryptographic key is needed for reading a QCC, and an understanding of the encoding algorithm is required to make sense of the data.

A part of the QCC takes advantage of the various differences in length of the various memory banks inside various RFID tags. There are a large number of RFID tag types that are manufactured with various sizes of TID, EPC, and User Memory banks. The QCC is set for a specific memory capacity, and unless the counterfeiter uses an identical memory footprint to encode counterfeit tags, the result will be a copied QCC that does not match the memory footprint of the tag that it was copied onto.

The QCC is a powerful tool for a quick off-line appraisal of goods that are moving through critical choke points such as freight forwarders and national ports of entry. The off-line aspect of this invention is important where transporting large amounts of encrypted data to a remote server may be impractical to meet throughput goals. Embodiments that depend on secure high bandwidth communication with a remote server may not be available, especially in hostile or foreign environments and marketplaces where counterfeit goods are typically sold. Such marketplaces may be back alleys, flea markets, or leased warehouses where high speed Internet connections are not available. Covert surveillance of such areas requires small, powerful, compact processing means with small, fast, and rugged data storage means, all of which could be covertly carried in a backpack. Observations are preferably recorded and associated in real time with the GPS coordinates of where troves of counterfeit items are detected. This allows for intervention and apprehension plans and actions to be decoupled from the scanning process in illicit marketplaces.

Countermeasures to thwart brand thieves and counterfeiters preferably include:

FIPS 140-2 rated encoders and verifiers—cryptographic key zeroization, tamper evident switches, tamper resistant covers, shields, RF noise, low power encoding, and obfuscation techniques to befuddle eavesdroppers.

Tagging logs reported to brand owner—accountability required on part of manufacturer Encoder does not duplicate any numbers.

QCC used for forward intelligence reporting to authorized observers

A preprinted logo on the data carrier conveys confidence in brands that use the teachings of this patent to assure product authenticity.

Certain preferred screening methods use information that is stored in a part of the RFID tag that is not directly associated with the identification of the product that it identifies. In certain preferred embodiments using EPC Class 1 Gen 2 RFID tags, User Memory 74 is available for storing supplemental information, and is well suited for the type of information that is useful for determining the origin of a tagged product and the characteristics of the intended data carrier.

In preferred embodiments, an Encrypted Quality Control Code (QCC) 74a of FIG. 7 is computed and encoded into each RFID tag by a secure RFID tag encoder 16. Encrypted QCC 74a is adaptable to the amount of available tag memory, and in the case of most EPC tags, the amount of User Memory 74. Currently, 64 bits of User Memory is readily available. As time goes on, the amount of user memory will increase and the utility of Encrypted QCC 74a will expand with it.

A preferred composition of the 64-bit implementation of Encrypted QCC 74a is shown below.

| QCC Field | Bits |
|---|---|
| GLC | 18 |
| Encoder | 11 |
| Day | 0 |
| Time | 0 |
| TPC | 14 |
| RKI | 6 |
| CRC | 10 |
| CCC | 5 |
| Total | 64 |

For RFID tags that can store up to 128 bits, 128-bit implementation of Encrypted QCC 74a is shown here with additional space allocated for each field, plus space for the Day and Time fields.

| QCC Field | Bits |
|---|---|
| GLC | 20 |
| Encoder | 20 |
| Day | 12 |
| Time | 17 |
| TPC | 32 |
| RKI | 10 |
| CRC | 12 |
| CCC | 5 |
| Total | 128 |

The plaintext version of Encrypted QCC 74a is only present at time of its creation within protected memory of tagging controller 45 of secure RFID tag encoder 16 and there it is referred to as QCC 134.

QCC 134 is also recreated within the protected memory of Counterfeit Heuristics Engine 64 of secure RFID tag authenticator 17 as QCC 146.

Due to memory constraints on the RFID tags, the QCC is designed to be very space efficient. An explanation of the QCC plaintext fields as they are in QCC 134 or QCC 146 are:

GLC—Global Location Code, a field that indicates a representation of the latitude and the longitude of the location where the encoder was operating when the current tag was encoded. Using Aggregated Extended Data (AED) 119a of FIG. 11 the resolution can be expanded significantly beyond the number of bits allocated as shown above.

Encoder—A unique number that is assigned to each RFID tag encoder.

Day—A counter that indicates the date that the current tag is encoded in the form of a delta offset from a fixed date.

Time—A counter that subdivides each day into time slots and represents the time of day that the current tag is encoded.

TPC—Tag Physical Characteristics is an encrypted field that is created from two plaintext descriptors that are designated by a tag converter during the tag conversion process: TMA and DCM. TPC 74b is preferably written by the tag converter and stored on the RFID tag in a secure form during the conversion process. It is transformed by the tag converter and within secure RFID tag authenticator 17 by TPC Key 147b and TPC Transform 147a.

Tag Memory Architecture (TMA) 147c is a field that is an index into a table of distinctive tag memory footprints. In the 128-bit version of QCC 146, this field can specify up to 256 different types of tag memory architecture footprints using an 8-bit TMA. A mismatch of this field to the actual tag memory footprint during the Tag Memory Architecture Authentication Function 149a is an immediate red flag TMH 149d for detecting counterfeit tags at a distance and is reported to Authenticator Heuristics Engine 166 as a security violation.

Data Carrier Mark (DCM) 147d is an index into a table that specifies the characteristics of anti-counterfeit marks 70b that are embedded into data carrier of RFID tag 70. The marks may be a combination of microdots, microtaggant, printing, watermarks, human fingerprints, or other distinctive characteristics of face stock 75, adhesive 79, or other parts of the physical data carrier of tag 70. In the 128-bit version of QCC 146, this field can specify up to 16,777,216 different combinations of 24-bit DCM data carrier marks. A mismatch of this field to the actual anti-counterfeiting features during the Data Carrier Mark Authentication Function 149b is an immediate red flag DCH 149e for detecting counterfeit tags and is reported to Authenticator Heuristics Engine 166 as a security violation.

In certain preferred embodiments, Data Carrier Mark (DCM) 147d alternatively contains a unique operator record number that points to a fingerprint record in Fingerprint Database 69 that is associated with the operator that was authorized to encode and place tag 70 onto sellable item 22a in factory 21. In certain embodiments, additional bits are allocated to DCM 147d to hold greater numbers of operator record numbers, possibly reducing the number of bits in other fields, such as TMA 147c. That operator left fingerprint 79a on tag 70. A descriptor of fingerprint 79a is stored in fingerprint database 69 as either a pattern image or in the form of minutia that describe the ridge pattern types, bifurcations, ridge endings, their location, strength, and significant direction. Pattern-based images in uncompressed form require about 1024 bytes per fingerprint, or 300-400 bytes when compressed. In minutia form only 125 to 400 bytes are required, depending on the number of minutia per fingerprint. For a typical finger, 35 to 40 minutiae are normal. Often times a match can be made with as little as 12 of the 40 minutiae.

RKI (for Encoders)—Radio Key Index RKI 133*a* is a field that is an index into Radio Key Table 133*b* in secure RFID tag encoder 16 that is used to select a cryptographic key for use in Radio Key Hash Function 133*c* to generate the over-the-radio-link Radio Passwords 138 from selected plain text fields of formulated EPC SGTIN 124 and is comprised of kill password 138*a* and access password 138*b*. When tag 70 is programmed, those passwords are written into reserved memory 71 as kill password 71*a* and access password 71*b* respectively. Lock bits 74*e* are then set.

RKI (for Authenticators)—Radio Key Index RKI 145*a* is a field that is an index into Radio Key Table 145*b* in secure RFID tag authenticator 17 that is used to select a cryptographic key for use in Radio Key Hash Function 145*c* that is used to generate the over-the-radio-link Radio Passwords 149*f* from selected plain text fields of EPC SGTIN 72*a* and is comprised of kill password 149*f* and access password 149*h*. Password Authentication Function 149*i* evaluates these values through a challenge-response interaction with tag 70 to determine the contents of reserved memory bank 71 and to verify kill password 71*a* and access password 71*b*.

CCC—Counterfeit Control Code 164*c*, a code that is assigned based on the heuristic incidence model that runs in Counterfeit Heuristics Engine 64 of security server 10*a*. The value is based on historic patterns of abuse by the manufacturer, the relevant distribution channels, and varies by SKU and encoder number. This aspect of each secure RFID tag encoder 16 is managed by Encoder Security Manager 112 which maintains in protected memory of tagging controller 45 CCC Table 152*a*. CCC Selector 152*b* uses EPC SGTIN 124 as input to select which CCC to use in QCC 134 since each CCC is encoder and SKU specific. In other words, counterfeit heuristics engine 64 of security server 10*a* is in complete control of each SKU that is encoded by each secure RFID tag encoder 16. Updates to CCC table 152*a* take effect immediately and are meant to effectively send a 'silent alarm' to remote tagging locations anywhere in the world without notification.

CRC—Cyclical Redundancy Check CRC 156*b* is a field that confirms data integrity of TID 73 (which may or may not be field writeable depending upon the inlay supplier's chip specifications), formulated EPC 124, and Cloaked QCC Payload 155*a*. It is important to note that if a counterfeiter copies EPC 72*a* and Encrypted QCC 74*a* onto an RFID tag with a fixed and different TID, then the CRC will have a high probability of not matching. CRC 156*b* is calculated by CRC Calculation 155*d* in secure RFID tag encoder 16 before Cloaked QCC Payload 155*a* is encrypted and written to EPC Memory 72 of EPC RFID tag 70.

The elements described above which are the means of FIG. 7 that relate to FIG. 2 for the purpose of performing the function of providing a secure, 'unclonable' identity for sellable item 22*a* are:

Face Stock 75—A cover layer that is preferably comprised of paper or plastic materials and is usually printed or marked in a manner that is needed for the security functions described herein, for human handling, or for EPC global branding (i.e. the EPC global logo). The surface may contain holograms, printed, or micro-features as anti-counterfeiting features.

RFID Chip 76—preferably manufactured by a silicon foundry in accordance with EPC global specifications.
Bank 00—Reserved Memory 71
  Kill password 71*a*
  Access Password 71*b*
Bank 01—UII Memory 72
  EPC SGTIN 72*a*
Bank 10—TID Memory 73
  Tag ID 73*a*
  Meta-Key Master Index 73*b*
Bank 11—User Memory 74
  Encrypted QCC 74*a*

Antenna 77—preferably a stamped, etched, or printed metallic structure of a particular shape and thickness for coupling with the air interface and with RFID chip 76.

Substrate 78—preferably PET or some other plastic or paper which carriers the antenna 77, RFID chip 76, and adhesive 79.

Adhesive 79—preferably a pressure sensitive adhesive layer that initially bonds substrate 78 to a release liner for conveyance through or under secure RFID tag encoder 16. After RFID chip 76 is encoded and verified, adhesive 79 is transferred to sellable item 22*a*, whereupon adhesive 79 begins a process of wetting-in and forming a semi-permanent bond. This bond layer will securely retain fingerprint 79*a* of the operator that placed the tag onto sellable item 22*a*. If facestock 75 is clear, such as a PET plastic material, then fingerprint 79*a* can be observed through facestock 75 by using a proper source of illumination, such as light source 17*b* and fingerprint imager 17*c*.

The individual elements listed above and detailed below are means by which preferred functions and interrelationships exist between the elements in order to perform the overall secure identity function of EPC tag 70:

1. Face Stock 75 preferably has holographic, micro-scribed threads, printed features, or other micro-features embedded into the materials that are visible (or identifiable) at some magnification from the top, bottom, or within the constituent materials of face stock 75.
   a. DCM 147*d* provides an index into a table (or directly describes) that describes the anti-counterfeiting therein.
   b. Antenna 77 is under this layer face stock 75.
   c. Substrate 78 is under Antenna 77 and adhered directly to face stock 75.
2. Substrate 78 may be flat, or comprised of a layer of foam, or folded in order to produce a flag tag.
   a. Dielectric spacing between antenna 77 and adhesive 79 in the form of air (as would be the case for a folded flag tag) or foam as in the case of a foam-backed tag are important for preventing detuning of antenna 77 by metallic substances or RF-absorbing liquids (including water molecules) within sellable item 22*a* to which adhesive 79 is attached.
   b. Secure RFID tag encoder 16 through which EPC tag 70 passes for encoding and verification regardless of the thickness or mechanical properties of substrate 78.
3. Adhesive 79 in some preferred embodiments has micro-features blended in with the adhesive emulsions that can be inspected at some magnification level. When tag 70 is manually applied from secure encoder 16, the operator leaves at least one unique fingerprint 79*a* that is molded into adhesive 79.

a. DCM 147*d* provides an index into a table (or directly describes) that describes the anti-counterfeiting features therein. Each fingerprint 79*a* can be imaged and reduced to a set of minutiae that describe each fingerprint 79*a*. That typically requires 200 to 400 bytes, which can either be carried in a larger version of DCM 147*d* or referenced indirectly through fingerprint database 69 in security server 10*a*.

b. Substrate 78 is in direct contact with adhesive 79.

c. EPC tag 70 is bonded to the object that is tagged through adhesive 79. For manually applied tags, the operator leaves at least one unique fingerprint 79*a* that is molded into adhesive 79 and preserved for forensics analysis.

4. The memory footprint of RFID chip 76 varies from foundry to foundry and from model to model.

a. TMA 147*c* is an index into a table that describes the physical memory layout of an authentic RFID chip 76 for the current tagged object.

5. Kill password 71*a* serves two purposes: it is used to disable the RFID tag and it is used to prove that an authentic tag holds a secret number.

a. Access password 71*b* is a gateway to unlock the lock bits of the EPC tag so that the kill password 71*a* can be verified.

b. RKI 145*a* is an index that points to Radio-Key Table 145*b* that contains the current set of cryptographic keys that are used to create the kill password 71*a* and Access password 71*b* from EPC SGTIN 72*a*.

6. Access password 71*b* is a gateway to unlock the lock bits of the EPC tag.

a. RKI 145*a* is an index that points to Radio-Key Table 145*b* that contains the current set of cryptographic keys that are used to create the kill password 71*a* and access password 71*b* from EPC 72*a*.

7. Meta-Key Master Index 73*b* is used whenever possible to select from a changing set of cryptographic keys to decrypt Encrypted QCC 74*a*. Preferred encoder embodiments use Meta-Key Master Index 130*a* that are updated by Encoder Security Manager 112 and used whenever there is a writeable TID 73 in the tag stock that is loaded into secure RFID tag encoder 16. Preferred embodiments include:

a. Tag 70 wherein TID Memory 73 is writable. The original EPC UHF Gen2 chips only have factory programmable Bank 01. Whenever chips are available with a writable Bank 01 (such as the XCTF family from Invengo Information Technology Co., Ltd. of Shenzhen China), then Meta-Key Master Index 73*b* is preferably written by RFID tag encoder 16.

b. Tag 70 wherein TID Memory 73 has a permanent factory-programmed 32-bit serial number in for example a 64-bit TID. The lower 16-bits are for example used as Meta-Key Master Index 73*b*.

c. Tag 70 wherein EPC memory 72 wherein there are more bits available than are needed to store EPC SGTIN 72*a* and provide an adequate way to store Meta-Key Master Index as an alternative embodiment.

d. QCC 74*a* is encrypted by Secure RFID tag encoder 16 and decrypted by Secure RFID Tag Authenticator 17 using a static cryptographic key. This is not preferred since cryptographic keys can eventually be cracked if there is sufficient incentive.

8. QCC 146 subpart DAY is used to identify when the current tag was programmed. This is important for forensic analysis.

9. QCC 146 subpart TIME is used to assist in the apprehension of illegal manufacturing operations that work for the brand owner by day and work for themselves by night.

a. QCC 146 subpart CCC may be changed by Counterfeit Heuristics Engine 64 if there is a correlation between confirmed counterfeit goods and QCC 146 subpart TIME.

10. QCC 146 subpart GLC is used to confirm that secure RFID tag encoder 16 is operating in a pre-authorized location.

a. QCC 146 subpart ENC is authorized to operate in locations that are approved by the brand owner.

11. CRC 143*a* is used to confirm through CRC Calculation 161 and CRC Validation Logic 162 that all data banks hold valid representations of the intended data. This is a trap for counterfeiters that opt to merely copy an Encrypted QCC 74*a* and EPC SGTIN 72*a* onto an RFID tag that lacks a valid TID. If there is a mismatch, then it is reported through to Authenticator Heuristics Engine 166.

a. EPC SGTIN 72*a* is correctly represented.

b. TID Memory 73 matches what CRC 143*a* was computed to.

c. QCC 146 parts other than subpart CRC are correctly represented.

12. QCC 146 subpart CCC captures any historic errors that are processed by the heuristic analysis tools for any noteworthy anomalies in:

a. Reserved Memory 71.

b. UII Memory 72.

c. TID Memory 73.

d. User Memory 74.

e. Authenticity of printed or micro-features in Face Stock 75.

f. Authenticity of micro-features in Adhesive 79.

Steganographic or Micro-Feature Information

The DCM information is preferably provided to the RFID tag encoder from the tag converter in a form that can be read from each RFID tag as it's about to be programmed for the first time by secure RFID tag encoder 16. In certain preferred embodiments, the DCM information is encrypted as part of the TPC field that is read from TPC 74*b* of User Memory 74 and copied unchanged into the TPC field of QCC 134.

The present inventor has previously disclosed means and methods for encrypting and referencing preprinted information about a tag, including preprinted symbols that are provided by a trusted tag converter as described in provisional patent application No. 60/805,777 dated 26 Jun. 2006 and co-pending patent application Ser. No. 11/767,471 entitled "Secure modular Applicators to Commission Wireless Sensors".

A method of detecting counterfeit RFID tags is to make part of the identification very hard to duplicate. Examples of that are in currency where specific linen fibers are used that can only be procured through controlled suppliers. Preferred anti-counterfeit technology for the data carrier of RFID tag 70 includes micro-scribed fibers, holograms, Data Glyphs, Embedded Data Characters (EDC), microdots, microtaggant, nanoart, nanolithography, human finger prints, and other steganographic marks to hide a code that helps to validate the authenticity of tags, which in turn authenticate the items that they are attached to. This invention makes use of micro-features which are any mass-producible, small, non-obvious, or microscopic traits or characteristics that can be incorporated into a data carrier and a brief exact description (or reference to a description) of them conveyed to both encoder 16 and secure RFID tag authenticator 17.

DataGlyphs are a technology for encoding machine readable data onto paper documents or other physical media. They encode information into thousands of tiny, individual glyph elements. Each element consists of a small 45 degree diagonal line, as short as 1/100th of an inch or less, depending on the resolution of the printing and scanning that is used. Each one represents a single binary 0 or 1, depending on whether it slopes to the left or right. Sequences of these can be used to encode numeric, textual or other information. The individual glyphs are grouped together on the page, where they form unobtrusive, evenly textured gray areas, like half-toned pictures. One of the reasons for using diagonal glyph elements is because research has shown that the patterns that they form when massed together are not visually distracting. Steganographic features are marks that have hidden messages in such a way that no one, apart from the sender and intended recipient, suspects the existence of the message, a form of security through obscurity. The word steganography is of Greek origin and means "concealed writing". Such features are preferably printed onto the physical data carrier part of tag 70. The physical data carrier part of a tag is the mechanical device that carries electronically stored information in a chip type data carrier and/or printed information on a surface such as the face of a data carrier (also referred to as face stock).

A microdot is text or an image substantially reduced in size onto a 1 mm disc to prevent detection by unintended recipients. Microdots are normally circular around one millimeter in diameter but can be made into different shapes and sizes and made from various materials such as polyester. The name comes from the fact that the microdots have often been about the size and shape of a typographical dot.

Microtaggant® is a microscopic and traceable identification particle used to trace explosives or other hazardous materials or to prevent counterfeiting. Preferred embodiments use layers of various materials and colors to construct uniquely coded patterns. The patterns are the same from one particle to the next within the same coded group. Like particles are preferably mixed with adhesive or paper to make a uniquely coded element of secure RFID tag 70.

Nanoart and nanolithography are applied as anti-counterfeiting measures by incorporating uniquely identifiable symbols or information into nano-scopic features that can be embedded into data carriers, including parts of the face stock or adhesive materials. The point is that the symbols are so small that they are difficult to detect without prior detailed knowledge, and are therefore nearly impossible to duplicate.

The RFID tag encoder uses tag stock or adhesive that is printed or impregnated with identifiable features that preferably have a high degree of entropy. In other words there are preferably millions, billions, or trillions of unique combinations of uniquely identifiable features that are hidden in a data carrier. The tag stock carries with it an identifier such as a bar code, a secure microchip, or an RFID tag to refer to the feature or features that are present in or on the data carriers.

In one embodiment, a secure RFID tag is attached to or contained within a cartridge that contains the RFID tag stock, and that tag is used as a secure reference to the hidden features. The objective is to securely transfer information about the tag stock, including steganographic details about the microdots, microtaggant, nanolithography, or printed features so that the information can be securely incorporated into the information encoded on the RFID tag. That way, every tag that is encoded on that tag stock will have data that matches up to the data carrier. If a counterfeiter were to copy the RFID tag data onto another data carrier, that carrier would need to have the identical printed or micro-features as the original in order not to be caught.

Encrypted License on Supply Cartridge

In a preferred embodiment, the secure RFID tag attached to or contained within the cartridge serves as a license to ensure an authentic stock of RFID tags and to monitor cartridge and encoder use. The RFID tag attached to the cartridge becomes a license input for the secure RFID encoder that is preferably read from and written to by the same RFID interrogator module of the encoder during the encoding and dispensing of the RFID tag in the cartridges. Preferred embodiments of the cartridge license use an EPCglobal compliant RFID inlay that is attached to or near the peel device or peel plate that is preferably located with the interrogation field of the antenna or near field coupler. In preferred embodiments the cartridge license inlay is only readable and writeable at slightly higher RF power levels than for reading or encoding the supply of encodable tags or inlays. Preferably reradiation from an encodable tag/inlay at or near the peel plate and the resulting near field retuning of the near field coupler also plays a role in effectively increasing the range of the interrogator to extend to the cartridge license which is preferably at the fringe of the near field coupler's normal tag reading, verifying, and encoding field. The cartridge RFID tag/inlay is distinguished from the nearby stock of RFID tags by a distinctive data header, an ISO (International Organization for Standardization) Application Family Identifier (AFI) as defined in ISO15961, or by being responsive to interrogation in a different frequency band from the supply of encodable tags that are carried by the cartridge. The preferred embodiment of a cartridge license uses an encrypted count of remaining transponders that are authorized to be encoded. In order to prevent unauthorized duplication or rewriting of the license and its associated count, critical parts of those numbers are the encrypted cipher text result that is at least partially generated from secret values that are also stored in the Access and Kill Passwords. All or part of the license and count are preferably stored in User Memory. A Data Storage Format Identifier (DFSID) as specified in ISO15961 and ISO15962 preferably specifies the format for the user memory Bank 11. The DSFID is typically eight bits in length, but may be extended further as specified in ISO15961.

Authentication of the license and associated transponder encoding authority requires the Access and Kill Passwords to be formulated using methods described elsewhere within the present invention, and used to decrypt the encrypted license and associated count. Additional security features are also preferably used, including Data Carrier Marks (DCM's). Without the license, or with a depleted license, the secure RFID encoder preferably ceases to function.

Fingerprints Molded into Adhesive Layer

The fingerprint of the operator that encoded and applied a manually-applied RFID tag did so by handling each tag 70. In preferred embodiments, a single fingerprint 79a was left in adhesive layer 79 as shown in FIG. 7. Each human fingerprint can be uniquely described by a set of minutia. The minutia that is associated with each fingerprint can be compared a reference that is preferably stored in Fingerprint Database 69 in Security Server 10a of FIG. 6.

Steganographic or Micro-Feature Descriptor

In a preferred embodiment of the RFID tag encoder, an internal optical reader is used to directly read printed or embedded features in the tag face stock in order to respond to the unique characteristics of each tag (i.e. data carrier) and cryptographically connect the data to the data carrier. The printed or embedded features may be analog or digital representations that can be recognized, processed, imaged, measured, quantified, or decoded.

In preferred embodiments the data carrier contains printed or micro-features and also digital data inside each data carrier that references a descriptor that describes those features. The data carrier and matching descriptor data are both placed there by a trusted tag converter. A trusted tag converter is a trustworthy company that produces RFID tags by combining RFID tag inlays with face stock and usually an adhesive layer and a release liner. A trusted tag converter would for example purchase or make inlays (which typically contain an RFID chip, an antenna, and a substrate material), and adhere them to face stock material that may have printed or micro-features on either the top or the bottom surface, add an adhesive layer (which may have micro-features blended in with the adhesive), and a release liner which is used as a conveyance web. The hidden features are described in a secure document, preferably in digital machine readable form, and referenced by a number that is then stored into a portion of memory in the RFID tag. Preferred memory banks for storing TPC 74b feature descriptor into EPC Gen 2 tags are the EPC (Bank 01), TID (Bank 10), or User Memory (Bank 11).

TPC: DCM 147d information regarding the tag converter's printed or micro-feature descriptor is read from the memory of each tag in the first step of the tag encoding process. Then the descriptor may be altered, encrypted, or re-encrypted before being stored into QCC 134 as Encrypted QCC 74a on RFID tag 70. In preferred embodiments, QCC 134 is cloaked using Cloak Transform 135 to obfuscate the QCC features by churning the cloaking characteristics through CCE control 131b from Cloak Code Table 131a that is driven by the least significant bits of the serial number of EPC SGTIN 124. This extends the useful life of the Meta-Keys by making it considerably more difficult to conduct crypto analysis of Encrypted QCC 74a by observing inputs such as TPC 74b that can be read by a cryptographic adversary.

By using the least significant bits of EPC SGTIN 124, for example, the lower 2 bits of the serial number are used (whether hashed or not) there will be a new group of 4 key indices when the SKU's begin to reach serial numbers that have higher order bits set that are included in this EPC-based key selection method (regardless whether it is hashed or not). In preferred embodiments, a site location and a unit number for that site comprise the most and next-most significant bits of the serial number respectively. This results in controlled Meta-Key and Cloak Code changes across all enterprise locations and SKUs for all secure RFID tag encoders 16.

Figure 13:
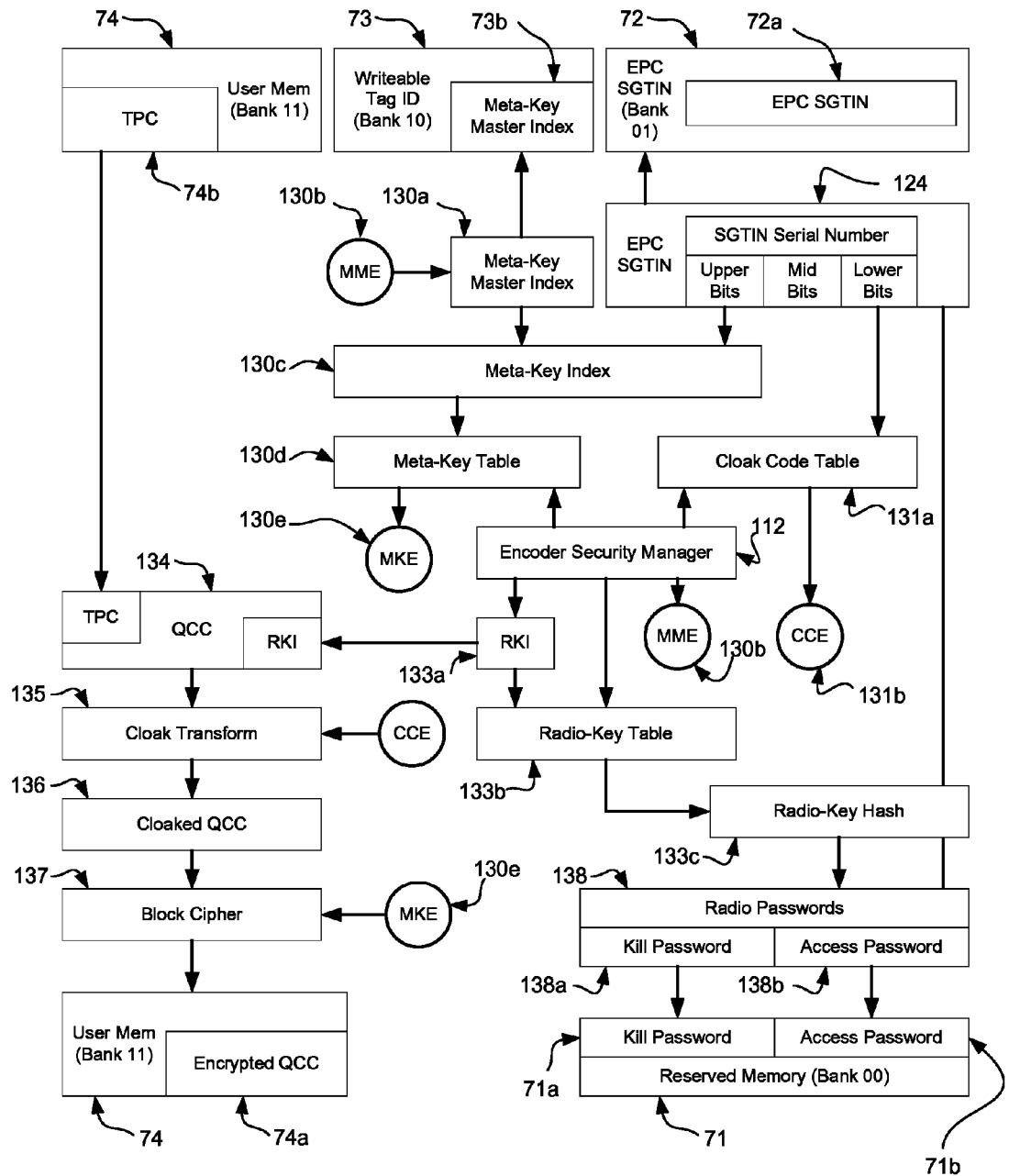
FIG. 13 is a block diagram of a password and QCC generation apparatus for a secure RFID tag encoder according to one embodiment of the present invention.

Referring to FIG. 13 Cloaked QCC 136 is encrypted by Block Cipher 137 using MKE key 130e from Meta-Key Table 130d that is selected by Meta-Key Index 130c that is derived from the upper bits of EPC SGTIN 124 and preferably also from Meta-Key Master Index 130a if a writeable TID 73 is utilized and carries inside of it Meta-Key Master Index 73b that was stored there and locked by secure RFID encoder 16 or is present because the chip foundry wrote a unique 32-bit serial number into the TID that is now advantageously used as Meta-Key Master Index 73b.

Legitimate operators have no incentive to misuse the DCM code. It is there to facilitate the efficient programming of copy-proof RFID tags. Counterfeiters can alter the code, but that only breaks the connection between the tag data and the hidden indicia in the data carrier, doing them no good because that condition would be detected during a quality control check.

Similarly, counterfeiters have no clear incentive to copy the number to use on fake data carriers because again that would be detected at the first quality control check point. Reuse of the DCM code would only point to them as the authorized recipient of blank tag stock that bears that DCM code and would result in a downgrading of their CCC (Counterfeit Control Code).

Hidden Digital Information

As explained on page 61 of the EPC™ Radio-Frequency Identity Protocols, Class-1 Generation-2 UHF RFID, Protocol for Communications at 860 MHz-960 MHz," Version 1.0.9, EPCglobal specification, the kill and access passwords can both be hidden from public view in Reserved Memory 74b by setting lock bits 10 and 12 of the lock command payload and lock control section 74e and 74f of EPC tag 70 respectively.

This is an especially effective technique for hiding a secret 32-bit number (that is also used as the kill password) when combined with the jamming techniques described below to prevent eavesdropping of the password setting or verification processes.

Extending GLC Precision

GPS data is provided by a constellation of satellites that orbit the earth emitting GPS signals preferably to GPS receiver 41.

Figure 11:
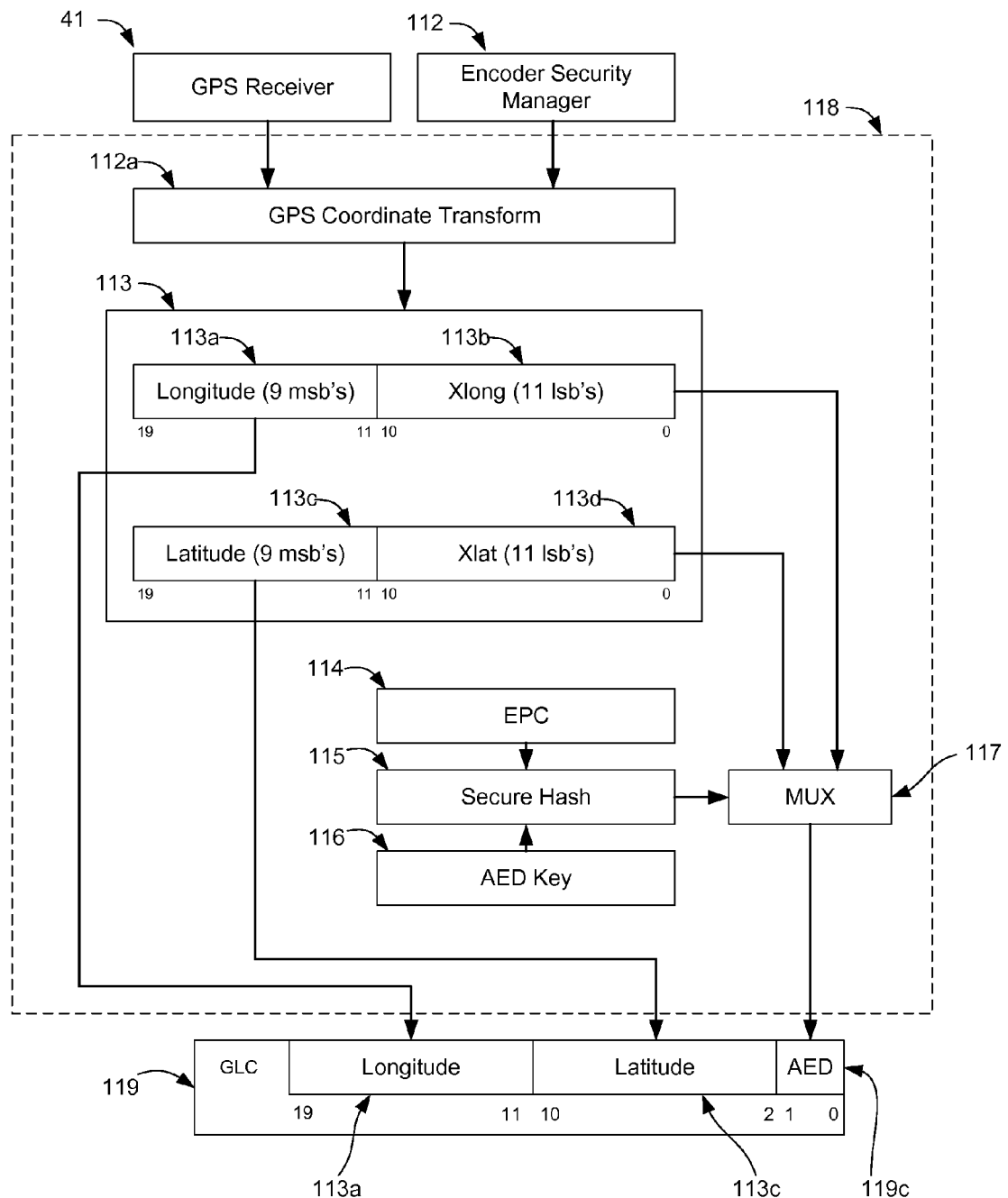
FIG. 11 is a block diagram of a GPS coordinate compression and data spreading apparatus according to one embodiment of the present invention.
Figure 12:
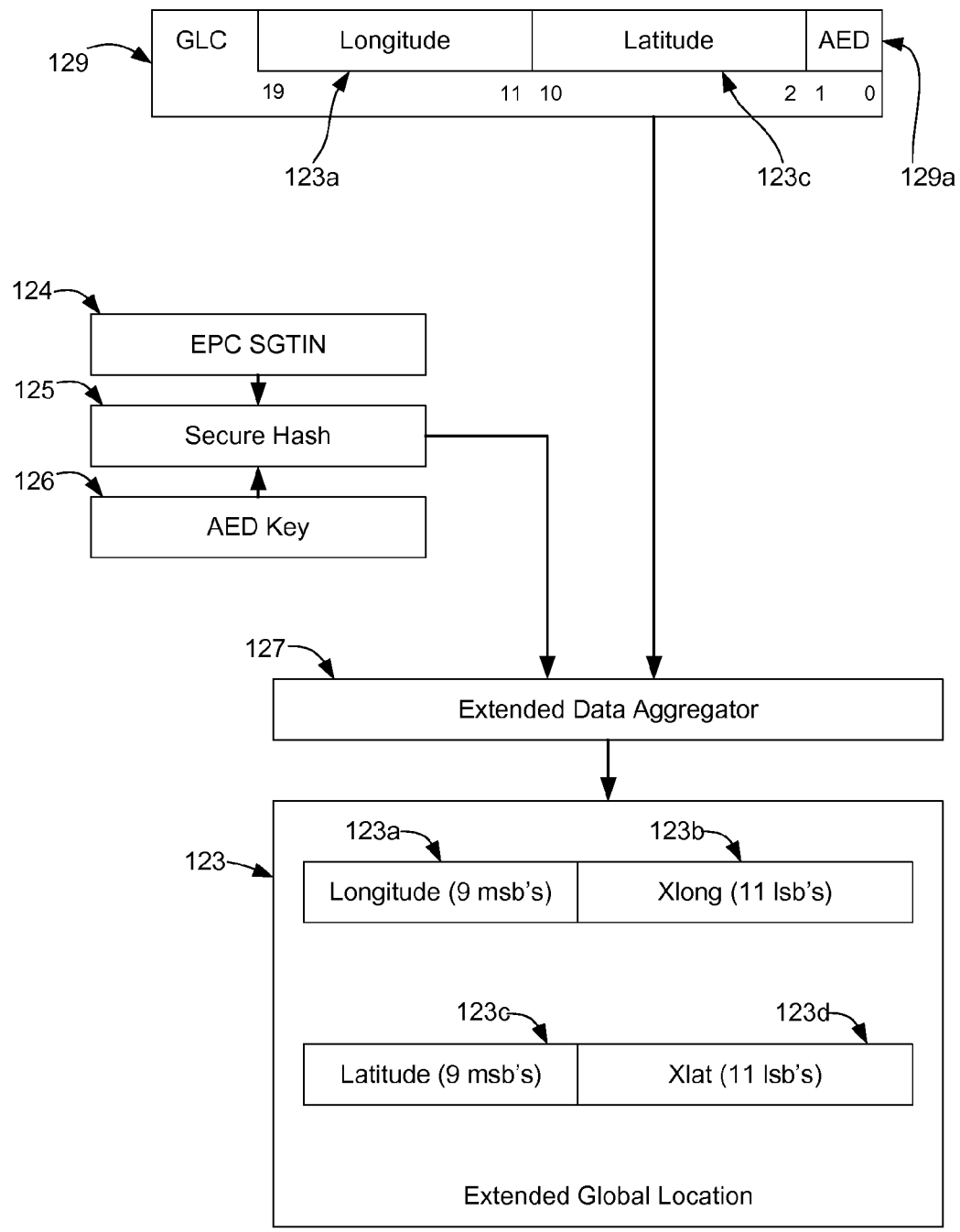
FIG. 12 is a block diagram of a GPS coordinate aggregation and reconstruction apparatus according to one embodiment of the present invention.

At full resolution, the Global Location Code (GLC) is a high precision latitude and longitude geographic coordinate that uses a limited number of bits in GLC 119 of FIG. 11, in GLC 129 of FIG. 12, and in the GLC subpart of QCC 134 of encoder 16, and in the GLC subpart of QCC 146 of authenticator 17.

The global location code is based on a 20-bit longitude and a 20-bit latitude. Assuming an equatorial radius of 20,938,815 feet, and an equatorial circumference of 131,562,344 feet, the longitudinal feet per bit for a 20-bit longitude representation would be 125 feet; whereas a 9-bit representation would be 256,958 feet per bit. Assuming a polar radius of 20,869, 204.98 feet, and a polar half-circumference of 65,562,486 feet, the latitudinal feet per bit for a 20-bit representation would be 63 feet; whereas a 9-bit representation would be 512 feet per bit.

In terms of area, a 20×20-bit resolution would cover 7,845 square feet, and a 9×9-bit resolution would cover 1180 square miles. Therefore, in terms of value to law enforcement, a 20-bit longitude and latitude precision would be preferred over a 9-bit version.

GLC and Aggregate Extended Data (AED)

Aggregate Extended Data (AED) is extended data that is algorithmically combined from an aggregated group of similar RFID tags. This is a novel method of providing more detailed information than what is written onto a single tag. The limited amount of data that is written may be limited by the actual amount of memory storage space on an RFID tag or it may be by design to hide information from people that do not ordinarily have access to large populations of similarly tagged items, such as individual consumers. AED information is readily aggregated for example in distribution centers where cartons and inner packs are still intact. It is this latter example that provides for a convenient and more secure method for brand protection enforcement activities to aggregate data that reveals selected encoding information in greater detail with higher security.

Brand owners may opt to encode a variety of sensitive information and spread that information over a smaller or larger number of RFID tags in order to assist them in solving their particular supply chain or counterfeiting problems.

Making the GLC

One or more different types of spreading functions are used to spread shared data across multiple tags. The inverse of the function is used to reassemble the data collected from multiple tags and reconstruct the original data that is shared by the group of tags. One example of a simple spreading function is to use the lower 3-bits of the EPC serial number to spread one-eighth of the shared data across eight sequentially numbered EPC RFID tags for the same SKU (i.e. the same Global Trade Item Number or GTIN). Other preferred spreading functions use the UII data and run it through a hashing function to produce an n-bit digest that is then used to multiplex and demultiplex the shared data across $2^n$ tags.

FIG. 11 is an example of a preferred embodiment whereby full-resolution global location information is spread across multiple RFID tags 70 by secure RFID tag encoder 16 using the AED-based GLC Transform 118 described herein. In FIG. 11 GPS Receiver 41 and/or Encoder Security Manager 112 load current location information into GLC Coordinate Transform 112a where minutes and degrees are converted into straight binary longitude and latitude. Those binary representations are binary coordinates 113 comprised of a full 20-bit representation each of longitude and latitude. Longitude 113a is the upper 9 bits and Xlong 113b is the lower 11 bits of longitude. Latitude 113c is the upper 9 bits and Xlat 113d is the lower 11 bits of latitude.

Longitude 113a and Latitude 113c are copied into GLC 119. AED 119a is the result from multiplexor MUX 117. The control signals for MUX 117 are the fixed-length digest of secure hash function 115, the inputs of which are secret AED Key 116 and plaintext that is selected from EPC SGTIN 114 (or other publicly readable information on the RFID tag). The combination of EPC SGTIN 114, Secure Hash 115, AED Key 119a, and MUX 117 comprise a spreading function that uses selected data that is securely held inside Secure RFID Tag Encoder 16 and spreads it across multiple RFID tags.

Reassembling GLC Data

FIG. 12 is a preferred embodiment for reassembling GLC 129 fields from multiple RFID tags to reconstruct the full 20×20 bit resolution of the encoding origin of a population of similar RFID tags (i.e. tags from the same encoder for the same SKU on the same day, etc.).

GLC 129 is comprised of Longitude 123a, Latitude 123c, and AED 129a which are originally from their counterparts Longitude 113a, Latitude 113c, and AED 119a of FIG. 11.

EPC SGTIN 124 is a copy of the SGTIN that is being processed by authenticator 17. Secure Hash 125 is used with AED Key 126 to produce a digest that is used by Extended Data Aggregator 127 to organize GLC 129 readings from a population of RFID tags to create Extended Global Location 123 which is comprised of Longitude 123a, Xlong 123b, Latitude 123c, and Xlat 123d. This result is then displayed by Human Interface 56 and/or reported to Counterfeit Heuristics Engine 54.

QCC Encryption

For the preferred embodiments, the QCC-64, QCC-128, QCC-192, or another QCC implementation the preferred method of encryption is a block cipher with a block size that matches the amount of available User Memory (for embodiments that store Encrypted QCC 74a in User Memory 74). Preferred block cipher choices are:

| QCC Embodiments | Preferred Encryption |
|---|---|
| QCC 64 | Blowfish |
| QCC 128 | AES-128 |
| QCC 192 | AES-192 |
| QCC 256 | AES-256 |

QCC encryption key selection is preferably managed through Encoder Security Manager 112, while QCC decryption is preferably managed through Authenticator Security Manager 142. Both are under the direct control of remotely located Authentication Database 68 and Counterfeit Heuristics Engine 64 through Anti-Counterfeit Encoder Sockets 61 and Anti-Counterfeit Authentication Sockets 62 over open Internet connections. Preferred embodiments use a hybrid of asymmetric and symmetric cryptographic keys during session establishment and secure updates of encoders 16 and authenticators 17.

Secure Tag Authentication Method

Figure 17:
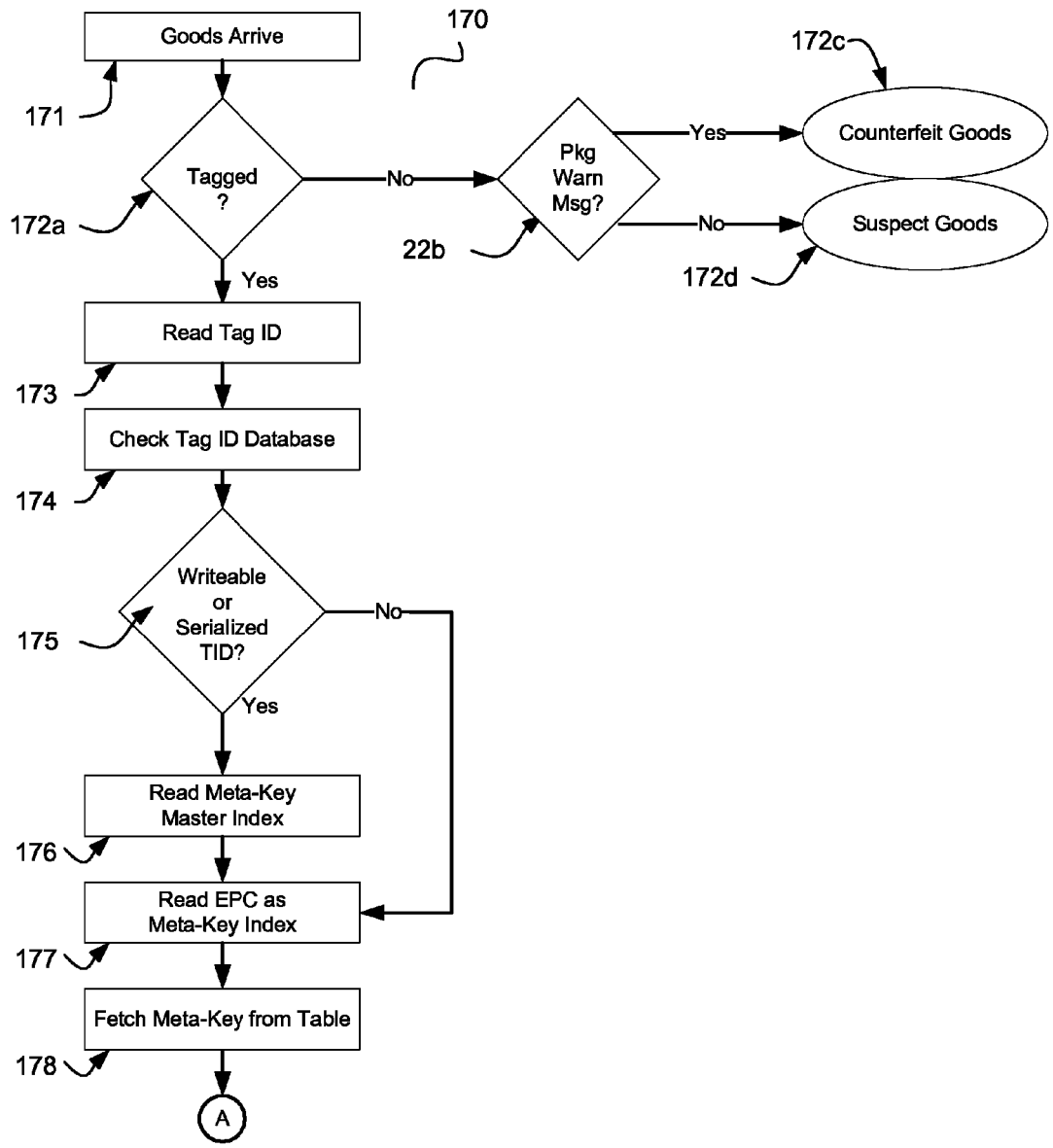
FIG. 17 is a Meta-Key Master Index flow chart according to one embodiment of the present invention.

Referring now to FIG. 17 is a preferred method 170 of authenticating RFID tags and by extension the goods that they are attached to. In the first step 171 goods arrive at a location such as a shipping dock, a border crossing, a warehouse, or a retail location.

In step 172a the goods are scanned for an RFID tag preferably using secure RFID tag authenticator 17. If one is not detected, then the package is visually inspected for Counterfeit (Warning) Label 22b imprinted onto sellable item 22a. If Counterfeit Label 22b is present, then the goods are counterfeit and are forwarded to step 172c for legal, forensics, and logistics handling. On the other hand, if there is no Counterfeit Label 22b, then the goods are suspect and forwarded to step 172d as Suspect Goods. In either case Authenticator Heuristics Engine 166 is updated with a record of the incidence and correlated with GPS coordinates from GPS receiver 51.

If there is an RFID tag then step 173 is executed wherein the tag is read. Tag ID 73a is first checked in step 174 against a list of RFID tags that are known to have a writeable TID memory bank 73 or alternatively having uniquely serialized TID numbers. Lacking that ability or any other standard memory location to use as an index to continually update the keys for decrypting Encrypted QCC 74a, in step 175 control skips step 176 to proceed at step 177 below with default Meta-Key Master Index value of zero.

Therefore EPC RFID tags that would otherwise be made vulnerable to counterfeiting by having a writeable TID, a writeable TID is used advantageously to provide a Meta-Key Master Index. For example, if there are 64-bits of writeable TID, then the lower 16-bits are preferably used to select from a table of up to 65,536 Meta-Key key groups.

In step 176 the writeable or uniquely serialized TID 73 is read to extract Meta-Key Master Index 73b.

In step 177 EPC SGTIN 72a is read and the upper (i.e. most significant) bits of the serial number of the SGTIN are merged with the Meta-Key Master Index to form Meta-Key Index 140c which is used in step 179 to fetch a Meta-Key from Meta-Key Table 140d. This structure provides for a remotely and locally controlled Meta-Key change mechanism to thwart counterfeiting.

Figure 18:
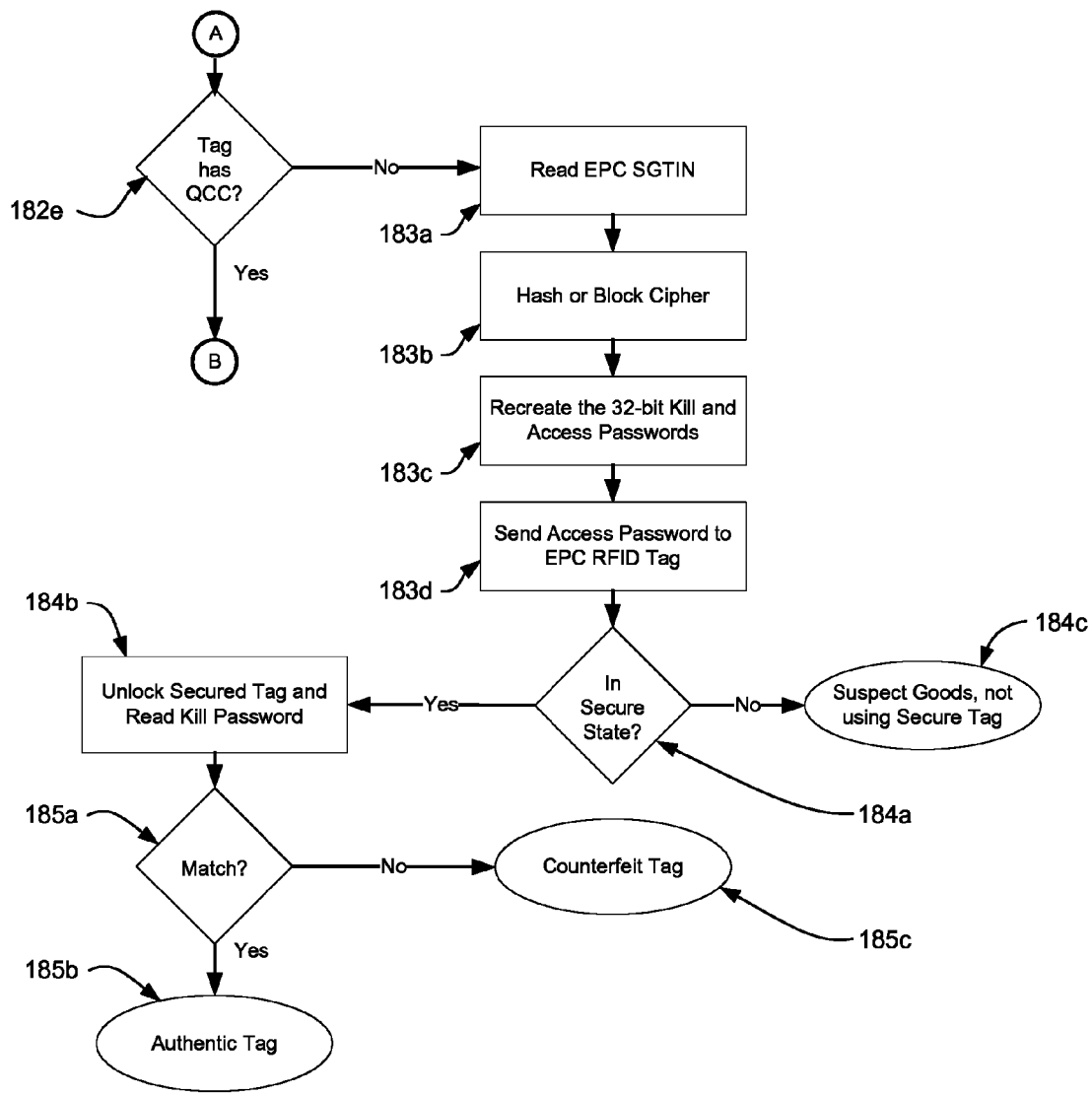
FIG. 18 is a fixed key password verification flow chart according to one embodiment of the present invention.

Continuing on to FIG. 18, in step 182e RFID tag 70 is scanned for Encrypted QCC 74a. If a string of bits of the correct length for an Encrypted QCC is found and preferably has a certain minimum Hamming Weight, then the advanced tag authentication procedure 190 of FIG. 19 is used beginning at step 191a where Encrypted QCC 74a is read into secure RFID tag authenticator 17.

Figure 14:
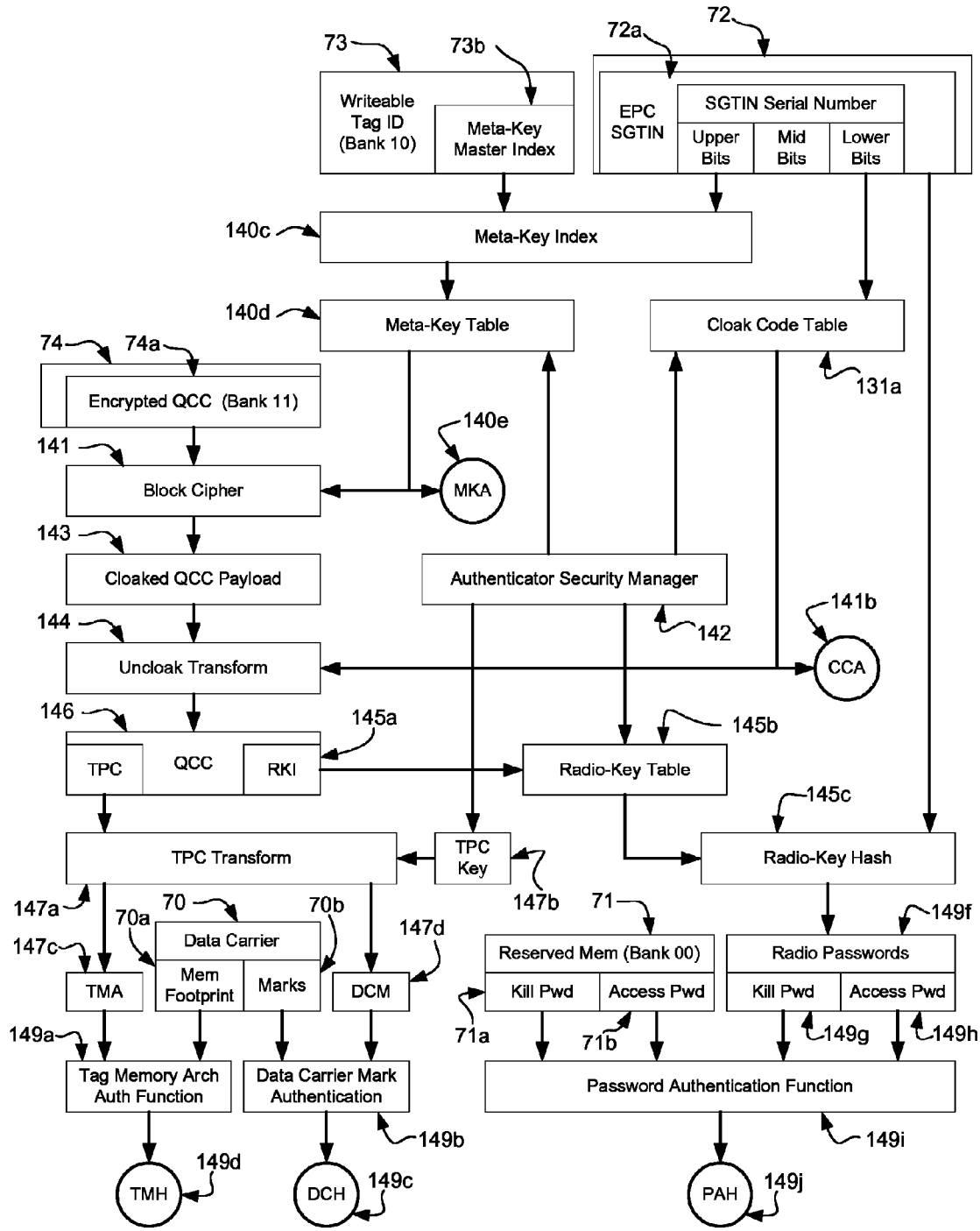
FIG. 14 is a block diagram of a password and QCC decoding apparatus for a secure RFID tag authenticator according to one embodiment of the present invention.
Figure 16:
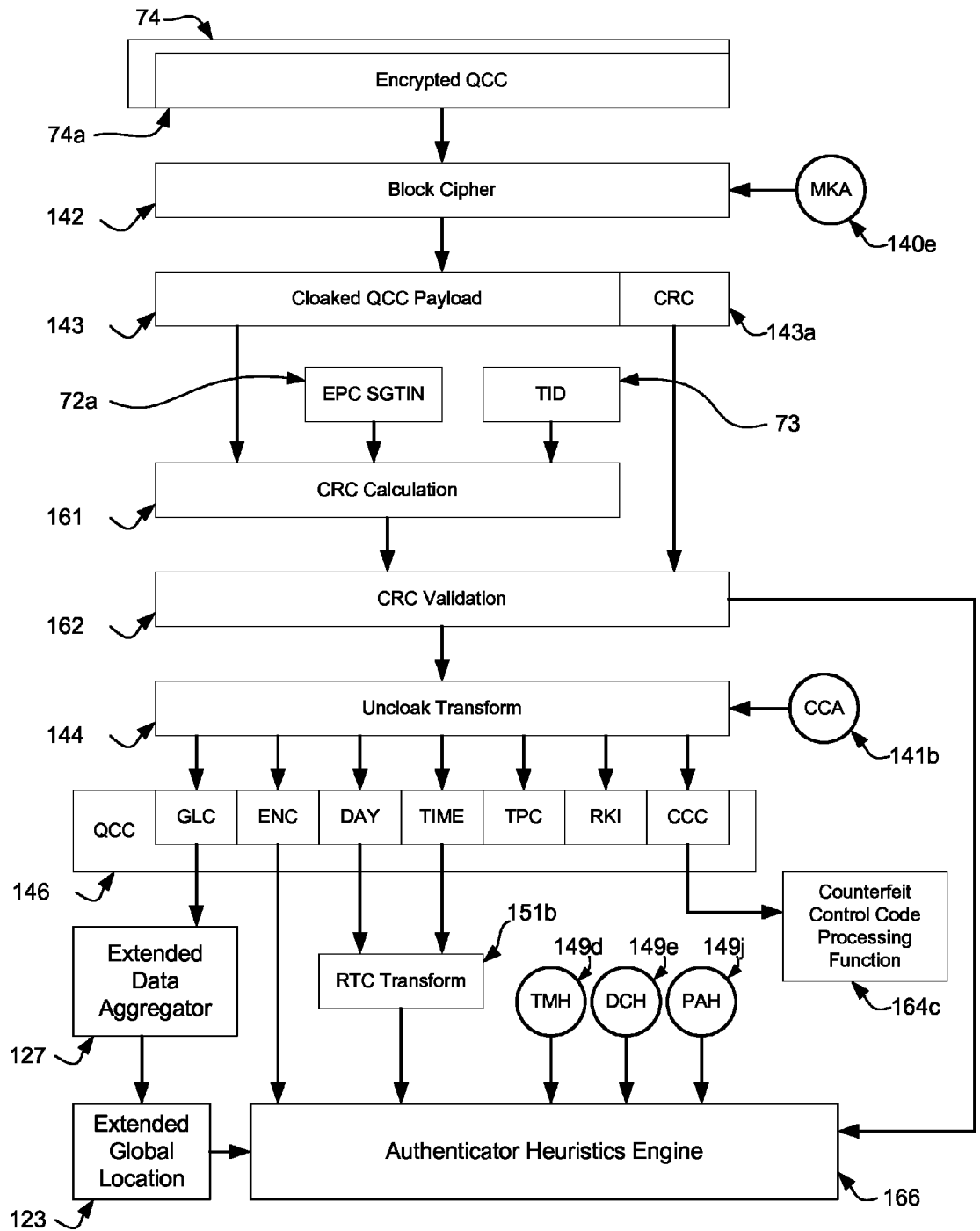
FIG. 16 is a block diagram of a QCC decryption apparatus for a secure RFID tag authenticator according to one embodiment of the present invention.

In step 191b Encrypted QCC 74a is decrypted by symmetric block cipher 141 of FIGS. 14 and 16 using Meta-Key MKA 140e from Meta-Key Table 140d.

In step 191c the plaintext result of block cipher 141 is comprised of Cloaked QCC Payload 143 and CRC 143a. In the following step 191d Cloaked QCC Payload 143 is uncloaked using Uncloak Transform 144 and Cloak Code CCA 141*b*. Preferred cloaking transforms include XOR, bit shifting, byte shifting, and block rotation operations that have inverse counterparts.

Figure 19:
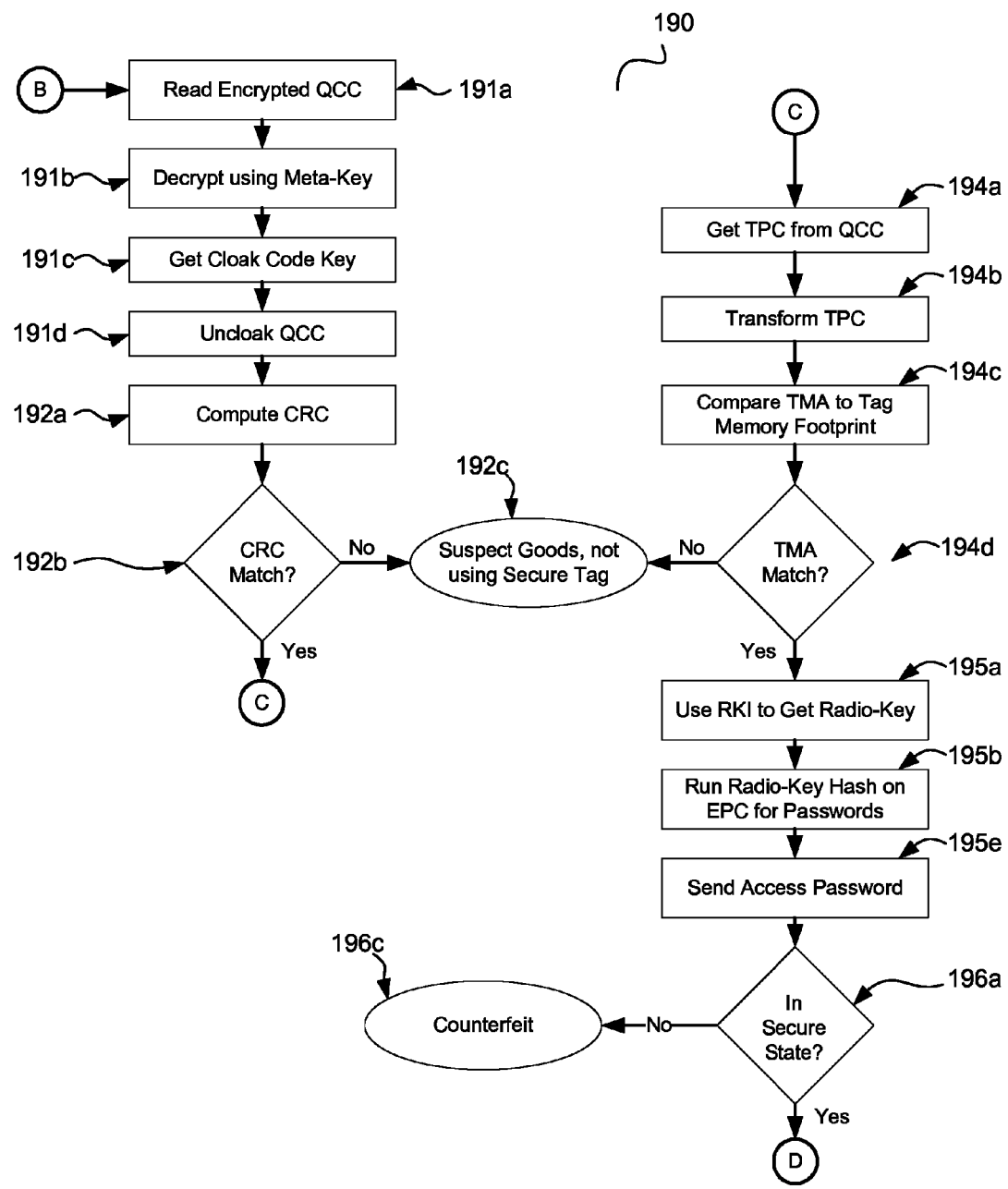
FIG. 19 is a comprehensive item authentication flow chart according to one embodiment of the present invention.

In step 192*a* of FIG. 19 the CRC of FIG. 16 is computed by CRC Calculation 161 using Cloaked QCC Payload 143, EPC SGTIN 72*a*, and TID 73.

In step 192*b* CRC Validation 162 is performed by comparing the calculated CRC from CRC Calculation 161 with CRC 143*a*. If they do not match, then this may be an initial indication that a counterfeiter has attempted to clone a valid RFID tag 70 onto a data carrier that lacks the proper TID or a malformed QCC was used in a cloning effort; therefore the goods are suspect and process flow is diverted to step 192*c*.

If the CRC matched, then flow passes to step 194*a* where attention is focused on the function block diagram of FIG. 14 wherein Tag Physical Characteristics (TPC) filed of QCC 146 is read and subsequently transformed by TPC Transform 147*a* in step 194*b*. In preferred embodiments the transformation process is a 32-bit cryptographic block transformation or another symmetric key process. It is well known that a 32-bit cipher is not suitable for high security applications. In the present invention, TPC Transform 147*a* is part of a comprehensive security system, and by itself does not expose any significant vulnerability. Preferred embodiments use Skip32 which is a 32-bit block cipher based on SKIPJACK.

TPC Transform 147*a* is the inverse of the 32-bit block cipher encryption process that is used by preferred RFID tag converter companies while preparing tag stock for secure RFID tag encoder 16. Therefore TPC Key 147*b* is shared between all tag converters and all secure RFID tag authenticators 17. TPC Key 147*b* is updatable through Authenticator Security Manager 142, but steps must be taken to synchronize key changes between all parties. A preferred embodiment (not shown) uses the DAY field of QCC 146 to synchronize TPC Key changes by selecting the key changes based on the DAY that each RFID tag 70 was encoded.

The plaintext result of TPC Transform 147*a* is two parts: TMA 147*c* and DCM 147*d*, two elements that are used to describe the physical characteristics of the data carrier and do not refer to the data that is stored in the data carrier. These elements were defined when the data carrier was manufactured by the tag converter and they are unchanged by secure RFID tag encoder 16.

In step 194*c* Tag Memory Architecture Authentication Function 149*a* is performed where Memory Footprint 70*a* of RFID tag 70 is compared with TMA 147*c*, step 194*d*. During this step, there is no secret information that is revealed by the tag reading process that could be advantageously used by a cryptographic adversary that may be 'snooping' a covert verification process. This is an important initial qualification step that can be performed in public, even in a crowded street market where illicit goods are sold. If the foot prints do not match, the goods are marked as suspect goods. If this is part of a covert surveillance scan in an open market, the immediate GPS 51 reading of secure RFID tag authenticator 17 is preferably recorded with this reading.

If the tag memory footprint was valid, then flow progresses to step 195*a* wherein radio key index RKI 145*a* is used to fetch a radio key from Radio Key Table 145*b* and in subsequent step 195*b* execute Radio Key Hash function 145*c* as shown in FIG. 14 to produce Radio Password result 149*f* that contains kill password 149*f* and access password 149*h*.

Figure 20:
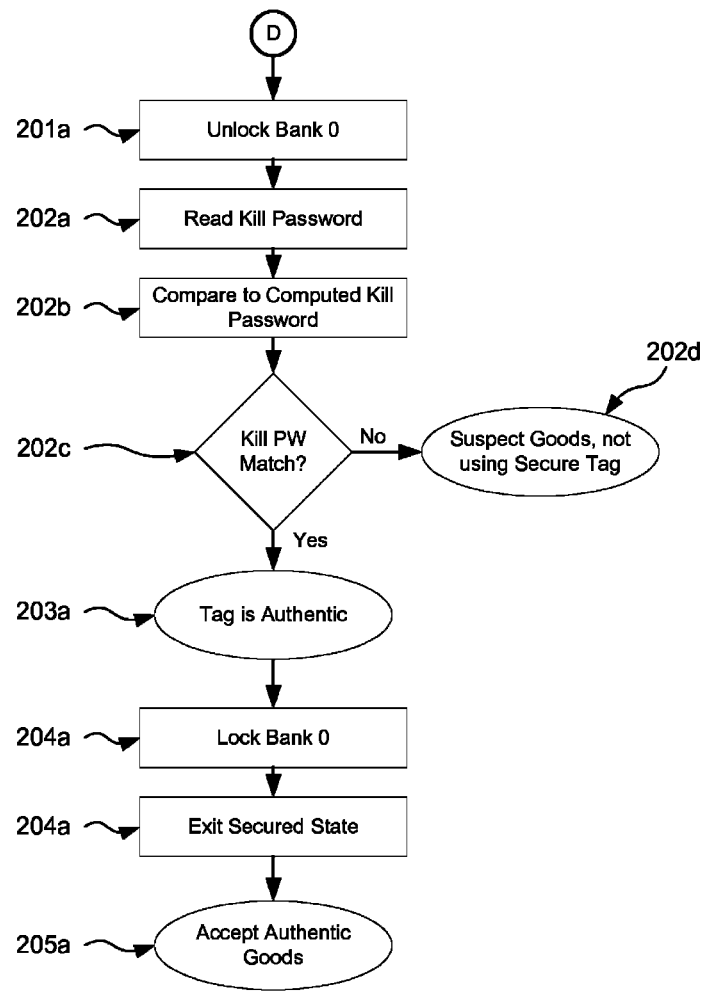
FIG. 20 is a final confirmation of authenticity flow chart according to one embodiment of the present invention.

In step 195*e* access password 149*h* is sent to RFID tag 70 so that it will traverse to the secured state if it was a valid access password (if not valid it is flagged as a counterfeit in step 196*c*) and in step 196*a* will transfer flow to step 201*a* of FIG. 20 wherein the lock bits are cleared and then in step 202*a* the kill password 71*a* is read from reserved memory 71 and in step 202*b* it is compared with kill password 149*f* in Password Authentication Function 149*i* of FIG. 14. If the comparison does not match, as in step 202*d*, the tagged item is flagged as a suspect good. At which point, results can be sent to Password Authentication Heuristics 149*j*.

If in step 196*a* tag 70 did not traverse to the secured state, then it and the goods that tag 70 are attached to are deemed to be counterfeit and are rejected. If in step 202*b* described above the result is a mismatch between the stored and the computed kill passwords, then again the conclusion is that tag 70 and the associated goods are counterfeit and are rejected as may be instructed by Human Interface 56 of FIG. 5. These are screening steps that that are performed over the air, preferably under controlled conditions where there is not a danger of detection by cryptographic adversaries. Jammer 58*b* of FIG. 5 is preferably used with Interrogator 58*a* and antenna 58*c* in preferred embodiments in order to enhance security and reduce vulnerability to cryptographic attack when secure RFID tag authenticator 17 is used to perform these critical steps 195*e* through 202*c* in an uncontrolled space where electromagnetic waves can propagate to someone who is eavesdropping on the process.

In a preferred embodiment, a kiosk is used in a retail environment such as a store or a shopping mall where consumers can verify tagged items and observe quantitative results on a display panel of Human Interface 56 of secure RFID tag authenticator 17. In this embodiment wave propagation from antenna 58*c* is confined to the boundaries of a shielded Faraday cage into which a consumer places retail items for secure authentication. This embodiment can incorporate an imaging device 55 for authentication of printed or micro-features. Network node 52*b* is used to periodically communicate with security server 10*a* and exchange important heuristics data on a global scale.

In a controlled setting such as a customs inspection or a warehouse receiving process, Object Transport 59 of FIG. 5 is preferably used to automatically assist with the scanning of thousands of items per minute by moving goods through the RF field of FIG. 5 under controlled conditions.

In step 203*a* of FIG. 20 the goods are passed because tag 70 was determined by over-the-air verification methods to be authentic. In step 204*a* tag 70 is relocked and in step 204*b* tag 70 exits the secured state. Then in step 205*a* the goods are accepted as authentic.

Referring now back to FIG. 18, if at step 182*e* the result was that there was no Encrypted QCC in User Memory 74 of tag 70, then control will flow to step 183*a* where EPC SGTIN 72*a* is read then in step 183*b* it is hashed or a 64-bit portion of it is run through a 64-bit Block Cipher using Direct-Key which is a cryptographic key that is maintained by Encoder Security Manager 112.

The converted result is used in step 183*c* to provide the 32-bit kill password and 32-bit access password. In step 183*d* Interrogator 48*a* is used to send that access password to tag 70 to transition it into the secured state.

If in step 184*a* it is determined that tag 70 is in the secured state, then control will flow to step 184*b*, otherwise tag 70 is deemed to be suspect at step 184*c*.

In step 184*b* tag 70 is unlocked and the kill password is read. If in step 185*a* it is determined that the kill password was incorrect, then control is diverted to step 185*c* where tag 70 and the associated goods are deemed to be counterfeit. Otherwise, if the kill password is correct, tag 70 and the goods are deemed to be authentic at step 185*b*. Tag 70 is then resecured.

Figure 22:
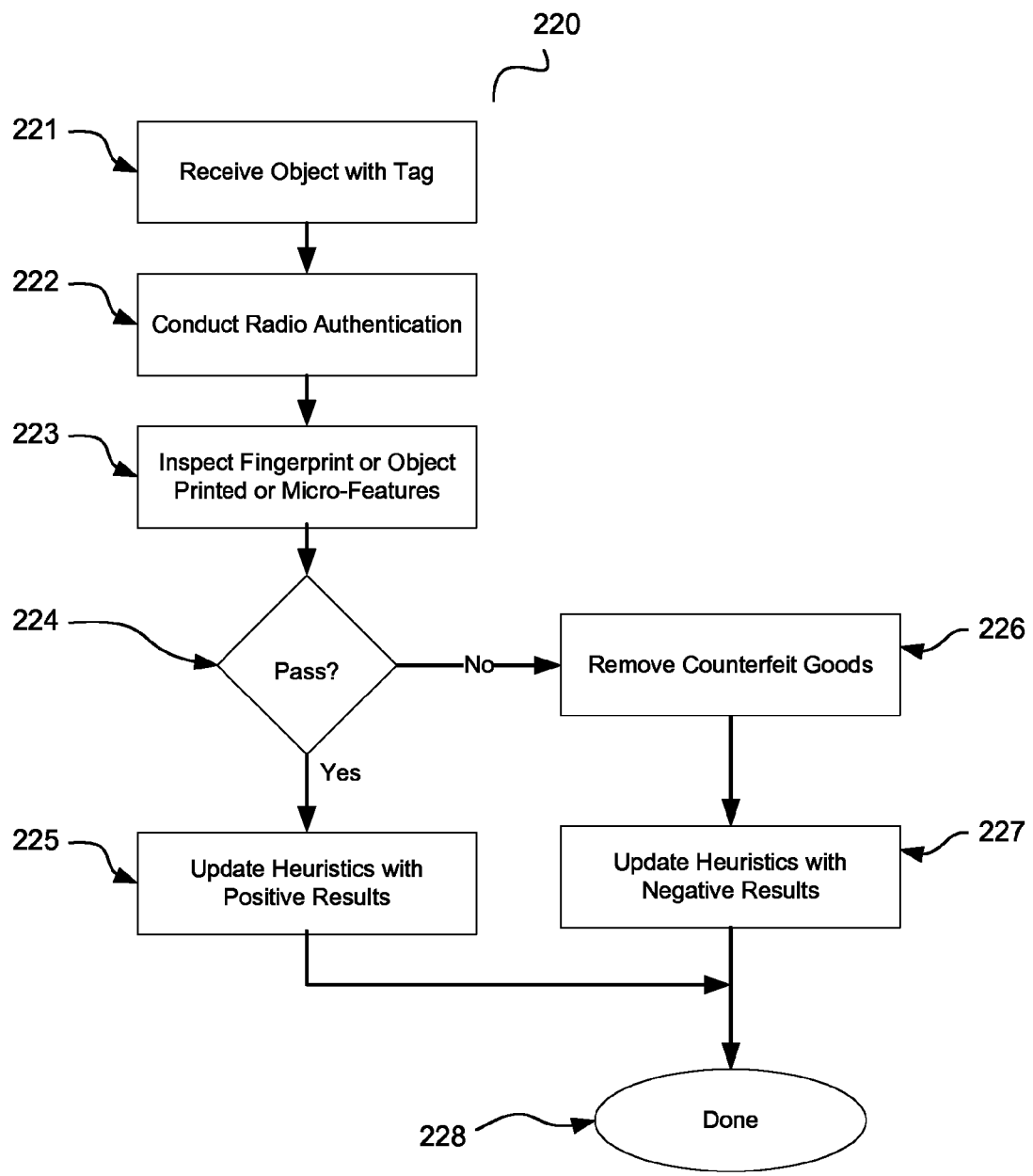
FIG. 22 is a total authentication flow chart according to one embodiment of the present invention.

Note that further testing can optionally be performed on a sample basis as shown in step 223 of FIG. 22 wherein printed, holographic, or micro-features are inspected.

Comprehensive Authentication Process

Referring now to FIG. 22 there is a preferred method 220 of authenticating goods wherein there is a combination of over-the-air testing and up close inspection of tags and goods.

In step 221 goods are for example received at a receiving dock.

In step 222 the goods are subjected to over-the-air Radio Authentication using the steps disclosed in FIGS. 17 through 16.

In step 223 certain goods are selected for up close inspection of printed, holographic, micro-scribed, micro-features, or human fingerprints 79a to determine authenticity. In preferred embodiments, DCM 147d is used to determine what features are expected to be present. DCM 147d is preferably used to reference a table or other secure document to authorized inspectors that specifies the feature details.

In preferred embodiments, the unique operator number is acquired from DCM 147d so that a fingerprint record can be accessed from Fingerprint Database 69 and preferably locally cached in Authenticator 17. Authenticator 17 contains Light Source 17b and Imager 17c to illuminate and read fingerprint 79a that was left in adhesive 79 when RFID tag 70 was manually applied to sellable item 22a in Manufacturing Plant or Distribution Point A 21. Light Source 17b preferably emits light in either the visible or the ultraviolet range of the light spectrum at such an angel to reveal the molded impressions from the ridges on the operator's finger. If there are oils, salt, or amino acids left adhered to adhesive 79, they will be highlighted by the UV light. In preferred embodiments photometric stereo imaging is used to accentuate the topographical components and remove the albedo variations in fingerprint 79a. In certain preferred embodiments, facestock 75 is clear so that fingerprint 79a can be seen by Imager 17c through facestock 75 with proper illumination from Light Source 17b. The image is then processed by Anti-Counterfeit Network Client 52a to produce an image or minutia that are compared to reference images of the designated operator that are stored in Fingerprint Database 69 in Security Server 10a. If there is a match, then tag 70 is authentic. If there is not a match, then the tag sample may be a clone of an authentic tag and is therefore counterfeit. This determination and response is further described in the following step 224.

In step 224 a determination is made as to whether the features are what they should be. If yes, heuristics receives a positive update in step 225, if not then the process diverts to step 226 where goods are deemed to be counterfeit and they are removed from the supply chain.

Accordingly, in step 227 Authentication Database 57 and Counterfeit Heuristics Engine 54 are updated and reported through Anti-Counterfeit Network Client 52a running on Operating System 53 (all of FIG. 5) to Anti-Counterfeit Authentication Socket 62 and on to Authentication Database 68 and Counterfeit Heuristics Engine 64 of Security Server 10a all of FIG. 6. The process is done at step 228 and is repeated for additional items.

If in step 224 the features matched, then the goods are deemed authentic and the same databases and heuristics engines are updated with positive results that indicate an improved level of trust for the related SKU, encoder, and trading partner. The process of inspecting the current item is thus done in step 228.

Counterfeit Control Code

The Counterfeit Control Code (CCC) is the result of historical supply chain performance data that is interpreted by Counterfeit Heuristics Engine 54 of secure RFID tag authenticator 17 and Counterfeit Heuristics Engine 64 of Security Server 10a. Each SKU of each secure RFID tag encoder 16 preferably has an independently controllable CCC that resides in CCC Table 152a. Whenever a tag is encoded, CCC Table 152a is referenced for the current CCC and it is merged into QCC 134.

The purpose of the CCC is to assist analysts and trademark enforcers in conducting more efficient screening with RFID. Factors that affect the CCC include but are not limited to:

History of counterfeits found from a particular location
History of counterfeits found from a particular encoder
History of counterfeits found within a certain distribution network
History of counterfeits found for a particular SKU or product category
Irregularities found in remote monitoring of encoding activity
Counterfeits of tag stock found that was originally sent to a tagging location
Statistically high incidence of certain numbers that is indicative of someone having cracked or obtained a cryptographic key that is referenced by for example the same Meta-Key Master Index 73b or ranges of SGTIN serial numbers that occur with unusually high frequency.

The CCC is used to insert controlled changes in the QCC that can then be measured downstream throughout an entire distribution network. In one example, counterfeiters copy a QCC with the CCC at a first setting, and through closer analysis are found by brand enforcement officials to be counterfeit, then the CCC is changed on legitimate products to a different value and all 'real' goods bear a second CCC value. This change is then detected and red-flagged in the distribution channel and counterfeiters are soon tracked down.

Anti-Eavesdropping Jammer

A radio frequency signal jammer is used in preferred embodiments to prevent an eavesdropper from securing the RN16 random numbers or the access or kill passwords that are backscattered from a tag to an encoder's interrogator. The RN16 is fully described in the EPC air interface protocol specification and two of them are used for bitwise-XOR with the first and second halves respectively of the 32-bit access and kill passwords in order to hide them from eavesdroppers. This is an EPC tag security measure called cover coding that is used to hide the identity of the secret passwords as they are transmitted to the RFID tag that is being encoded or queried. The backscattered signal is tens of decibels below the carrier wave that is transmitted by the interrogator. This helps to reduce the signal to noise ratio of the signal that is available to the eavesdropper. The signal that is available to the eavesdropper that is listening outside of the enclosure is further reduced by metallic shielding and radio frequency energy absorbing materials. Creation of an actual Faraday cage would of course require very limited access to the tag encoding zone, possibly using a door that closes for encoding and opens for tag dispensing. Such a security mechanism would have to be tamper-proof to prevent an eavesdropper from defeating this electro-mechanical lockout.

Preferred embodiments of RFID tag encoders use near field coupling to communicate with a RFID tag, and a far field antenna for radiating a jamming signal into the air surrounding the RFID tag encoder. The near field coupler communicates with the tag primarily through magnetic fields that alter the impedance seen by the interrogator to bring the near field coupler into a closer impedance match with the interrogator's antenna port. The result is that the only time that the interrogator radiates efficiently is when an RFID tag is in close enough proximity to change the complex impedance of the near field coupler. This is similar to how a transformer operates whereby there is mutual impedance that alters the impedance of both coils (i.e. coils or loops in the interrogator's near field coupler and the RFID tag).

A far field antenna for the jammer preferably radiates much more electric field than it does magnetic field. The result is that the communications between the tag and the near field coupler are not appreciably affected, but observers at any distance outside of the covers of the RFID tag encoder are unable to separate the jamming signals from the low level backscatter signals from the tag. In preferred embodiments the interrogator is set to transmit at less than 10 dBm, and often at 5 dBm or less. This means that the backscattered signal from the RFID tag is substantially less than that, making detection difficult in the presence of an active jammer that is operating at the same or similar radio frequencies as the interrogator's carrier wave.

In one embodiment, a jamming signal is produced by allowing a separate frequency hopping signal be emitted from the jamming antenna. The signal may have modulated information on it that obfuscates the actual tag encoding and interrogation process. For example, the modulation may include simulation of interrogator commands and (weaker) backscattered tag responses. Care must be taken to not engage nearby tags in an actual dialog to prevent accidental programming or interrogation of any tags by the jammer.

In another embodiment, the interrogator's transmitted signals are routed from the output of the RF amplifier to the jamming antenna such that the carrier wave that is emitted to a tag while the tag is backscattering information is also radiated from the jamming antenna as an un-modulated carrier signal. The result for properly configured antennae is that the eavesdropper is unable to detect the modulated backscatter because the carrier wave signal is so much stronger when observed outside of the enclosure.

In yet a third preferred embodiment, the interrogator's transmitted signals are routed from the interrogator, through a modulator that simulates a low level backscatter modulation from an RFID tag and transmits that out on the jamming antenna. The simulated backscatter would be implemented whenever the tag is expected to emit a secret number (such as an RN16, an access password, or a kill password that is read from reserved memory), and uses a separate pseudorandom number generator to produce different RN-16 numbers that are modulated onto the carrier wave at a low modulation depth. The low modulation depth serves two purposes:

1) to simulate tag backscatter; and
2) to reduce the chance that the interrogator is confused by the simulated backscatter from the jamming antenna.

A fourth jamming method takes advantage of the heterodyne of the interrogator and the interrogator's advantageous use of the pseudo-random hopping that is required by governmental regulatory authorities. It is nearly impossible for an eavesdropper to know what the frequency of the next hop, and is therefore required to scan for RF energy across the entire band of operation. In the U.S. the UHF band for RFID is 902-928 MHz, a span of 26 Mhz that must be accepted by the eavesdropper. The interrogator in the RFID encoder has a receiver that needs to only cover the channel width which is typically 200 KHz to 500 KHz. This gives the interrogator a significant advantage by having a receiver that is responsive to signals in only small part of the entire band at any one time.

In some embodiments, the jamming antenna is physically positioned such that it does not significantly radiate onto the RFID tag. In some embodiments, the interrogation antenna and the jamming antenna are a single shared radiating structure. An advantage of using the same antenna for both interrogation and jamming is that the adversaries cannot defeat the jammer by disabling the jammer's antenna without also defeating the interrogator as well; thus the antenna tampering incentive is eliminated.

Different antenna arrangements and power levels are preferred for RFID tag encoding as are for RFID tag interrogation when used in covert RFID tag interrogations where there are dangers of detection by cryptographic adversaries.

Long range verification can be performed on populations of RFID tags that have been encoded with the secure RFID encoder. At long range, the EPC SGTIN, QCC, Access Password, and Kill Password can be read and checked for data integrity and also checked against a database. Range can be enhanced by using narrow beam width antennae, high transmit power, and ultra sensitive receivers to observe suspected counterfeit goods at a safe distance. A narrow beam width antenna is also a high gain antenna, such as a helical or a dish antenna. When is there is sufficient suspicion of the goods to warrant a close visual inspection, the short range verifier is used on each selected item. A short range verifier is capable of inspecting a tag by reading the hidden printed features and reading data from the tag's chip and verifying that the two match.

The jamming antenna (whether or not it is implemented as a separate radiating structure) is used to simultaneously transmit a second signal in another in-band channel that is not necessarily the same channel as the interrogator is using to communicate with the RFID tag. As described above, the jamming signal preferably has a simulated backscatter data transmission modulated onto it. The result is that a part of the jamming signal will impinge upon the RFID tag and be backscattered slightly to where an eavesdropper can intercept it, however in a properly designed system, the real backscatter from the RFID tag will be significantly less than the simulated backscatter, making it all but impossible for an eavesdropper to detect the RN16's that are necessary to decrypt the passwords as they are subsequently sent to the RFID tag or the access and kill passwords that are read from a tag during a tag authentication process. The interrogator is not appreciably affected by the jamming signal since out-of-channel noise is rejected as required for dense-interrogator environments in the EPC air interface protocol specification. Signal separation of an interrogator's fake backscatter from the tag's real backscatter is also possible using advanced signal processing means to remove the known fake backscatter modulation from the incoming signal.

This novel design for hiding the RN16's that are used for cover-coding the passwords sent to the tag or the passwords that are read directly from the tag will prevent eavesdroppers from detecting secret passwords at either the tag encoding or the tag verification points in the supply chains where this invention is used for secure tag authentication.

Highly Mobile Authenticator

A preferred embodiment of FIG. 5 for a highly mobile authenticator uses a GPS-enabled smart phone to provide GPS 51, Anti-Counterfeit Network Client 52a, Operating System 53 (such as Embedded Linux or Android), Counterfeit Heuristics 54, Network Node 52b (as TCP/IP over a wireless carrier using GPRS, 3G, or 4G telecommunications), Authentication Database 57, Imaging 55, and Human Interface 56.

Bluetooth is preferably used to communicate over an authenticated and encrypted wireless connection to a battery-powered mobile RFID verification device that is preferably comprised of Interrogator 58a, Jammer 58b, and Antenna 58c. Cached copies of data are securely stored in protected memory of the battery-powered mobile RFID verification device in order to reduce the amount of secure data that would be exchanged across the Bluetooth link.

In a preferred embodiment, Imager 17*c* is used to scan human fingerprint 79*a* that has been preserved in adhesive layer 79 of RFID tag 70. Fingerprint 79*a* is scanned and compared to the fingerprint information that is conveyed by the RFID tag or stored in Fingerprint Database 69. If fingerprint 79*a* matches the fingerprint that is on record in the RFID tag, then it is an authentic tag that was produced by a valid tag encoder 16 with a proper set of encryption keys that were used to encode the fingerprint information into RFID tag 70.

Object Transport 59 is in this embodiment not implemented as a conveyor but rather as hand, body, motorcycle, Segway Human Transporter, or moped motion to sweep past numerous tagged goods.

Method of Encoding Secure RFID Tags

Figure 21:
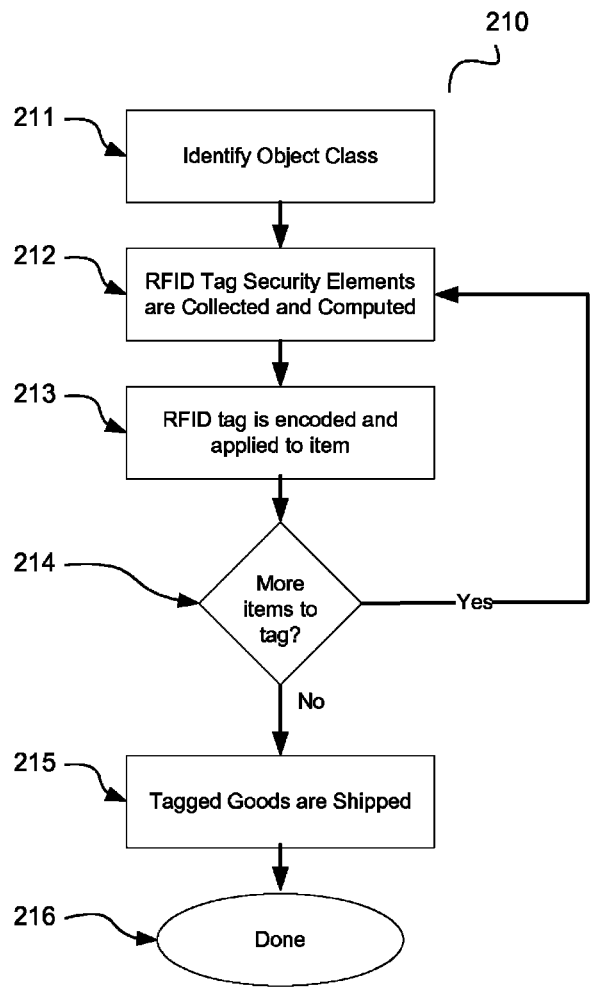
FIG. 21 is a secure tagging flow chart according to one embodiment of the present invention.

FIG. 21 illustrates a preferred method 210 of securely identifying goods for shipment to another location. In step 211 goods are identified preferably using an error-proof means of identification, such as reading an object class bar code such as a UPC-A, UPC-E, EAN, a GTIN, or another similar symbol that uniquely identifies the class or type of an object that is to be tagged. Bar code symbols are preferably read from scanner 46 of FIG. 4 which may be built-in, tethered by a cable or a gooseneck, or electronically tethered through a wireless connection such as Bluetooth or Wi-Fi to Secure RFID tag encoder 16. For implementations on a conveyor belt under the control of object transport 49, scanner 46 may be upstream of the encoding antenna 48*c* in order to allow time for executing computations in step 212 below.

In step 212 all of the various types of information that is disclosed in this patent are compiled and presented in a coded numerical format that can be encoded into an RFID tag. Information is acquired from GPS 41 which may also provide updated date and time information to real time clock 151*a* and transformed by RTC Transform 151*b* into DAY and TIME fields of QCC 134, and also preferably encrypted TPC 74*b* information that was written into a memory bank by a tag converter. The entire information set may include, but is not limited to the current location, date, time, tag memory architecture, Encoder Number 150, TPC, Counterfeit Control Code (CCC), radio key index RKI, EPC SGTIN 72*a*, tag ID 73*a*, Meta-Key Master Index 73*b*, kill password 71*a*, access password 71*b*, and a cyclical redundancy check CRC. As an optional step, spreading function 118 may be utilized to spread more detailed information into a population of RFID tags 70.

Figure 15:
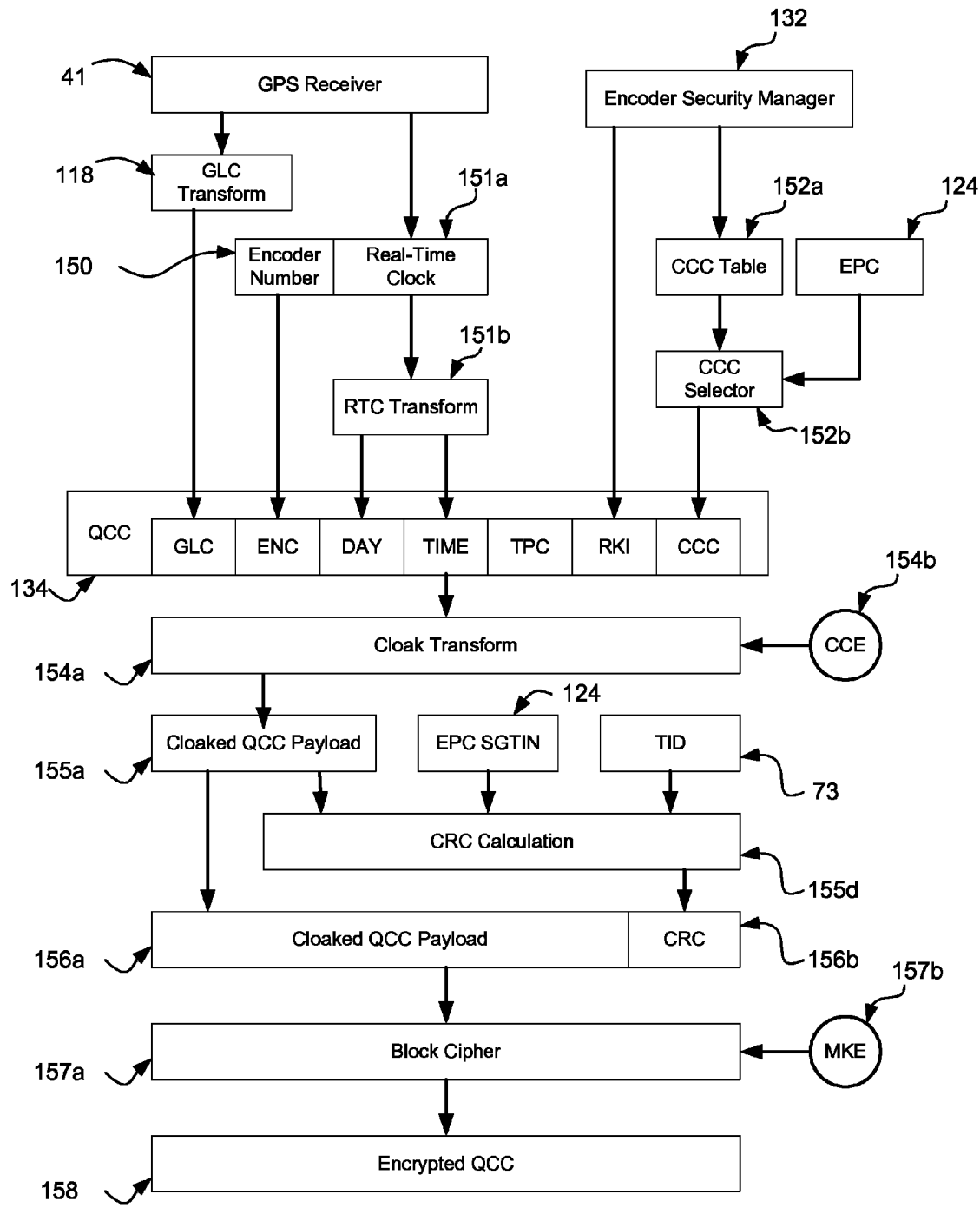
FIG. 15 is a block diagram of a QCC encryption apparatus for a secure RFID tag encoder according to one embodiment of the present invention.

Referring to FIG. 15, once the entire QCC 134 data fields are all loaded (except for CRC) the image is cloaked by Cloak Transform 154*a* using Cloak Key CCE 154*b* that is generated by Cloak Code Table 131*a*. The resulting Cloaked QCC Payload 155*a*, EPC SGTIN 124, and TID 73 are all used by CRC Calculation 155*d* to produce CRC 156*b* which is merged with Cloaked QCC Payload 155*a* to produce merged result "Cloaked QCC Payload and CRC" 156*a*. That result is then put into Block Cipher 157*a* using Meta-Key 157*b* to produce encrypted result Encrypted QCC 158.

In step 213 Encrypted QCC 158, Writeable part of TID, and EPC SGTIN 124 are all encoded into RFID tag 70 using a sequence of programming and verification steps. Information is written into each writeable memory bank of RFID chip 76.

The process is repeated from steps 212 until all tags are programmed and tagged, at which point control flows to step 215 wherein goods are shipped. This step optionally includes reporting of tagged goods to the recipient in the form of an advance ship notice or a similar record of transfer.

In step 216 the process is done.

Global System

Figure 1:
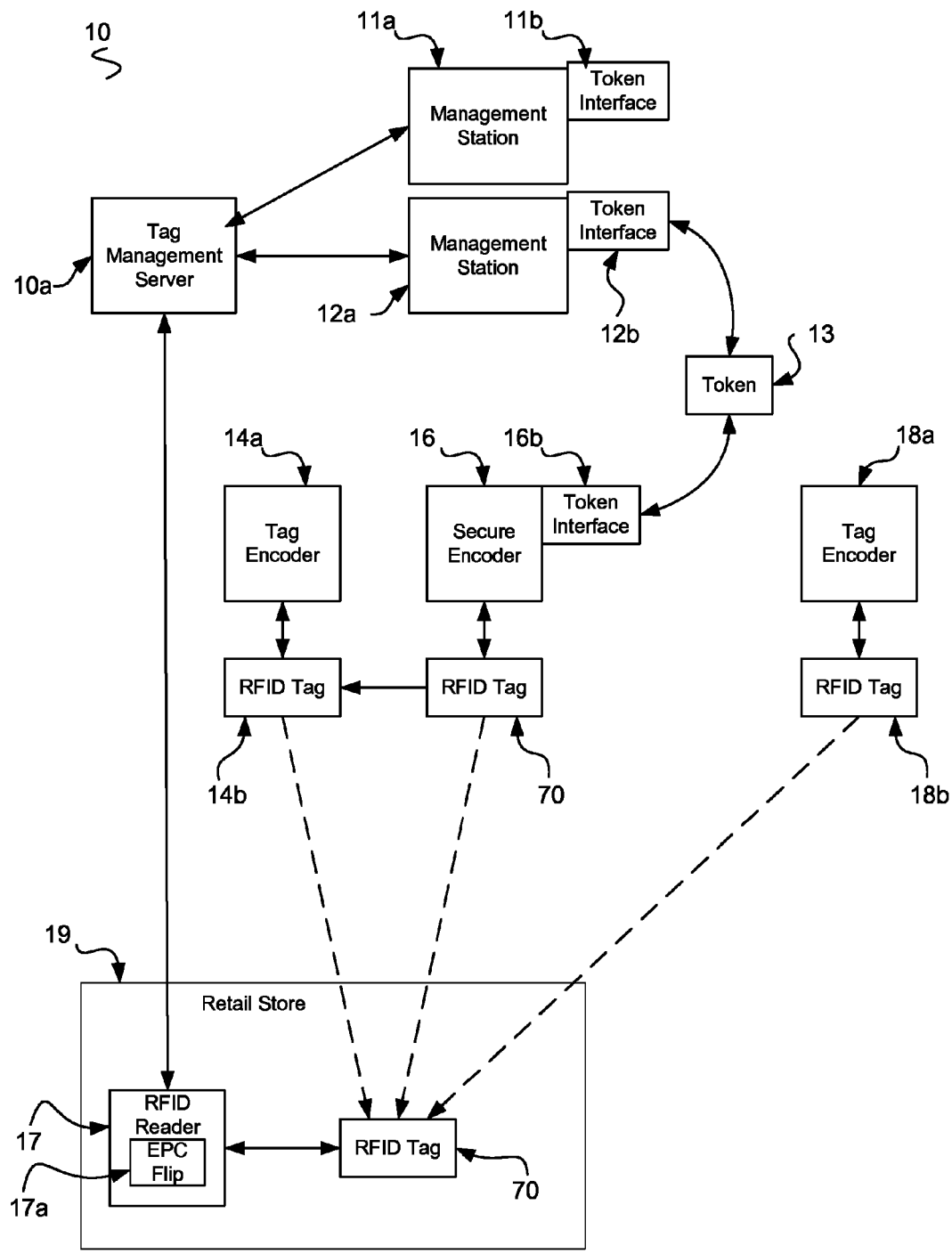
FIG. 1 is a block diagram of the system according to one embodiment of the present invention.

Referring to FIG. 1 there is a further embodiment of secure, global system of RFID tag encoders and retailers (including military organizations that for the purposes of this disclosure consume and distribute goods to people in ways that are similar to retail organizations). Central to the global system of RFID tag encoders is Tag Management Server 10*a*

Tag Management Server 10*a* preferably hosts a database that contains all of the SKU's that are under the care of Tagging System 10. Tag Management Server 10*a* is a trusted source of data for Tagging System 10. The database preferably contains a record for each 14-digit GTIN (Global Trade Item Number) at each packaging level that is defined for that GTIN. Each GTIN record preferably contains a child record for each block of serial numbers that is assigned to an encoder. Each child record preferably contains information about one batch or group of same-GTIN RFID tags:

- A globally consistent and unique encoder number. Each Encoder is preferably specified by a GS1 asset identifier, SGTIN, or general identifier GID-96. A GID-96 General Manager Number is preferably assigned to the manufacturer of the RFID tag encoder. The GID-96 Object Class would be the model number of the tag encoder, and the Serial Number field would be uniquely numbered with the serial number of the tag encoder. This method of numbering each and every RFID tag encoder in a uniform manner assures that consistent and unique numbers are assigned to each RFID tag encoder, regardless of what GS1 member company manufactured it.
- The starting serial number for the given GTIN batch.
- The number of tags in the current batch (how many tags are authorized for encoding) starting with the specified serial number.
- Optionally include the current date.
- Optionally include an "encode by" date.

Management Stations 11*a* and 12*a* are representative of multiple management stations that are preferably connected to Tag Management Server 10*a* through secure Internet connections that use cryptographically secure protocols that are well known to those skilled in the art. Each Management Station is required to authenticate itself to Tag Management Server 10*a* at the beginning of any communications session in order to exchange data with that trusted source and repository of system data.

Tag Management Server 10*a* preferably implements database security systems, processes, and procedures that protect Tag Management Server 10*a* from unintended activity. Unintended activity includes authenticated misuse, malicious attacks or inadvertent mistakes made by authorized individuals or processes. Tag Management Server 10*a* is preferably protected from rogue external connections by firewalls or routers on the network perimeter with the database environment existing on the internal network. Additional network security devices that detect and alert on malicious database protocol traffic include network intrusion detection systems along with host-based intrusion detection systems. Tag Management Server 10*a* preferably has many layers and types of information security, including: Access control, Auditing, Authentication, Encryption, and Integrity controls.

Management Stations 11*a* and 12*a* each have Token Interface 11*b* and 12*b* respectively that communicate tagging information to and from Secure Encoder 16 through Token Interface 16*b*. Token Interface preferably includes a range of wired, wireless, or physical token devices 13 that are used to pass information between management stations and secure encoders. Wired connections include networks and telephone lines. Wireless connections include WiFi (802.11) and cellular phone networks that carry GPRS and 3G cellular data communications. Physical tokens include silicon devices of various types which are preferably hardened for industrial applications including durable RFID tags, ButtonMemory devices from MacSema of Bend, Oregon, and iButton products from Maxim Integrated Products, Inc. of Sunnyvale, Calif. iButton 13 uses its stainless steel 'can' as an electronic communications interface. Each can has a data contact, called the 'lid', and a ground contact, called the 'base'. Each of these contacts is connected to the silicon chip inside. The lid is the top of the can; the base forms the sides and the bottom of the can and includes a flange to simplify attaching the button to just about anything. The two contacts are separated by a polypropylene grommet. By simply touching the iButton to two reader contacts an operator can communicate with it through Maxim's 1-Wire protocol. The 1-Wire interface has two communication speeds: standard mode at 16 kbps, and overdrive mode at 142 kbps. Each iButton 13 has a unique and unalterable address laser etched onto its chip inside the can. The address can be used as a key or identifier for each iButton. A preferred device is the DS1996L-F5 which offers 64K bits of read/write non-volatile memory.

Whether the token is a physical token such as the iButton or a wired or wireless communications channel, there is no need for continuous communication connections between encoders and management stations. Information is passed using cryptographically secure continuous or intermittent connections. The information that passes from the management station to the encoders preferably includes:

- Management Station Number (preferably as a GID-96)
- Encoder number (preferably as a GID-96)
- GTIN (preferably the full 14 digit GTIN)
- Starting serial number
- Batch size (or ending serial number)
- Confirmation of successful upload of data to tag management server
- Filter Value
- Partition Value
- Authorization Date
- Encode By Date
- Cryptographic keys that are associated with Fixed-Password Table 93
- Cryptographic keys that are associated with Meta-Key Table 103

Information that is returned from encoders to the management stations preferably includes:

- Encoder number (preferably as a GID-96)
- GTIN (preferably the full 14 digit GTIN)
- Starting serial number
- Ending serial number
- Filter Value
- Partition Value
- Current date
- Current time
- Last known GPS location
- Encoder status
- Encoder hardware version
- Encoder firmware version
- Encoder interrogator hardware version
- Encoder interrogator firmware version
- Security violations
- Environmental data log associated with each serial number In preferred embodiments, records are segmented by time to report information at regular intervals such as hourly updates. Such updates are stored and forwarded when a communications channel becomes available or when a physical token is updated for transit back to a management station.

Secure Encoder 16 preferably operates in either of two modes: applicator and batch. Applicator mode is for encoding and applying RFID tags in real time, batch mode is for encoding a roll of RFID tags for use in a secondary process. One such secondary process is to encode UII information onto each batch-encoded tag that is initially encoded with Access and Kill passwords on Secure Encoder 16. Another secondary process is to hand-apply RFID tags or use a legacy label applicator to apply tags to sellable items or other objects.

In either Applicator or Batch mode, Secure RFID Encoder 16 is used to sequentially number groups of tags, with sequentially numbered serial numbers that share the same GTIN at the same packaging level, filter value, and partition value.

Secure Encoder 16 stores in secure memory the cryptographic keys that are associated with Fixed-Password Table 93 for RFID tags that are pre-encoded with Access Password 96*b* and Kill Password 96*c*; and cryptographic keys that are associated with Meta-Key Table 103 for RFID tags that are encoded with Access Password 106*b*, Kill Password 106*c*, User Memory S1 74*c*, User Memory S2 74*d*, and EPC SGTIN 72*a* all at nominally the same time and place. In either case, User Memory S1 74*c* is preferably encoded with a header that identifies the data type and structure and a key selector index that selects which cryptographic key is used with the applicable RFID Tag 70.

It is therefore through a comprehensive set of secure data transfers that the same set of cryptographic keys are shared among Tag Management Server 10*a*, Tag Management Station 11*a* and 12*a*, Secure Encoder 16, and secure RFID Reader 17. The secure data transfers assure that each RFID Tag 70 moving from Secure Tag Encoder 16 or Tag Encoder 14*a* to RFID Reader 17 can be successfully queried for audit information, flipped to an encrypted identity, unflipped to a publicly decodable identity, or killed.

In certain preferred embodiments, goods arrive into a retail store or a military depot with a publicly decodable EPC/UII. At some point thereafter the identity is preferably flipped to the encrypted version of the EPC/UII. The flipping process is in certain preferred embodiments conducted as part of another business process, such as stocking the shelves of a retail store, during customer checkout, shipment to a customer to fulfill a catalog or Internet order, or loading the cargo bed of a military vehicle. Fixed, portal, mobile, wearable, and handheld RFID readers are all preferred embodiments for RFID Reader 17 that contains the secure EPC Flip 17*a* functionality.

A preferred mode of operation of RFID Reader 17 is to conduct inventory reads of large populations of EPC RFID tags. During that process tags that have been flipped (i.e. converted to the encrypted version) can also be included in the inventory count. Since the filter value is distinctly different (as described in the following few pages), RFID Reader 17 can efficiently determine which tags have been flipped and which have not. When reading tags that have been flipped to an encrypted form, the EPC identifier may be decrypted without saving the decrypted (i.e. unflipped) version back to the tag.

Figure 9:
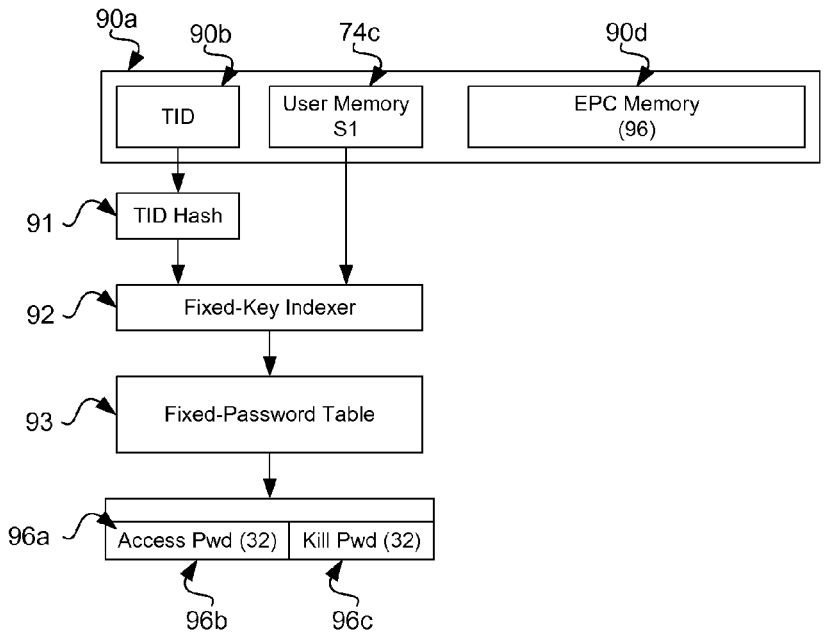
FIG. 9 is a block diagram of a RFID Tag Password Pre-Encoding process.

In a two-step encoding method, Tag Encoder 14*a* encodes RFID Tag 14*b* that was previously encoded with Access Password 96*b* and Kill Password 96*c* as shown in FIG. 9 and is more fully described below. Tagging System 10 therefore includes a number of Tag Encoders that do not have secure tag encoding means, but can be used to encode EPC UII information for use in Retail Store 19. In certain preferred embodiments, unsecured Tag Encoder 14*a* is not afforded the passwords and methods to generate and send Access Password 96*b* to unlock the EPC memory bank of RFID Tag 14*b* so that the EPC can be programmed. Therefore, in the process described here, it is presumed that those lock bits remain in the unlocked state, just as they are for most applications in use today. The RFID Tag 90*a* of FIG. 9, pre-encoded with EPC Memory 90*d*, preferably has a User Memory bank 74*c* to contain header information and key selector bits that are used by Fixed-Key Indexer 92. TID 90*b* is preferably hashed by TID Hash 91 over the total number of available TID bits which usually ranges from 32 to 64 bits. The resulting hash digest is used in conjunction with any available key selection bits in User Memory 74*c*, if present to create an index in Fixed-Key Indexer 92. The index is used to select a single Password Key 96*a* from Fixed Password Table 93. In the event that there is no User Memory 74*c* available, as indicated by the capabilities associated with TID 90*b* or by trial and error by testing for User Memory 74*c*, the preferred fallback is to use fixed tag selector bit combination, such as all zeroes or some fixed pseudorandom number. This then accounts for the case of an unsecured tag encoder and RFID tags that have no User Memory but have non-fixed Access and Kill Passwords 96*a*.

The worst case situation is Tag Encoder 18*a* that encodes RFID Tag 18*b* with static Access and Kill passwords, including zero-valued Access and Kill passwords. In such cases, Retail Store 19 and/or RFID Reader 17 must access a database of EPC numbers in order to determine what the Access and Kill passwords are for EPC Flip 17*a* to perform its intended function.

RFID Reader 17 can preferably read RFID tags from any category of RFID Tag Encoder 14*a* or 18*a*, or Secure Encoder 16. The Access Password is preferably in each case calculable through any of the following methods:

Fixed Passwords, including password 00000000H
Pre-Encoded Passwords 96*a* of FIG. 9
Cryptographically Formulated Passwords 106*a*

RFID Reader 17 preferably determines the appropriate method for determining the Access and Kill Passwords 96*a* or 106*a* by attempting to read a header that is preferably stored in User Memory S1 74*c*. If such a header is present, it provides a specification of the method that RFID Reader 17 must use to acquire or formulate the passwords, generally as either a fixed password, a password acquired from a table as shown in FIG. 9, or passwords that are formulated according to FIG. 10.

RFID Reader 17 in Retail Store 19 (or a military logistics center or a forward battle position) preferably uses EPC Flip 17*a* which is a combination of RFID hardware and specialized firmware operating in a secure manner, preferably in accordance with FIPS 140-2 to flip, unflip, or alter the UII identity of RFID Tag 70 in EPC/UII Memory 72. The alteration is based upon steps that access a changeable set of cryptographic keys that are locally stored in RFID Reader 17.

Figure 24:
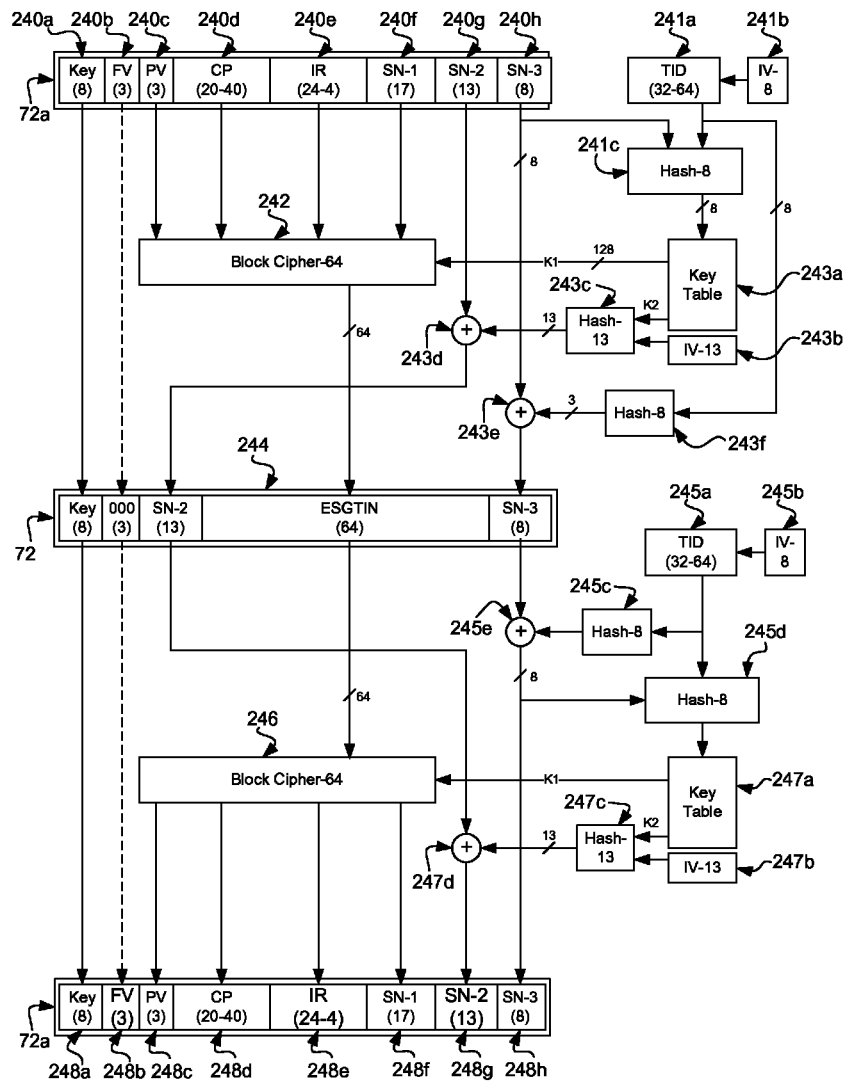
FIG. 24 is a block diagram of the cryptographic encoding and decoding according to one embodiment of the present invention.

The operation of EPC Flip 17*a* is to flip the identity of EPC SGTIN 72*a* of FIG. 24 that is stored in EPC Memory Bank 72 of RFID Tag 70. GS1 Key 240*a* is a header that identifies the GS1 Key Type as an SGTIN-96 identifier and must remain at that value so that Tag 70 can be processed by existing RFID readers and is directly copied into the same bit locations of Encrypted SGTIN 244. The filter value FV 240*b* must be the value 001 for "Retail Consumer Trade Item" for this preferred embodiment. If it is not, then alternative operations must be employed to handle other values such that FV will be properly reconstructed during a deciphering operation. In this embodiment, FV is set to 000 for "All Others" in Encrypted SGTIN 244. According to EPCglobal Tag Data Standards Version 1.4 a filter value of 000 means that the object to which the tag is affixed does not match any of the logistic types defined as other filter values in this specification. It should be noted that tags conforming to earlier versions of this specification, in which 000 was the only value approved for use, will have filter value equal to 000, but following the ratification of this standard, the filter value should be set to match the object to which the tag is affixed, and use 000 only if the filter value for such object does not exist in the specification. Since an encrypted EPC for an item-level object does not exist in the specification, then 000 must be used. An RFID tag with an alternate identity therefore has a filter value of 000b in certain preferred embodiments in order to identify itself as having non-publicly decodable UII information.

Partition value PV 240*c*, Company Prefix CP 240*d*, Indicator Digit and Item Reference IR 240*e*, and the upper 17 bits of the serial number designated in FIG. 24 as SN-1 240*f* are combined into a 64-bit input vector. The input vector is encrypted by Block Cipher-64 242 which is preferably a symmetric block cipher with both encryption and decryption counterpart operations.

There are several ciphers, stream and block, of various block sizes that could be used. Preferred embodiments use 64-bit block ciphers. 80-bit, 96-bit, 128-bit and longer block sizes could be used with alternate embodiments. Preferred embodiments use 64-bit block sizes and the XXTEA block cipher. It was designed by David Wheeler and Roger Needham of the Cambridge Computer Laboratory; it was first presented at the Fast Software Encryption workshop in Leuven in 1994, and first published in the proceedings of that workshop. The cipher is not subject to any patents. XXTEA is a block cipher that was designed to correct weaknesses in the original Block TEA (Tiny Encryption Algorithm). TEA operates on 64-bit blocks and uses a 128-bit key. It has a Feistel structure with a suggested 64 rounds, typically implemented in pairs termed cycles. It has an extremely simple key schedule, mixing all of the key material in exactly the same way for each cycle. Different multiples of a magic constant are used to prevent simple attacks based on the symmetry of the rounds. The magic constant, 2654435769 or 9E3779B916 is chosen to be $2^{32}/\phi$, where $\phi$ is the golden ratio. XXTEA is a consistent incomplete source-heavy heterogeneous UFN (unbalanced Feistel network) block cipher. XXTEA operates on variable-length blocks that are some arbitrary multiple of 32 bits in size (minimum 64 bits). The number of full cycles depends on the block size, but there are at least six (rising to 32 for small block sizes). The original Block TEA applies the XTEA round function to each word in the block and combines it additively with its leftmost neighbor. Slow diffusion rate of the decryption process was immediately exploited to break the cipher. Corrected Block TEA uses a more involved round function which makes use of both immediate neighbors in processing each word in the block. If the block size is equal to the entire message, as is the case in the present invention, XXTEA has the property that it does not need a mode of operation: the cipher can be directly applied to encrypt the entire message.

The result of Block Cipher-64 242 is the 64-bit ESGTIN of encrypted SGTIN 244. The 128-bit cryptographic key K1 is selected from Key Table 243*a* using the 8-bit digest of Hash-8 241*c*. In a preferred embodiment, the inputs of Hash-8 241*c* are TID 241*a* and SN-3 240*h*. In another preferred embodiment, some or all of the SN-3 240*h* bits bypass Hash-8 241*c* to have a direct selection affect of keys in Key-Table 243*a* and in so doing provide for a progressively updatable table of keys. If the bypassed SN-3 240*h* bits are in addition to the 8 bit digest from Hash-8 241*c*, then a larger table can be implemented, for example 10 bits would result in a 1024 128-bit key table instead of the 256 key table shown in FIG. 24.

Hash functions Hash-8 241c, Hash-8 243f, and Hash-13 243c for example are deterministic procedures that take a block of data and return a fixed-size bit string, the hash value. For hash values of less than 16 bits, it is difficult to claim any real cryptographic qualities. In fact, anything with an output of less than 128 bits does not provide much cryptographic strength. Therefore, the hash functions Hash-8 241c, Hash-8 243f, Hash-13 243c, Hash-8 245c, Hash-8 245d, and Hash-13 247c for example preferably use a computationally efficient algorithm such as a Fletcher checksum or other hash function. The 8-bit Fletcher checksum algorithm is documented in RFC1146. The 8-bit Fletcher Checksum Algorithm is calculated over a sequence of data octets (call them D[1] through D[N]) by maintaining 2 unsigned 1's complement 8-bit accumulators A and B whose contents are initially zero, and performing the following loop where i ranges from 1 to N:

$$A := A + D[i]$$

$$B := B + A$$

It can be shown that at the end of the loop A will contain the 8-bit 1's complement sum of all octets in the datagram, and that B will contain (N)D[1]+(N−1)D[2]+ . . . +D[N]. The value B is preferably used as the hash value output.

Initialization vectors IV-8 241b, IV-13 243b, IV-8 245b, and 247b are preferably used to preload the value A above with a non-zero value in order to change the final result and to obfuscate the overall operation. Initialization values IV-8 241b, IV-13 243b, IV-8 245b, and 247b are in preferred embodiments stored in a different location and manner than the random numbers that comprise the cryptographic keys of Key Table 243a and 247a.

Block Cipher-64 246 is used to decrypt 64-bit ESGTIN 244 and return PV 248c, CP 248d, IR 248e, and SN-1 248f to the standard bit positions of an SGTIN. This is in contrast to the encrypted form of ESGTIN 244 wherein the bit order is altered, and is in the preferred embodiment aligned onto byte boundaries.

SN-2 240g and SN-3 240h are both separately XOR'd to cover their identity. The discovery of these bit values by a cryptographic adversary has very limited value, especially without knowledge of the base product that they serialize. Therefore, those lower serial number bits do not warrant strong cryptography for most operating environments. However, for extreme conditions, an overlapping Block Cipher-64 is used to cover these remaining bits and to include some of the bits that are output from Block Cipher-64 242. XOR 243d uses a 13-bit hash value from Hash-13 243c which uses initialization vector IV-13 243b and a 128-bit key K2 from Key Table 243a. Key K2 is preferably at some fixed offset from K1, and may be for example the next or previous key in Key Table 243a. XOR 247d reverses the result using K2 from Key Table 247a and IV-13 247b to uncover SN-2 to create SN-2 248g.

SN-3 240h is used as an input to Hash-8 241c. XOR 243e must therefore be followed by XOR 245e before being used as an input to Hash-8 245d. This is done by running Hash-8 245c using TID 245a and IV-245b as fixed inputs, and using them again with the uncovered SN-3 248h at Hash-8 245d to compute a key index into Key Table 247a. In another preferred embodiment, some or all of the SN-3 248h bits bypass Hash-8 245d to have a direct selection affect of keys in Key-Table 247a and in so doing provide for a progressively updatable table of keys. If the bypassed SN-3 248h bits are in addition to the 8 bit digest from Hash-8 245d, then a larger table can be implemented, for example 10 bits would result in a 1024 128-bit key table instead of the 256 key table shown in FIG. 24.

The resulting key K1 is used with Block Cipher-64 246 for decryption of the 64-bit SGTIN core identity. Once FV 248c is restored to the original value of 001 the entire SGTIN-96 is therefore reconstructed.

Figure 23:
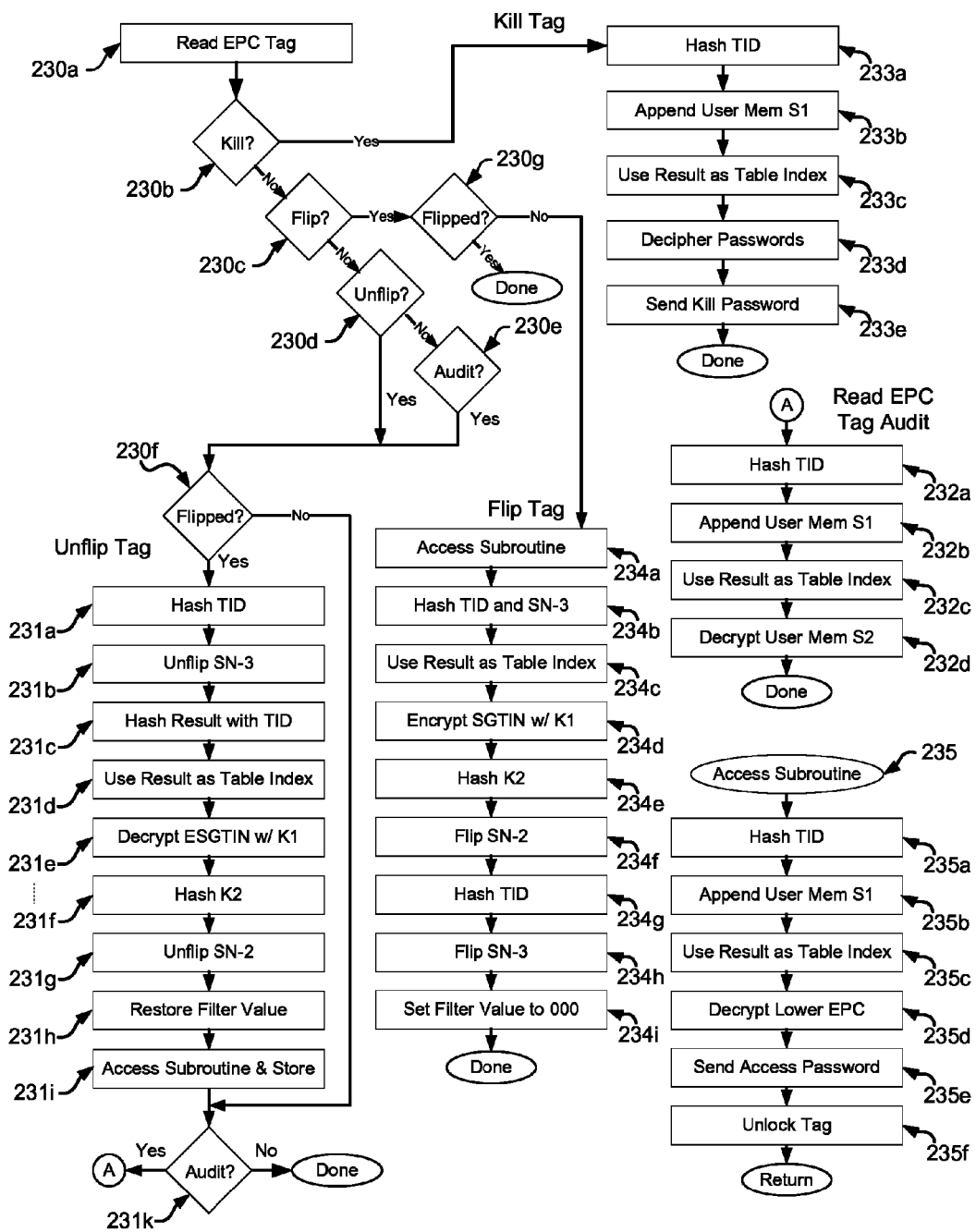
FIG. 23 is a flowchart of a secure RFID tag processing method according to one embodiment of the present invention.

Referring now to the flowchart of FIG. 23 there is a preferred method of processing any of four fundamental EPC RFID Tag 70 functions:

Encrypting the SGTIN (i.e. "Flipping" the identity)
Decrypting the encrypted SGTIN (i.e. "Unflipping the identity)
Decrypting tag encoding audit information
Killing the tag Two of the functions (i.e. flipping and unflipping EPC SGTIN 72a) involve changing the state of EPC/UII Memory 72. In preferred embodiments EPC/UII Memory 72 is locked to prevent tampering by unauthorized interrogators. In order to transition Tag 70 to the secured state and unlock the lock bits that protect EPC/UII Memory 72, the subroutine steps 235a through 235f must be followed, and then control must return to the step that this flow chart subroutine was called from.

Figure 10:
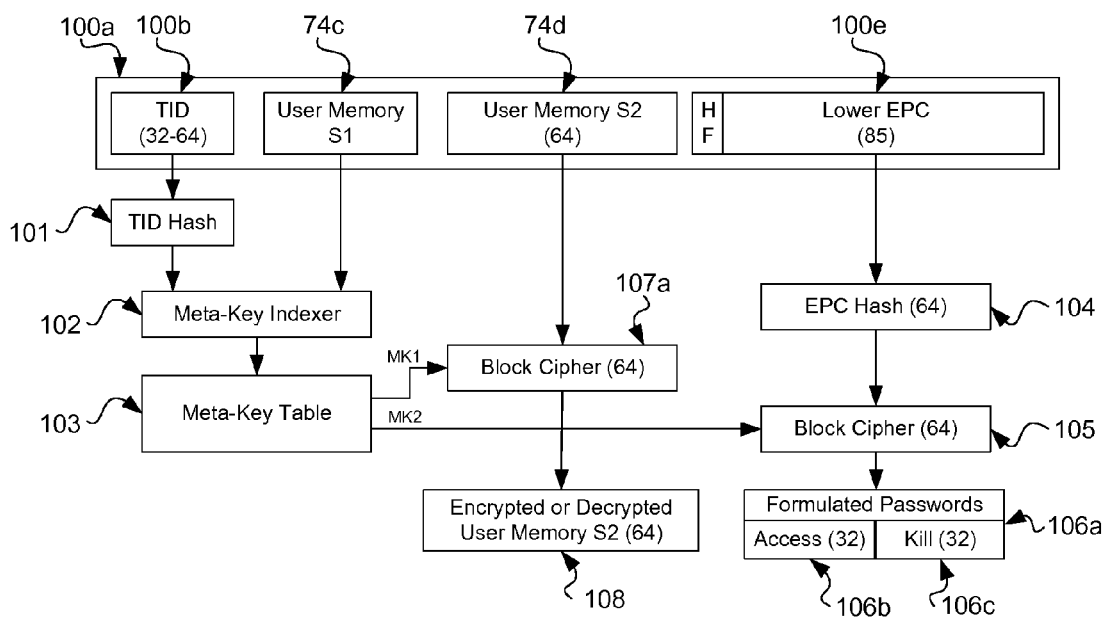
FIG. 10 is a block diagram of a secure RFID tag encryption and decryption process according to one embodiment of the present invention.

Access Subroutine 235 begins at step 235a where TID 100b is hashed by TID Hash 101 as shown in FIG. 10, and the hash digest is appended with User Memory S1 74c at Meta-Key Indexer 102 in step 235b. The purpose is to provide a way of centrally changing the cryptographic keys under the control of Tag Management Server 10a by altering the value of User Memory S1 74c.

At step 235c the hash digest is used as an index into Meta-Key Table 103 to produce Meta-Key MK2 which is used in step 235d to decrypt Lower EPC 100e to construct Formulated Passwords 106a.

At step 235e Access Password 106b is sent to Tag 70 and causes it to transition to secured state upon receiving a valid access command and Access Password 106b, maintaining the same handle that it previously backscattered when it transitioned from the acknowledged to the open state. Tags in the secured state can execute all access commands.

At step 235f the lock command and lock command payload are sent to Tag 70. If Tag 70 permalock bits have not been previously set, then Tag 70 will unlock the requested memory bank, including EPC/UII Memory 72 and backscatter the handle of Tag 70 and the corresponding CRC-16 within 20 ms. Access Subroutine 235 is concluded and flow returns to the step that it was called from.

The process begins at step 230a where an EPC RFID tag is read by an RFID interrogator, preferably including EPC, TID, and User Memory. The first branch at step 230b is made if the required operation is to kill Tag 70. The tag kill function begins at step 233a where the TID is hashed as shown in block 101 of FIG. 10. In step 233b, Section 1 of User Memory Bank 74a (if present in Tag 70) is User Memory S1 74c and is appended (if present, otherwise a default value is used) to the result of the hash to become an index value in step 233c.

For step 233d, if Tag 70 was pre-encoded as determined by a header value in User Memory S1 74c of FIG. 9 or FIG. 10, then Kill Password 96c is obtained from Fixed-Password Table 93 at a location determined by the index value at Fixed-Key Indexer 92 in FIG. 9. If Tag 70 was not pre-encoded, as represented by Tag 100a in FIG. 10, then Meta-Key Indexer 102 is used in FIG. 10 to point to a key MK2 in Meta-Key Table 103. Key MK2 is used with Block Cipher 105 to formulate Kill Password 106c using the hash digest of EPC Hash 104, which is fed by the lower 85 bits of EPC SGTIN 100e.

In step 233e the RFID interrogator sends the Kill password to Tag 70 using a 16-bit handle to identify the proper tag, whereupon Tag 70 returns the 16-bit handle and a 16-bit CRC to confirm that it has been killed. Tag 70 then transitions to the Killed state and ceases to respond to interrogations. Immediately after this reply the Tag shall render itself silent and shall not respond to an Interrogator thereafter. If the Interrogator observes this reply within 20 ms then the Kill completed successfully.

Returning our attention again to step 230b, if the required operation was not to kill Tag 70, then control flows to step 230c. If the required operation is to flip the identity of Tag 70 from a publicly viewable EPC SGTIN to an encrypted version of the STGIN, then the branch is made to step 230g. In that step the current state of Tag 70 is assessed by examining the filter value bits FV 240b of EPC SGTIN 72a. If those three bits are $000_b$ then Tag 70 has already been flipped, and the operation is aborted by branching to the Done state from step 230g. If Tag 70 has not yet been flipped, then control flows to step 234a.

In step 234a Access Subroutine 235 is called and executed as described above. This results in Tag 70 transitioning to the secured state and EPC/UII Memory 72 being unlocked for writing, if it was not already in the unlocked state. Flow returns to this step.

In step 234b TID 241a, SN-3 240h, and initialization vector 241b are hashed by Hash-8 241c in FIG. 24 using as many TID bits as are available from the RFID chip manufacturer as defined in the EPCglobal Class 1 Generation 2 Protocol V1.0.9 paragraph 6.3.2.1.

In step 234c, the hash digest of step 234b is used as an index into Key Table 243a to obtain key K1 from Key Table 243a. In step 234d K1 is used as a 128-bit key in Block Cipher-64 242, using PV 240c, CP 240d, IR 240e, and SN-1 240f to produce the 64-bit ESGTIN result in 244. Block Ciper-64 242 is preferably an unpatented, public domain, bidirectional, strong 64-bit block cipher such as XXTEA by David Wheeler and Roger Needham.

In this preferred embodiment, there are 13 additional bits that need to be flipped; these are 13 bits in the central part of the SGTIN serial number field that is herein referred to as bit group SN-2 240g. In step 234e Hash-13 243c is preferably used on key K2 of Key Table 243a and initialization vector IV-13 243b. The hash digest is in step 234f used at XOR 243d to selectively flip the bits of SN-2 240g and place the result in a different and non-intuitive manner within the resulting encrypted ESGTIN 244, the exact structure of which is not fully disclosed herein for security reasons. Various bit mappings of encrypted ESGTIN 244 are preferred bit mappings without departing from the intent and spirit of the prevent invention.

In step 234g TID 241a is hashed by Hash-8 243f, the digest of which is used at XOR 243e to flip least significant serial number bits SN-3 240h in step 234h. Step 234i is to clear FV 240b bits to Oak and to store everything in encrypted ESG-TIN 244 in EPC/UII Memory 72 of Tag 70. EPC/UII Memory 72 bank of Tag 70 is then preferably locked and Tag 70 is preferably commanded to exit the secured state. The flip function is then done.

Returning our attention again to step 230b, if the required operation was not to flip Tag 70, then control flows to step 230d. If the required operation was to unflip Tag 70 (i.e. decrypt it), then control flows to step 230f where FV 240c filter value bits are checked for the value $000_b$. If they are $000_b$, then Tag 70 has been flipped and control flows to step 231a, otherwise it ships to step 231k.

At step 231a TID 245a, initialization vector IV-8 245b are hashed by Hash-8 245c and used by XOR 245e in step 231b to unflip SN-3 of encrypted ESGTIN 244. The result is stored in SN-3 248h and used in step 231c in Hash-8 245d to create a key index for Key Table 247a in step 231d. Key K1 is used in step 231e by Block Cipher-64 246 to reconstruct PV 248c, CP 248d, IR 248e, and SN-1 248f as shown in FIG. 24.

In step 231f Hash-13 247c uses initialization vector IV-13 247b and key K2 from Key Table 247a which is preferably at a fixed offset from K1 within Key Table 247a. The 13-bit hash digest is used to unflip SN-2 to reconstruct SN-2 248g in step 231g. In step 231h, filter value bits FV 248b are restored to $001_b$.

In step 231i Access Subroutine 235 is called and executed as described above if Tag 70 is to retain the unflipped version of EPC SGTIN 72a. As described above, in certain operations such as store inventory, large populations of RFID tags are read, both flipped and unflipped. The business process may or may not involve saving the unflipped version of the encrypted EPC in Tag 70, but instead just using that information as part of the inventory process.

If Tag 70 is to be modified, then upon return to this step, reconstructed EPC bit fields SGTIN 248a through 248h are stored in Tag 70 as EPC SGTIN 72a. EPC/UII Memory 72 bank of Tag 70 is then preferably locked.

At step 231k it is determined if Tag 70 audit information is also to be extracted, in which case control flows to step 232a, otherwise this unflip function is done. This logical path is shared in the caseB of the required operation at step 230e was the audit function. If so, control would have flowed as before to step 230f to determine if Tag 70 had previously been flipped, and needed to be unflipped in order to recover audit information.

In step 232a TID 100b is hashed by TID Hash 101 as shown in FIG. 10, and the hash digest is appended with User Memory S1 74c at Meta-Key Indexer 102 in step 232b. The purpose is to provide a way of centrally changing the cryptographic keys under the control of Tag Management Server 10a by altering the value of User Memory S1 74c.

At step 232c the hash digest is used as an index into Meta-Key Table 103 to produce Meta-Key MK1 which is used with block cipher 105 in step 232d to decrypt User Memory S2 74d to reconstruct the decrypted User Memory S2 108 which contains tag audit information.

We claim:

1. An RFID tag identifying a product, the tag comprising:
 a memory means for storing data;
 a command means responsive to commands from an RFID interrogator;
 the command means comprising a lock command for changing memory locking lock bits;
 tag states including a secured state for the tag to execute the lock command;
 a publicly readable product identification number stored in the memory means;
 an access password stored in a reserved bank of the memory means;
 a kill password stored in the reserved bank of the memory means;
 an index number means stored in a bank of the memory means for use as an index into an indexed table of cryptographic keys that are stored in the RFID interrogator;
 a header means stored in a bank of the memory means for specifying to the RFID interrogator a method of using a cryptographic key that is stored in the indexed table of cryptographic keys at an index location matching the index number means and with the publicly readable product identification number to cryptographically formulate within the RFID interrogator a formulated access password and a formulated kill password;

a means for one or more states of the tag states to transition to the secured state when the RFID interrogator sends to the RFID tag the formulated access password and it is non-zero and identical to the stored access password; and a means for one or more states of the tag states to transition to the killed state when the RFID interrogator sends to the RFID tag the formulated kill password and it is non-zero and identical to the stored kill password.

2. The tag of claim 1 wherein the memory means is further comprised of silicon.

3. The tag of claim 1 further being chipless.

4. The RFID tag of claim 1 wherein the publicly readable product identification number further comprises a Serialized Global Trade Item Number (SGTIN) SGTIN-96.

5. The RFID tag of claim 1 wherein the publicly readable product identification number further comprises an SGTIN-198.

6. The RFID tag of claim 1 wherein the bank of the memory means storing the header means ia User Memory.

7. The RFID tag of claim 1 wherein the formulated access password and the formulated kill password are further comprised of a cryptographic result of a block cipher.

8. The RFID tag of claim 1 wherein the formulated access password and the formulated kill password are further comprised of a formulated result of an Advanced Encryption Standard (AES) cryptographic cipher.

9. The RFID tag of claim 1 wherein the formulated access password and the formulated kill password are further comprised of a result from an AES-128 cryptographic cipher.

10. The RFID tag of claim 1 wherein the stored access password is further comprised of 32 bits.

11. The RFID tag of claim 1 wherein the stored kill password is further comprised of 32 bits.

12. The RFID tag of claim 1 wherein the formulated access password sent to the RFID tag by the interrogator further comprises transmission using cover-coding.

13. The RFID tag of claim 1 wherein the formulated kill password sent to the RFID tag by the interrogator further comprises transmission using cover-coding.

14. The RFID tag of claim 1 wherein the memory locking lock bits further comprise settings to prevent the stored access password and stored kill password from being read or changed by the RFID interrogator except from the secured state.

15. The RFID tag of claim 1 wherein the interrogator further comprises a jammer to prevent eavesdropping.

16. The tag of claim 1 further comprising pressure sensitive adhesive for attachment to the product.

* * * * *